US012276420B2

(12) United States Patent
Desai et al.

(10) Patent No.: US 12,276,420 B2
(45) Date of Patent: Apr. 15, 2025

(54) INDUSTRIAL INTERNET OF THINGS SMART HEATING SYSTEMS AND METHODS THAT PRODUCE AND USE HYDROGEN FUEL

(71) Applicant: STRONG FORCE IOT PORTFOLIO 2016, LLC, Fort Lauderdale, FL (US)

(72) Inventors: Mehul Desai, Oak Brook, IL (US); Charles Howard Cella, Pembroke, MA (US); Jeffrey P. McGuckin, Philadelphia, PA (US); Gerald William Duffy, Jr., Philadelphia, PA (US)

(73) Assignee: STRONG FORCE IOT PORTFOLIO 2016, LLC, Fort Lauderdale, FL (US)

( * ) Notice: Subject to any disclaimer, the term of this patent is extended or adjusted under 35 U.S.C. 154(b) by 346 days.

(21) Appl. No.: 16/052,998

(22) Filed: Aug. 2, 2018

(65) Prior Publication Data

US 2019/0056107 A1  Feb. 21, 2019

Related U.S. Application Data

(63) Continuation-in-part of application No. PCT/US2017/016113, filed on Feb. 2, 2017, and a (Continued)

(30) Foreign Application Priority Data

Feb. 3, 2016  (IN) .............................. 201631003869

(51) Int. Cl.
*F23N 1/00* (2006.01)
*C25B 1/04* (2021.01)
(Continued)

(52) U.S. Cl.
CPC ................ *F23N 1/002* (2013.01); *C25B 1/04* (2013.01); *C25B 15/02* (2013.01); *F23N 5/265* (2013.01);
(Continued)

(58) Field of Classification Search
CPC .. F23N 2239/04; F23N 2225/04; F23N 5/265; F23N 2237/06; F23N 1/002;
(Continued)

(56) References Cited

U.S. PATENT DOCUMENTS 4,070,647 A  1/1978 Robson
4,074,142 A  2/1978 Jackson
(Continued)

FOREIGN PATENT DOCUMENTS

CA  2323380 A1  4/2001
CA  2639281 A1  7/2009
(Continued)

OTHER PUBLICATIONS

International Search Report and Written Opinion dated Jun. 12, 2017 for PCT International Application No. PCT/US2017/016113, 10 pages.
(Continued)

*Primary Examiner* — Shogo Sasaki
(74) *Attorney, Agent, or Firm* — RMCK Law Group, PLC

(57) ABSTRACT

An intelligent heating system device is provided with processing, communications, and other information technology components, for remote monitoring and control and various value added features and services, embodiments of which use a renewable energy-powered electrolyzer to produce hydrogen as an on-demand fuel stream for a heating element of the heating system.

20 Claims, 30 Drawing Sheets

Related U.S. Application Data continuation-in-part of application No. PCT/US2017/031721, filed on May 9, 2017.

(60) Provisional application No. 62/540,559, filed on Aug. 2, 2017, provisional application No. 62/540,512, filed on Aug. 2, 2017, provisional application No. 62/562,487, filed on Sep. 24, 2017, provisional application No. 62/583,483, filed on Nov. 8, 2017, provisional application No. 62/350,672, filed on Jun. 15, 2016, provisional application No. 62/412,843, filed on Oct. 26, 2016, provisional application No. 62/427,141, filed on Nov. 28, 2016.

(51) Int. Cl.
  *C25B 15/02* (2021.01)
  *F23N 5/26* (2006.01)
  *G05B 19/042* (2006.01)

(52) U.S. Cl.
  CPC .... *G05B 19/042* (2013.01); *F23C 2900/9901* (2013.01); *F23N 2223/08* (2020.01); *F23N 2223/38* (2020.01); *F23N 2225/04* (2020.01); *F23N 2225/16* (2020.01); *F23N 2237/06* (2020.01); *F23N 2239/04* (2020.01); *F23N 2241/08* (2020.01); *G05B 2219/24015* (2013.01)

(58) Field of Classification Search
  CPC ............. F23N 2225/16; F23N 2223/38; F23N 2241/08; F23N 2223/08; F23C 2900/9901; C25B 1/04; C25B 15/02; Y02E 60/36; F24C 9/00; Y02P 20/133; G05B 2219/24015; G05B 19/042
  See application file for complete search history.

(56) References Cited

U.S. PATENT DOCUMENTS

| | | |
|---|---|---|
| 4,605,928 A | 8/1986 | Georgiou |
| 4,620,304 A | 10/1986 | Faran, Jr. et al. |
| 4,621,263 A | 11/1986 | Takenaka et al. |
| 4,724,420 A | 2/1988 | Woodard |
| 4,740,736 A | 4/1988 | Sidman et al. |
| 4,852,083 A | 7/1989 | Niehaus et al. |
| 5,051,981 A | 9/1991 | Kline |
| 5,072,366 A | 12/1991 | Simcoe |
| 5,123,011 A | 6/1992 | Hein et al. |
| 5,157,629 A | 10/1992 | Sato et al. |
| 5,166,926 A | 11/1992 | Cisneros et al. |
| 5,365,428 A | 11/1994 | DePinto et al. |
| 5,469,150 A | 11/1995 | Sitte |
| 5,541,914 A | 7/1996 | Krishnamoorthy et al. |
| 5,566,092 A | 10/1996 | Wang et al. |
| 5,568,356 A | 10/1996 | Schwartz |
| 5,621,345 A | 4/1997 | Lee et al. |
| 5,629,870 A | 5/1997 | Farag et al. |
| 5,650,951 A | 7/1997 | Staver |
| 5,680,025 A | 10/1997 | Bowers, III et al. |
| D395,291 S | 6/1998 | Mason et al. |
| 5,761,940 A | 6/1998 | Moore, Jr. et al. |
| 5,842,034 A | 11/1998 | Bolstad et al. |
| 5,854,994 A | 12/1998 | Canada et al. |
| 5,874,790 A | 2/1999 | Macks |
| 5,875,420 A | 2/1999 | Piety et al. |
| 5,892,468 A | 4/1999 | Wilson et al. |
| 5,895,857 A | 4/1999 | Robinson et al. |
| 5,922,963 A | 7/1999 | Piety et al. |
| 5,978,389 A | 11/1999 | Chen |
| 5,982,776 A | 11/1999 | Manning et al. |
| 6,108,616 A | 8/2000 | Borchers et al. |
| 6,141,355 A | 10/2000 | Palmer et al. |
| 6,184,713 B1 | 2/2001 | Agrawal et al. |
| 6,229,464 B1 | 5/2001 | McNeely |
| 6,257,066 B1 | 7/2001 | Chandler et al. |
| 6,301,514 B1 | 10/2001 | Canada et al. |
| 6,313,772 B1 | 11/2001 | McNeely |
| 6,421,341 B1 | 7/2002 | Han et al. |
| 6,434,512 B1 | 8/2002 | Discenzo |
| 6,466,277 B1 | 10/2002 | McNeely |
| 6,484,109 B1 | 11/2002 | Lofall |
| 6,532,392 B1 | 3/2003 | Eryurek et al. |
| 6,554,978 B1 | 4/2003 | Vandenborre |
| 6,581,048 B1 | 6/2003 | Werbos |
| 6,633,782 B1 | 10/2003 | Schleiss et al. |
| 6,650,142 B1 | 11/2003 | Agrawal et al. |
| 6,678,268 B1 | 1/2004 | Francis et al. |
| 6,703,860 B1 | 3/2004 | Agrawal et al. |
| 6,737,958 B1 | 5/2004 | Satyanarayana |
| 6,744,472 B1 | 6/2004 | MacInnis et al. |
| 6,789,030 B1 | 9/2004 | Coyle et al. |
| 6,832,521 B1 | 12/2004 | Courtney et al. |
| 6,856,600 B1 | 2/2005 | Russell et al. |
| 6,873,620 B1 | 3/2005 | Coveley et al. |
| 6,970,758 B1 | 11/2005 | Shi et al. |
| 6,982,974 B1 | 1/2006 | Saleh et al. |
| 7,018,800 B2 | 3/2006 | Huisenga et al. |
| 7,027,981 B2 | 4/2006 | Bizjak |
| 7,043,728 B1 | 5/2006 | Galpin |
| 7,135,888 B1 | 11/2006 | Hutton et al. |
| 7,142,990 B2 | 11/2006 | Bouse et al. |
| 7,225,037 B2 | 5/2007 | Shani |
| 7,289,857 B2 | 10/2007 | Nauck et al. |
| 7,298,296 B1 | 11/2007 | Kamath |
| 7,546,377 B2 | 6/2009 | Venkatramani et al. |
| 7,710,153 B1 | 5/2010 | Masleid et al. |
| 7,717,849 B2 | 5/2010 | Mathew et al. |
| D619,614 S | 7/2010 | O'Mullan et al. |
| 7,817,743 B2 | 10/2010 | Stojanovic et al. |
| 7,862,084 B2 | 1/2011 | Maeda et al. |
| 7,882,394 B2 | 2/2011 | Hosek et al. |
| D640,264 S | 6/2011 | Fujii |
| 7,970,087 B2 | 6/2011 | Millman |
| 8,057,646 B2 | 11/2011 | Hinatsu et al. |
| 8,060,017 B2 | 11/2011 | Schlicht et al. |
| 8,102,188 B1 | 1/2012 | Chan et al. |
| 8,200,775 B2 | 6/2012 | Moore |
| 8,352,149 B2 | 1/2013 | Meacham |
| 8,380,652 B1 | 2/2013 | Francis, Jr. |
| 8,381,053 B1 | 2/2013 | Joshi |
| 8,566,602 B2 | 10/2013 | Aaron |
| 8,571,835 B2 | 10/2013 | Farrow et al. |
| 8,571,904 B2 | 10/2013 | Guru et al. |
| 8,612,182 B2 | 12/2013 | Hess et al. |
| 8,615,374 B1 | 12/2013 | Discenzo |
| 8,620,604 B2 | 12/2013 | Gross et al. |
| 8,635,005 B2 | 1/2014 | Hagari et al. |
| 8,766,925 B2 | 7/2014 | Perlin et al. |
| 8,768,634 B2 | 7/2014 | Fu et al. |
| 8,781,536 B1 | 7/2014 | Zaslavsky et al. |
| 8,799,800 B2 | 8/2014 | Hood et al. |
| D719,584 S | 12/2014 | Wu |
| D720,366 S | 12/2014 | Hiltunen et al. |
| 8,902,936 B2 | 12/2014 | Stephanson |
| 8,907,243 B2 | 12/2014 | Watanabe et al. |
| 8,924,033 B2 | 12/2014 | Goutard et al. |
| 8,977,578 B1 | 3/2015 | Cruz-Albrecht et al. |
| D731,543 S | 6/2015 | Aoshima |
| 9,092,593 B2 | 7/2015 | Nasle |
| 9,225,783 B2 | 12/2015 | Stephanson |
| 9,257,353 B1 | 2/2016 | Mikalo et al. |
| 9,314,190 B1 | 4/2016 | Giuffrida et al. |
| D759,075 S | 6/2016 | Bain |
| D759,076 S | 6/2016 | Bain |
| 9,359,074 B2 | 6/2016 | Ganesh et al. |
| 9,425,817 B1 | 8/2016 | Melanson |
| 9,432,298 B1 | 8/2016 | Smith |
| 9,435,684 B2 | 9/2016 | Baldwin |
| 9,491,490 B1 | 11/2016 | Toth et al. |
| 9,584,256 B2 | 2/2017 | Kojima et al. |
| 9,619,999 B2 | 4/2017 | Stephanson |
| 9,621,173 B1 | 4/2017 | Xiu |

(56) References Cited

U.S. PATENT DOCUMENTS

| | | |
|---|---|---|
| D789,416 S | 6/2017 | Baluja et al. |
| D790,572 S | 6/2017 | Subramanian et al. |
| 9,721,210 B1 | 8/2017 | Brown |
| 9,824,311 B1 | 11/2017 | Cruz-Albrecht et al. |
| 9,846,752 B2 | 12/2017 | Nasle |
| 9,871,530 B1 | 1/2018 | KGrou |
| 9,912,595 B1 | 3/2018 | Ramasamy |
| 9,916,702 B2 | 3/2018 | Rudenko et al. |
| 9,929,979 B2 | 3/2018 | Germain |
| 9,959,497 B1 | 5/2018 | Ivanov |
| 9,973,186 B2 | 5/2018 | Dedic et al. |
| 9,976,986 B2 | 5/2018 | Wayman et al. |
| 9,977,425 B1 | 5/2018 | McCann et al. |
| 9,984,212 B2 | 5/2018 | Madabhushi et al. |
| D845,993 S | 4/2019 | Taylor et al. |
| 10,260,935 B2 | 4/2019 | Hedin |
| 10,338,553 B2 | 7/2019 | Cella et al. |
| 10,365,625 B2 | 7/2019 | Cella et al. |
| 10,379,842 B2 | 8/2019 | Malladi et al. |
| 10,409,245 B2 | 9/2019 | Cella et al. |
| 10,409,246 B2 | 9/2019 | Cella et al. |
| 10,416,126 B2 | 9/2019 | Bowers, III et al. |
| 10,416,634 B2 | 9/2019 | Cella et al. |
| 10,416,636 B2 | 9/2019 | Cella et al. |
| 10,416,639 B2 | 9/2019 | Cella et al. |
| 10,437,218 B2 | 10/2019 | Cella et al. |
| 10,445,944 B2 | 10/2019 | Galera et al. |
| 10,551,811 B2 | 2/2020 | Cella et al. |
| 10,551,812 B2 | 2/2020 | Cella et al. |
| D877,774 S | 3/2020 | Baluja et al. |
| 10,598,568 B1 | 3/2020 | Morey et al. |
| 10,627,795 B2 | 4/2020 | Cella et al. |
| 10,739,743 B2 | 8/2020 | Cella et al. |
| 10,775,757 B2 | 9/2020 | Cella et al. |
| D900,159 S | 10/2020 | Baluja et al. |
| 10,838,837 B2 | 11/2020 | Brown et al. |
| 10,852,179 B2 | 12/2020 | Hedin |
| D917,502 S | 4/2021 | Canady |
| D922,396 S | 6/2021 | Chih et al. |
| 11,099,531 B2 | 8/2021 | Neti et al. |
| 11,106,188 B2 | 8/2021 | Cella et al. |
| 11,126,153 B2 | 9/2021 | Cella et al. |
| 11,169,496 B2 | 11/2021 | Cella et al. |
| 11,169,497 B2 | 11/2021 | Cella et al. |
| D938,488 S | 12/2021 | Baluja et al. |
| 11,327,455 B2 | 5/2022 | Cella et al. |
| D957,455 S | 7/2022 | Baluja et al. |
| 11,448,567 B2 | 9/2022 | Balboni et al. |
| D989,088 S | 6/2023 | Butter et al. |
| D990,513 S | 6/2023 | Harvey |
| 11,676,098 B2 | 6/2023 | Berti et al. |
| D998,638 S | 9/2023 | Harvey |
| D998,640 S | 9/2023 | Harvey |
| D998,642 S | 9/2023 | Harvey |
| D999,223 S | 9/2023 | Harvey |
| D999,232 S | 9/2023 | Harvey |
| D999,234 S | 9/2023 | Harvey |
| D1,030,773 S | 6/2024 | Dose |
| D1,033,442 S | 7/2024 | Li |
| D1,036,458 S | 7/2024 | Alcorn et al. |
| 12,069,831 B2 | 8/2024 | Harvey et al. |
| 2001/0015918 A1 | 8/2001 | Bhatnagar |
| 2001/0030468 A1 | 10/2001 | Anderson et al. |
| 2002/0004694 A1 | 1/2002 | Mcleod et al. |
| 2002/0013635 A1 | 1/2002 | Gotou et al. |
| 2002/0016856 A1 | 2/2002 | Tallegas et al. |
| 2002/0084815 A1 | 7/2002 | Murphy et al. |
| 2002/0114984 A1 | 8/2002 | Edlund et al. |
| 2002/0129379 A1 | 9/2002 | Levinson et al. |
| 2002/0136336 A1 | 9/2002 | McCarty |
| 2002/0138217 A1 | 9/2002 | Shen et al. |
| 2002/0152037 A1 | 10/2002 | Sunshine et al. |
| 2002/0174708 A1 | 11/2002 | Mattes |
| 2002/0177878 A1 | 11/2002 | Poore et al. |
| 2002/0181799 A1 | 12/2002 | Matsugu et al. |
| 2003/0043037 A1 | 3/2003 | Lay |
| 2003/0048962 A1 | 3/2003 | Sato et al. |
| 2003/0054960 A1 | 3/2003 | Bedard |
| 2003/0061008 A1 | 3/2003 | Smith et al. |
| 2003/0069648 A1 | 4/2003 | Douglas et al. |
| 2003/0083756 A1 | 5/2003 | Hsiung et al. |
| 2003/0094992 A1 | 5/2003 | Geysen |
| 2003/0118081 A1 | 6/2003 | Philips et al. |
| 2003/0137648 A1 | 7/2003 | Voorhis et al. |
| 2003/0158954 A1 | 8/2003 | Williams |
| 2003/0212511 A1 | 11/2003 | Carle et al. |
| 2004/0019461 A1 | 1/2004 | Bouse et al. |
| 2004/0088406 A1 | 5/2004 | Corley et al. |
| 2004/0093516 A1 | 5/2004 | Hornbeek et al. |
| 2004/0109065 A1 | 6/2004 | Tokunaga |
| 2004/0114047 A1 | 6/2004 | Vora et al. |
| 2004/0205097 A1 | 10/2004 | Toumazou et al. |
| 2004/0260404 A1 | 12/2004 | Russell et al. |
| 2005/0007249 A1 | 1/2005 | Eryurek et al. |
| 2005/0011266 A1 | 1/2005 | Robinson et al. |
| 2005/0011278 A1 | 1/2005 | Brown et al. |
| 2005/0020255 A1 | 1/2005 | Kingsolver et al. |
| 2005/0049801 A1 | 3/2005 | Lindberg et al. |
| 2005/0081410 A1 | 4/2005 | Furem et al. |
| 2005/0100172 A1 | 5/2005 | Schliep et al. |
| 2005/0162258 A1 | 7/2005 | King |
| 2005/0165581 A1 | 7/2005 | Roba et al. |
| 2005/0251291 A1 | 11/2005 | Solomon |
| 2006/0006997 A1 | 1/2006 | Rose-Pehrsson et al. |
| 2006/0010230 A1 | 1/2006 | Karklins et al. |
| 2006/0028993 A1 | 2/2006 | Yang et al. |
| 2006/0034569 A1 | 2/2006 | Shih et al. |
| 2006/0037177 A1 | 2/2006 | Blum et al. |
| 2006/0069689 A1 | 3/2006 | Karklins et al. |
| 2006/0089889 A1 | 4/2006 | McCarthy, Jr. |
| 2006/0103555 A1 | 5/2006 | Antonesei |
| 2006/0150738 A1 | 7/2006 | Leigh |
| 2006/0155900 A1 | 7/2006 | Sagues et al. |
| 2006/0167638 A1 | 7/2006 | Murphy et al. |
| 2006/0184410 A1 | 8/2006 | Ramamurthy et al. |
| 2006/0224254 A1 | 10/2006 | Rumi et al. |
| 2006/0241907 A1 | 10/2006 | Armstrong et al. |
| 2006/0271617 A1 | 11/2006 | Hughes et al. |
| 2007/0025382 A1 | 2/2007 | Jones et al. |
| 2007/0041338 A1 | 2/2007 | Rowe |
| 2007/0047444 A1 | 3/2007 | Leroy et al. |
| 2007/0067678 A1 | 3/2007 | Hosek et al. |
| 2007/0078802 A1 | 4/2007 | Bestgen et al. |
| 2007/0111661 A1 | 5/2007 | Bargroff et al. |
| 2007/0150565 A1 | 6/2007 | Ayyagari et al. |
| 2007/0179672 A1 | 8/2007 | Fairlie et al. |
| 2007/0180207 A1 | 8/2007 | Garfinkle |
| 2007/0207752 A1 | 9/2007 | Behzad |
| 2007/0241261 A1 | 10/2007 | Wendt |
| 2007/0247285 A1 | 10/2007 | Rajala |
| 2007/0270671 A1 | 11/2007 | Gal |
| 2007/0294360 A1 | 12/2007 | Ebling et al. |
| 2007/0296368 A1 | 12/2007 | Woodland et al. |
| 2008/0010537 A1 | 1/2008 | Hayutin et al. |
| 2008/0033695 A1 | 2/2008 | Sahara et al. |
| 2008/0065290 A1 | 3/2008 | Breed et al. |
| 2008/0073975 A1 | 3/2008 | Wight et al. |
| 2008/0079029 A1 | 4/2008 | Williams |
| 2008/0112140 A1 | 5/2008 | Wong |
| 2008/0162302 A1 | 7/2008 | Sundaresan et al. |
| 2008/0170853 A1 | 7/2008 | Rakib et al. |
| 2008/0188973 A1 | 8/2008 | Filev et al. |
| 2008/0234964 A1 | 9/2008 | Miyasaka et al. |
| 2008/0247313 A1 | 10/2008 | Nath et al. |
| 2008/0278197 A1 | 11/2008 | Murotake |
| 2008/0316076 A1 | 12/2008 | Dent et al. |
| 2008/0319279 A1 | 12/2008 | Ramsay et al. |
| 2009/0003599 A1 | 1/2009 | Hart et al. |
| 2009/0012728 A1 | 1/2009 | Spanier et al. |
| 2009/0043530 A1 | 2/2009 | Sittler et al. |
| 2009/0055126 A1 | 2/2009 | Yanovich et al. |
| 2009/0061775 A1 | 3/2009 | Warren et al. |
| 2009/0063739 A1 | 3/2009 | Weddle |
| 2009/0066505 A1 | 3/2009 | Jensen et al. |

(56) References Cited

U.S. PATENT DOCUMENTS

| | | |
|---|---|---|
| 2009/0083019 A1 | 3/2009 | Nasle |
| 2009/0135761 A1 | 5/2009 | Khandekar et al. |
| 2009/0185496 A1 | 7/2009 | Doverspike et al. |
| 2009/0204232 A1 | 8/2009 | Guru et al. |
| 2009/0228224 A1 | 9/2009 | Spanier et al. |
| 2009/0243732 A1 | 10/2009 | Tarng et al. |
| 2009/0256817 A1 | 10/2009 | Perlin et al. |
| 2009/0265064 A1 | 10/2009 | Furuno |
| 2009/0292505 A1 | 11/2009 | Dyke et al. |
| 2009/0303197 A1 | 12/2009 | Bonczek et al. |
| 2010/0030417 A1 | 2/2010 | Fang et al. |
| 2010/0060296 A1 | 3/2010 | Jiang et al. |
| 2010/0156632 A1 | 6/2010 | Hyland et al. |
| 2010/0161283 A1 | 6/2010 | Qing et al. |
| 2010/0179691 A1 | 7/2010 | Gal et al. |
| 2010/0216523 A1 | 8/2010 | Sebastiano et al. |
| 2010/0223163 A1 | 9/2010 | Edwards |
| 2010/0241601 A1 | 9/2010 | Carson et al. |
| 2010/0241918 A1 | 9/2010 | Nedovic |
| 2010/0249976 A1 | 9/2010 | Aharoni et al. |
| 2010/0253414 A1 | 10/2010 | Dedic et al. |
| 2010/0262401 A1 | 10/2010 | Pfeifer et al. |
| 2010/0271199 A1 | 10/2010 | Belov et al. |
| 2010/0315207 A1 | 12/2010 | Bullard et al. |
| 2011/0050913 A1 | 3/2011 | Kim |
| 2011/0071794 A1 | 3/2011 | Bronczyk et al. |
| 2011/0071963 A1 | 3/2011 | Piovesan et al. |
| 2011/0121978 A1 | 5/2011 | Schwörer et al. |
| 2011/0178737 A1 | 7/2011 | Hudson et al. |
| 2011/0276975 A1 | 11/2011 | Brown et al. |
| 2011/0277010 A1 | 11/2011 | Paul |
| 2011/0282508 A1 | 11/2011 | Goutard et al. |
| 2011/0288796 A1 | 11/2011 | Peczalski et al. |
| 2011/0309937 A1 | 12/2011 | Bunza et al. |
| 2012/0013497 A1 | 1/2012 | Katsuki et al. |
| 2012/0025526 A1 | 2/2012 | Luo et al. |
| 2012/0065901 A1 | 3/2012 | Bechhoefer et al. |
| 2012/0111978 A1 | 5/2012 | Murphy et al. |
| 2012/0173045 A1 | 7/2012 | Conroy |
| 2012/0191349 A1 | 7/2012 | Lenz et al. |
| 2012/0219089 A1 | 8/2012 | Murakami et al. |
| 2012/0246055 A1 | 9/2012 | Schlifstein et al. |
| 2012/0254803 A1 | 10/2012 | Grist et al. |
| 2012/0265359 A1 | 10/2012 | Das et al. |
| 2012/0323741 A1 | 12/2012 | Rangachar et al. |
| 2012/0328301 A1 | 12/2012 | Gupta et al. |
| 2013/0060524 A1 | 3/2013 | Liao |
| 2013/0073228 A1 | 3/2013 | Fulghum et al. |
| 2013/0083945 A1 | 4/2013 | Rossum |
| 2013/0106637 A1 | 5/2013 | Liao et al. |
| 2013/0115535 A1 | 5/2013 | Delfino |
| 2013/0163619 A1 | 6/2013 | Stephanson |
| 2013/0163833 A1 | 6/2013 | Wang et al. |
| 2013/0201316 A1 | 8/2013 | Binder et al. |
| 2013/0211559 A1 | 8/2013 | Lawson et al. |
| 2013/0218451 A1 | 8/2013 | Yamada |
| 2013/0223426 A1 | 8/2013 | Parker |
| 2013/0243429 A1 | 9/2013 | Whelihan et al. |
| 2013/0243963 A1 | 9/2013 | Rina |
| 2013/0245795 A1 | 9/2013 | McGreevy et al. |
| 2013/0255311 A1 | 10/2013 | Thiebault et al. |
| 2013/0274898 A1 | 10/2013 | Thatikonda et al. |
| 2013/0346348 A1 | 12/2013 | Buehler et al. |
| 2013/0346628 A1 | 12/2013 | Canion et al. |
| 2013/0346667 A1 | 12/2013 | Stroud et al. |
| 2014/0046881 A1 | 2/2014 | Lösl et al. |
| 2014/0067289 A1 | 3/2014 | Baldwin |
| 2014/0074433 A1 | 3/2014 | Crepet |
| 2014/0097247 A1 | 4/2014 | Zumsteg |
| 2014/0114612 A1 | 4/2014 | Yoskovitz et al. |
| 2014/0120972 A1 | 5/2014 | Hartman |
| 2014/0152451 A1 | 6/2014 | Murphy |
| 2014/0161135 A1 | 6/2014 | Acharya et al. |
| 2014/0167810 A1 | 6/2014 | Neti et al. |
| 2014/0176203 A1 | 6/2014 | Matheny et al. |
| 2014/0198615 A1 | 7/2014 | Ray |
| 2014/0260761 A1 | 9/2014 | Soderlind |
| 2014/0271449 A1 | 9/2014 | McAlister |
| 2014/0288876 A1 | 9/2014 | Donaldson |
| 2014/0314099 A1 | 10/2014 | Dress |
| 2014/0324367 A1 | 10/2014 | Garvey, III et al. |
| 2014/0324389 A1 | 10/2014 | Baldwin et al. |
| 2014/0337429 A1 | 11/2014 | Asenjo et al. |
| 2014/0365195 A1 | 12/2014 | Lahiri et al. |
| 2015/0032392 A1 | 1/2015 | Bradley |
| 2015/0039250 A1 | 2/2015 | Rank |
| 2015/0052985 A1 | 2/2015 | Brenner et al. |
| 2015/0055633 A1 | 2/2015 | Wu et al. |
| 2015/0059442 A1 | 3/2015 | Liljenberg et al. |
| 2015/0080044 A1 | 3/2015 | McHenry et al. |
| 2015/0098526 A1 | 4/2015 | Hind et al. |
| 2015/0102940 A1 | 4/2015 | Keech et al. |
| 2015/0134954 A1 | 5/2015 | Walley et al. |
| 2015/0142384 A1 | 5/2015 | Chao et al. |
| 2015/0149134 A1 | 5/2015 | Mehta et al. |
| 2015/0154969 A1 | 6/2015 | Craven et al. |
| 2015/0169190 A1 | 6/2015 | Girardeau |
| 2015/0177100 A1 | 6/2015 | Dietz |
| 2015/0217379 A1 | 8/2015 | Kim et al. |
| 2015/0248828 A1 | 9/2015 | Cloutier et al. |
| 2015/0271106 A1 | 9/2015 | Walker et al. |
| 2015/0277399 A1 | 10/2015 | Maturana et al. |
| 2015/0278839 A1 | 10/2015 | Hansen |
| 2015/0288257 A1 | 10/2015 | Cooper et al. |
| 2015/0301521 A1 | 10/2015 | Byron et al. |
| 2015/0302664 A1 | 10/2015 | Miller |
| 2015/0320255 A1 | 11/2015 | She et al. |
| 2015/0330950 A1 | 11/2015 | Bechhoefer |
| 2015/0354607 A1 | 12/2015 | Avni |
| 2015/0363750 A1 | 12/2015 | Svensson et al. |
| 2015/0373735 A1 | 12/2015 | Thubert et al. |
| 2016/0007102 A1 | 1/2016 | Raza et al. |
| 2016/0011692 A1 | 1/2016 | Heim et al. |
| 2016/0026729 A1 | 1/2016 | Gil et al. |
| 2016/0041070 A1 | 2/2016 | Wascat et al. |
| 2016/0048399 A1 | 2/2016 | Shaw |
| 2016/0054284 A1 | 2/2016 | Washburn |
| 2016/0059412 A1 | 3/2016 | Oleynik |
| 2016/0069624 A1 | 3/2016 | Rollins et al. |
| 2016/0071032 A1 | 3/2016 | Hunter |
| 2016/0078695 A1 | 3/2016 | McClintic et al. |
| 2016/0098647 A1 | 4/2016 | Nixon et al. |
| 2016/0104330 A1 | 4/2016 | Rudenko et al. |
| 2016/0153806 A1 | 6/2016 | Ciasulli et al. |
| 2016/0163186 A1 | 6/2016 | Davidson et al. |
| 2016/0171846 A1 | 6/2016 | Brav et al. |
| 2016/0179075 A1 | 6/2016 | Shin et al. |
| 2016/0182309 A1 | 6/2016 | Maturana et al. |
| 2016/0188675 A1 | 6/2016 | Vossler |
| 2016/0192084 A1 | 6/2016 | Oliaei |
| 2016/0196375 A1 | 7/2016 | Nasle |
| 2016/0209831 A1 | 7/2016 | Pal |
| 2016/0219024 A1 | 7/2016 | Verzun et al. |
| 2016/0225372 A1 | 8/2016 | Cheung et al. |
| 2016/0234342 A1 | 8/2016 | Oonk et al. |
| 2016/0245686 A1 | 8/2016 | Pal et al. |
| 2016/0247129 A1 | 8/2016 | Song et al. |
| 2016/0261411 A1 | 9/2016 | Yau et al. |
| 2016/0274558 A1 | 9/2016 | Strohmenger et al. |
| 2016/0282853 A1 | 9/2016 | Michalscheck et al. |
| 2016/0282872 A1 | 9/2016 | Ahmed et al. |
| 2016/0301991 A1 | 10/2016 | Loychik et al. |
| 2016/0328883 A1 | 11/2016 | Parfenov et al. |
| 2016/0333855 A1 | 11/2016 | Lund et al. |
| 2016/0341629 A1 | 11/2016 | Schaefer |
| 2016/0369777 A1 | 12/2016 | Chiang et al. |
| 2016/0378086 A1 | 12/2016 | Plymill et al. |
| 2017/0001308 A1 | 1/2017 | Bataller et al. |
| 2017/0006135 A1 | 1/2017 | Siebel et al. |
| 2017/0011298 A1 | 1/2017 | Pal et al. |
| 2017/0011360 A1 | 1/2017 | Kuffner, Jr. et al. |
| 2017/0012861 A1 | 1/2017 | Blumenthal et al. |
| 2017/0022015 A1 | 1/2017 | Gölü |
| 2017/0030349 A1 | 2/2017 | Bassett et al. |

(56) References Cited

U.S. PATENT DOCUMENTS

| | | |
|---|---|---|
| 2017/0032281 A1 | 2/2017 | Hsu |
| 2017/0038753 A1 | 2/2017 | Shah et al. |
| 2017/0046458 A1 | 2/2017 | Meagher et al. |
| 2017/0061326 A1 | 3/2017 | Talathi et al. |
| 2017/0067860 A1 | 3/2017 | Grabill et al. |
| 2017/0070237 A1 | 3/2017 | Ardalan |
| 2017/0074715 A1 | 3/2017 | Bartos et al. |
| 2017/0075552 A1 | 3/2017 | Berenbaum et al. |
| 2017/0103339 A1 | 4/2017 | Pandit et al. |
| 2017/0103506 A1 | 4/2017 | Dandibhotla et al. |
| 2017/0108406 A1 | 4/2017 | Thomson |
| 2017/0108834 A1 | 4/2017 | Wang et al. |
| 2017/0115899 A1 | 4/2017 | Franke et al. |
| 2017/0130700 A1 | 5/2017 | Sakaguchi et al. |
| 2017/0149605 A1 | 5/2017 | Strasser |
| 2017/0168180 A1 | 6/2017 | Senechal |
| 2017/0173458 A1 | 6/2017 | Billington et al. |
| 2017/0177703 A1 | 6/2017 | Liu |
| 2017/0178311 A1 | 6/2017 | Pal |
| 2017/0180214 A1 | 6/2017 | Azevedo et al. |
| 2017/0187588 A1 | 6/2017 | Nolan et al. |
| 2017/0205451 A1 | 7/2017 | Moinuddin |
| 2017/0207926 A1 | 7/2017 | Gil et al. |
| 2017/0222999 A1 | 8/2017 | Banga et al. |
| 2017/0223026 A1 | 8/2017 | Amiri et al. |
| 2017/0237996 A1 | 8/2017 | Schneider |
| 2017/0238072 A1 | 8/2017 | Mackie et al. |
| 2017/0277800 A1 | 9/2017 | Lucas et al. |
| 2017/0284690 A1 | 10/2017 | Lipanov |
| 2017/0284974 A1 | 10/2017 | Hershey et al. |
| 2017/0286572 A1 | 10/2017 | Hershey et al. |
| 2017/0295057 A1 | 10/2017 | Dost et al. |
| 2017/0300290 A1 | 10/2017 | Hester et al. |
| 2017/0310601 A1 | 10/2017 | Yu et al. |
| 2017/0313332 A1 | 11/2017 | Paget et al. |
| 2017/0323240 A1 | 11/2017 | Johnson et al. |
| 2017/0323274 A1 | 11/2017 | Johnson et al. |
| 2017/0338832 A1 | 11/2017 | Voinigescu et al. |
| 2017/0352010 A1 | 12/2017 | Son et al. |
| 2017/0357233 A1 | 12/2017 | Gurciullo |
| 2017/0374490 A1 | 12/2017 | Schoppmeier |
| 2018/0005307 A1 | 1/2018 | Abedin |
| 2018/0007131 A1 | 1/2018 | Cohn et al. |
| 2018/0012270 A1 | 1/2018 | Hill et al. |
| 2018/0052428 A1 | 2/2018 | Abramov |
| 2018/0054376 A1 | 2/2018 | Hershey et al. |
| 2018/0067779 A1 | 3/2018 | Pillalamarri et al. |
| 2018/0088206 A1 | 3/2018 | Meadow |
| 2018/0094953 A1 | 4/2018 | Colson et al. |
| 2018/0130260 A1 | 5/2018 | Schmirler et al. |
| 2018/0137219 A1 | 5/2018 | Goldfarb et al. |
| 2018/0144243 A1 | 5/2018 | Hsieh et al. |
| 2018/0188704 A1 | 7/2018 | Cella et al. |
| 2018/0188714 A1* | 7/2018 | Cella ................ G05B 19/0423 |
| 2018/0198641 A1 | 7/2018 | Gilani et al. |
| 2018/0210436 A1 | 7/2018 | Burd et al. |
| 2018/0217585 A1 | 8/2018 | Giering et al. |
| 2018/0255381 A1 | 9/2018 | Cella et al. |
| 2018/0260733 A1 | 9/2018 | Abado et al. |
| 2018/0261344 A1 | 9/2018 | Sapia |
| 2018/0275675 A1 | 9/2018 | Loosararian et al. |
| 2018/0284755 A1 | 10/2018 | Cella et al. |
| 2018/0300124 A1 | 10/2018 | Malladi et al. |
| 2018/0321667 A1 | 11/2018 | Cella et al. |
| 2018/0330083 A1 | 11/2018 | Abbaszadeh et al. |
| 2018/0334755 A1 | 11/2018 | Civiero et al. |
| 2018/0367466 A1 | 12/2018 | Shear et al. |
| 2018/0375743 A1 | 12/2018 | Lee et al. |
| 2019/0020659 A1 | 1/2019 | Loni et al. |
| 2019/0035101 A1 | 1/2019 | Kwant et al. |
| 2019/0042988 A1 | 2/2019 | Brown et al. |
| 2019/0045207 A1 | 2/2019 | Chen et al. |
| 2019/0049929 A1 | 2/2019 | Good et al. |
| 2019/0056107 A1 | 2/2019 | Desai et al. |
| 2019/0064034 A1 | 2/2019 | Fayfield et al. |
| 2019/0088101 A1 | 3/2019 | Tunnell et al. |
| 2019/0102360 A1 | 4/2019 | SayyarRodsari et al. |
| 2019/0121334 A1 | 4/2019 | Song et al. |
| 2019/0121340 A1* | 4/2019 | Cella .................. G01M 13/045 |
| 2019/0138906 A1 | 5/2019 | Cakmak et al. |
| 2019/0146470 A1 | 5/2019 | Akkaram et al. |
| 2019/0156443 A1 | 5/2019 | Hall |
| 2019/0173109 A1 | 6/2019 | Wang |
| 2019/0179647 A1 | 6/2019 | Deka et al. |
| 2019/0184563 A1 | 6/2019 | Krautwurm |
| 2019/0236489 A1 | 8/2019 | Koudal et al. |
| 2019/0236527 A1 | 8/2019 | Bhaumik et al. |
| 2019/0281132 A1 | 9/2019 | Sethuraman et al. |
| 2019/0294485 A1 | 9/2019 | Kukreja et al. |
| 2019/0302712 A1 | 10/2019 | Neti et al. |
| 2019/0310281 A1 | 10/2019 | Hayzen et al. |
| 2019/0317459 A1 | 10/2019 | Banerjee et al. |
| 2019/0317488 A1 | 10/2019 | Al-Maghlouth et al. |
| 2019/0318660 A1 | 10/2019 | Kimoto |
| 2019/0323922 A1 | 10/2019 | Acur |
| 2019/0324434 A1 | 10/2019 | Cella et al. |
| 2019/0325668 A1 | 10/2019 | Cole et al. |
| 2019/0339209 A1 | 11/2019 | Du et al. |
| 2019/0339678 A1 | 11/2019 | Biernat et al. |
| 2019/0346837 A1 | 11/2019 | Dagnino et al. |
| 2019/0349676 A1 | 11/2019 | Chen et al. |
| 2019/0354922 A1 | 11/2019 | Berti et al. |
| 2019/0358730 A1 | 11/2019 | Nadler et al. |
| 2019/0385074 A1 | 12/2019 | Bostick et al. |
| 2020/0012265 A1 | 1/2020 | Thomsen et al. |
| 2020/0067789 A1 | 2/2020 | Khuti et al. |
| 2020/0068759 A1 | 2/2020 | Cvijetinovic et al. |
| 2020/0103888 A1 | 4/2020 | Sayyarrodsari et al. |
| 2020/0106864 A1 | 4/2020 | Denison et al. |
| 2020/0125078 A1 | 4/2020 | Koudal et al. |
| 2020/0133255 A1 | 4/2020 | Cella et al. |
| 2020/0159961 A1 | 5/2020 | Smith et al. |
| 2020/0167652 A1 | 5/2020 | Huang et al. |
| 2020/0175765 A1 | 6/2020 | Mcadam et al. |
| 2020/0201875 A1 | 6/2020 | Wu et al. |
| 2020/0225655 A1 | 7/2020 | Cella et al. |
| 2020/0265329 A1 | 8/2020 | Thomsen et al. |
| 2020/0265535 A1 | 8/2020 | Okada et al. |
| 2020/0285988 A1 | 9/2020 | Saha et al. |
| 2020/0294401 A1 | 9/2020 | Kerecsen |
| 2020/0310394 A1 | 10/2020 | Wouhaybi et al. |
| 2020/0401944 A1 | 12/2020 | Sundström et al. |
| 2021/0029029 A1 | 1/2021 | Mehmedagic et al. |
| 2021/0157312 A1 | 5/2021 | Cella et al. |
| 2021/0182690 A1 | 6/2021 | Jordan et al. |
| 2021/0272467 A1 | 9/2021 | Yang et al. |
| 2021/0287459 A1 | 9/2021 | Cella et al. |
| 2021/0294306 A1 | 9/2021 | Deokar et al. |
| 2021/0342836 A1 | 11/2021 | Cella et al. |
| 2021/0360070 A1 | 11/2021 | Cella et al. |
| 2021/0374936 A1 | 12/2021 | Koopman et al. |
| 2022/0003542 A1 | 1/2022 | Napier et al. |
| 2022/0046033 A1 | 2/2022 | Tang |
| 2022/0067230 A1 | 3/2022 | Harvey et al. |
| 2022/0075515 A1 | 3/2022 | Floren et al. |
| 2022/0101192 A1 | 3/2022 | Patel |
| 2022/0108262 A1 | 4/2022 | Cella et al. |
| 2022/0163960 A1 | 5/2022 | Cella et al. |
| 2022/0191282 A1 | 6/2022 | Cella et al. |
| 2022/0198562 A1 | 6/2022 | Cella et al. |
| 2022/0208319 A1 | 6/2022 | Ansari et al. |
| 2022/0214671 A1 | 7/2022 | Alt et al. |
| 2022/0236709 A1 | 7/2022 | Cella et al. |
| 2022/0247971 A1 | 8/2022 | McNelley et al. |
| 2022/0366494 A1 | 11/2022 | Cella et al. |
| 2022/0390997 A1 | 12/2022 | Hendriks et al. |
| 2022/0414287 A1 | 12/2022 | Strafer et al. |
| 2023/0173395 A1 | 6/2023 | Cella et al. |
| 2023/0176557 A1 | 6/2023 | Cella et al. |
| 2023/0186201 A1 | 6/2023 | Cella et al. |
| 2023/0196230 A1 | 6/2023 | Cella et al. |
| 2023/0206329 A1 | 6/2023 | Cella et al. |
| 2023/0281527 A1 | 9/2023 | Cella et al. |

(56) References Cited

U.S. PATENT DOCUMENTS

| | | |
|---|---|---|
| 2023/0419304 A1 | 12/2023 | Cella et al. |
| 2024/0004514 A1 | 1/2024 | Sarin et al. |
| 2024/0310860 A1 | 9/2024 | Van De Velde et al. |

FOREIGN PATENT DOCUMENTS

| | | |
|---|---|---|
| CA | 102662339 A | 9/2012 |
| CN | 1319967 A | 10/2001 |
| CN | 1414561 A | 4/2003 |
| CN | 2545752 Y | 4/2003 |
| CN | 1716827 A | 1/2006 |
| CN | 2751314 Y | 1/2006 |
| CN | 2911636 Y | 6/2007 |
| CN | 201138454 Y | 10/2008 |
| CN | 101403684 A | 4/2009 |
| CN | 101476745 A | 7/2009 |
| CN | 101694577 A | 4/2010 |
| CN | 102052963 A | 5/2011 |
| CN | 202583862 U | 12/2012 |
| CN | 102914432 A | 2/2013 |
| CN | 103098393 A | 5/2013 |
| CN | 103220552 A | 7/2013 |
| CN | 103458795 A | 12/2013 |
| CN | 103928836 A | 7/2014 |
| CN | 104579552 A | 4/2015 |
| CN | 105208681 A | 12/2015 |
| CN | 105264770 A | 1/2016 |
| CN | 105302016 A | 2/2016 |
| CN | 105320839 A | 2/2016 |
| CN | 108919760 A | 11/2018 |
| CN | 109356789 A | 2/2019 |
| CN | 110376605 A | 10/2019 |
| CN | 110795874 A | 2/2020 |
| CN | 307718753 | 12/2022 |
| CN | 307838992 | 2/2023 |
| CN | 308239071 | 9/2023 |
| CN | 308239072 | 9/2023 |
| CN | 308328891 | 11/2023 |
| CN | 308440210 | 1/2024 |
| CN | 308511536 | 3/2024 |
| CN | 308644905 | 5/2024 |
| DE | 29806131 U1 | 7/1998 |
| EM | 0088744240001 | 3/2022 |
| EM | 0088744240003 | 3/2022 |
| EM | 0088744240004 | 3/2022 |
| EP | 0897111 A2 | 2/1999 |
| EP | 1080347 A1 | 3/2001 |
| EP | 2983056 A1 | 2/2016 |
| EP | 3287405 A1 | 2/2018 |
| GB | 2395827 A | 6/2004 |
| GB | 2513456 A | 10/2014 |
| JP | S5913084 B2 | 3/1984 |
| JP | H06137164 A | 5/1994 |
| JP | H0927592 A | 1/1997 |
| JP | H10152297 A | 6/1998 |
| JP | H1186178 A | 3/1999 |
| JP | H11118661 A | 4/1999 |
| JP | 2001133364 A | 5/2001 |
| JP | 2001160097 A | 6/2001 |
| JP | 2003150237 A | 5/2003 |
| JP | 2003337962 A | 11/2003 |
| JP | 2005258585 A | 9/2005 |
| JP | 2006522396 A | 9/2006 |
| JP | 2006338519 A | 12/2006 |
| JP | 2008232934 A | 10/2008 |
| JP | 2010074876 A | 4/2010 |
| JP | 2013073414 A | 4/2013 |
| JP | 2013250928 A | 12/2013 |
| JP | 2014163539 A | 9/2014 |
| JP | 2014203274 A | 10/2014 |
| JP | 2015128967 A | 7/2015 |
| JP | 2015209205 A | 11/2015 |
| JP | 5849167 B1 | 1/2016 |
| JP | 2018005433 A | 1/2018 |
| JP | 2018022372 A | 2/2018 |
| JP | 2018142836 A | 9/2018 |
| JP | 2018533105 A | 11/2018 |
| TW | 201802650 A | 1/2018 |
| WO | 9412917 A1 | 6/1994 |
| WO | 0233558 A1 | 4/2002 |
| WO | 2003020571 A1 | 3/2003 |
| WO | 2003020572 A1 | 3/2003 |
| WO | 2006116849 A1 | 11/2006 |
| WO | 2009133161 A2 | 11/2009 |
| WO | 2010138831 A2 | 12/2010 |
| WO | 2014054858 A1 | 4/2014 |
| WO | 2015191079 A1 | 12/2015 |
| WO | 2016068929 A1 | 5/2016 |
| WO | 2016137848 A1 | 9/2016 |
| WO | 2017067721 A1 | 4/2017 |
| WO | 2017190795 A1 | 11/2017 |
| WO | 2018084307 A1 | 5/2018 |
| WO | 2018111368 A1 | 6/2018 |
| WO | 2019028269 A2 | 2/2019 |
| WO | 2020146036 A1 | 7/2020 |
| WO | 2020227429 A1 | 11/2020 |

OTHER PUBLICATIONS

International Search Report and Written Opinion for International Application No. PCT/US2017/031721 dated Sep. 11, 2017, 23 pages.

Extended European Search Report dated Apr. 14, 2020 for EP Application No. 17796676.9, 10 pages.

English machine translation provided for CN101476745A.

English machine translation provided for JP2014163539A.

Extended European Search Report dated Jan. 24, 2020 for European Application No. 17748108.2, 8 pages.

Reinhardt, A., "Designing sensor networks for smart spaces, Unified Interfacing and Energy-Efficient Communication Between Wireless Sensor and Actuator Nodes," Vom Fachbereich Elektrotechnik und Informationstechnik der Technischen Universitat Darmstadt, 2011, 165 pages.

English language abstract provided for CN101694577A.

English language abstract provided for CN103220552A.

English language abstract provided for CN102662339A.

English language abstract provided for JPS5913084B2.

English language abstract provided for CN104579552A.

English language abstract provided for CN1319967A.

English language abstract provided for CN1716827A.

English language abstract provided for CN201138454Y.

English language abstract provided for CN2751314Y.

PCT International Search Report and Written Opinion dated Mar. 21, 2019 for International Application No. PCT/US2018/045036, 187 pages.

PCT International Search Report and Written Opinion dated Apr. 2, 2019 for International Application No. PCT/US2018/060043, 29 pages.

Abstract of Cachada et al., "Maintenance 4.0: Intelligent and Predictive Maintenance System Architecture," Oct. 25, 2018, 1 page.

Alkhadafe, H., "Computational Intelligence for Fault Diagnosis in Gearbox Systems," Thesis, Mar. 2015, 243 pages.

Cachada, A. et al., "Maintenance 4.0: Intelligent and Predictive Maintenance System Architecture," 2018 IEEE 23rd International Conference on Emerging Technologies and Factory Automation (ETFA), Oct. 25, 2018, pp. 139-146.

Chen, Y. et al., "Optical design of the Fresnel lens for LED-driven flashlight," Applied Optics, vol. 55, No. 4, Feb. 1, 2016, pp. 712-721.

Devi, S. et al., "A Comparative Study Between Vibration And Acoustic Signals In HTC Cooling Pump And Chilling Pump," IACSIT International Journal of Engineering and Technology, vol. 2, No. 3, Jun. 2010, pp. 273-277.

Extended European Search Report dated Jan. 4, 2023 for EP Application No. 20802722.7, 8 pages.

Geropp, B., "Envelope Analysis - A Signal Analysis Technique For Early Detection And Isolation Of Machine Faults," FAC Fault

(56) References Cited

OTHER PUBLICATIONS

Detection, Supervision and Safety for Technical Processes, Kingston Upon Hull, UK, 1997, pp. 977-981.
Gerth, B., "University of Victoria Issues with the Use of the BlackBerry PDA at UVic And a Proposal to Evaluate Alternatives," Computing User Services, Nov. 29, 2004, pp. 1-9.
MV Corporation, "All about Vibration Measuring Systems," May 20, 2017 [retrieved on 2021-03-13]. Retrieved from the Internet: . (Year: 2017), 5 pages.
Kamaras, K. et al., "Vibration Analysis of Rolling Element Bearings Using Spectral Kurtosis and Envelope Analysis," Jan. 2016, FNT @Sea Services LTD., 14 pages.
Langone, R. et al., "LS-SVM Based Spectral Clustering and Regression for Predicting Maintenance of Industrial Machines," Engineering Applications of Artificial Intelligence, vol. 37, 2015, pp. 268-278.
Monostori, L. et al., "Cyber-Physical Systems In Manufacturing," CIRP Annals—Manufacturing Technology, vol. 65, 2016, pp. 621-641.
MSA, "MSA Chips™ Communication System," Product Brochure, Dec. 2009, pp. 1-6.
Munteanu, A.D., "The Internet Of Things—Business Transformation," Annals. Computer Science Series, vol. 13, Dec. 2015, pp. 103-106.
Pan, J. et al., "Future Edge Cloud and Edge Computing for Internet of Things Applications," IEEE Internet Of Things Journal, vol. 5, No. 1, Feb. 2018, pp. 439-449.
PCT International Search Report and Written Opinion dated Aug. 14, 2019 for International Application No. PCT/US2019/020044, 78 pages.
PCT International Search Report and Written Opinion dated Mar. 15, 2021 for International Application No. PCT/US2020/062384, 12 pages.
PCT International Search Report and Written Opinion dated May 11, 2020 for International Application No. PCT/US2019/059088, 22 pages.
PCT International Search Report and Written Opinion mailed Aug. 4, 2020 for International Application No. PCT/US2020/031706, 24 pages.
PCT International Search Report and Written Opinion mailed Jan. 25, 2022 for International Application No. PCT/US2021/053339, 31 pages.
Pérez, E.T., "Study of vibration severity assessment for Machine Tool spindles within Condition Monitoring," Autumn 2015, M.S. Degree Thesis, Production Engineering and Management Platform, Stockholm, Sweden, 147 pages.
Pradeep, "Renault partners with Microsoft for blockchain-based digital car maintenance book," MSPoweruser, Jul. 27, 2017, https://mspoweruser.com/renault-partners-microsoft-blockchain-based-digital-car-maintenance-book.com, 4 pages.
Product: FLUKE 63/66/68 Infrared Thermometers User Manual, Released for Sale Sep. 2004, Rev. 3, 6/09, 35 pages.
Qi, G. et al., "Blackboard Mechanism Based Ant Colony Theory for Dynamic Deployment of Mobile Sensor Networks," Journal of Bionic Engineering, vol. 5, Issue 3, Sep. 2008, pp. 197-203.
Sibul, L., "Adaptive Signal Processing," Feb. 12, 2007, 85 pages.
Supplementary Partial EP Search Report dated Aug. 26, 2022 for EP Application No. 19908436, 17 pages.
Supplementary Partial European Search Report dated Feb. 3, 2022 for EP Application No. 19799558.2, 12 pages.
Tiwari, A. et al., "Energy-Efficient Wireless Sensor Network Design and Implementation for Condition-Based Maintenance," ACM Transactions on Sensor Networks, vol. 3, No. 1, Article 1, Published: Mar. 2007, pp. 1-23.
Wang, Y. et al., "Frontier-based Multi-Robot Map Exploration Using Particle Swarm Optimization," 2011 IEEE Symposium on Swarm Intelligence, Jul. 2011, 6 pages.
Yue, Y. et al., "Optimization-Based Artificial Bee Colony Algorithm for Data Collection in Large-Scale Mobile Wireless Sensor Networks," Journal of Sensors, http://dx.doi.org/10.1155/2016/7057490, vol. 2016, May 2016, 13 pages.
Teti, R. et al., "Advanced monitoring of machining operations," CIRP Annals—Manufacturing Technology, vol. 59, 2010, pp. 717-739.
Clemens, D., "MalNet Maltego Transforms with Proofpoint Data," May 2016, https://blog.shadowdragon.io/malnet-maltego-transforms-with-proofpoint-data, 2 pages.
Extended European Search Report dated Feb. 2, 2024 for EP Application No. 23204985.8, 9 pages.
Hartmann, A., Creating interactive, web-based and data-enriched maps with the Systems Biology Graphical Notation, Mar. 2012, https://www.researchgate.net/figure/Screenshot-of-the-SBGN-ED-desktop-1-side-panel-2-graph-editor-view-3-toolbar_fig11_221881695, 1 page.
Amor, H.B. et al., "Interaction Primitives for Human-Robot Cooperation Tasks," 2014 IEEE International Conference on Robotics & Automation (ICRA), Hong Kong, CN, May 31-Jun. 7, 2014, 7 pages.
C3.ai, "Digital Twins—The Foundation of AI-Driven Asset Reliability," Oct. 2022, https://developer.c3.ai/blog/reliability/digital-twins-foundation-ai-driven-asset-reliability, 4 pages.
Dillmann, R., "Teaching and learning of robot tasks via observation of human performance," Science Direct—Robotics and Autonomous Systems, vol. 47, 2004, pp. 109-116.
Extended European Search Report dated Mar. 1, 2024 for EP Application No. 20894311.8, 12 pages.
Girroir, J., "Visualizing Azure Digital Twins in 3D," Oct. 2021, https://techcommunity.microsoft.com/t5/internet-of-things-blog/visualizing-azure-digital-twins-in-3d/ba-p/2898159, 1 page.
Harvey, T., "Transforming Automation User Experience with Deep Digital Twins," Oct. 2019, https://medium.com/passivelogic/transforming-automation-user-experience-with-deep-digital-twins-30f2922b39db, 2 pages.
Najmaei, N. et al., "Applications of Artificial Intelligence in Safe Human-Robot Interactions," IEEE Transactions On Systems, Man, and Cybernetics—Parr B: Cybernetics, vol. 41, No. 2, Apr. 2011, pp. 448-459.
Rouse, M., "Multilayer Perceptron," Techopedia, Mar. 2017, https://www.techopedia.com/definition/20879/multilayer-perceptron-mlp, 4 pages.
Strong Force Catalyst, "AI-Driven Digital Twin," May 2024, https://strongforcecatalyst.com/#digitaltwinvideo, 1 page.
Van Schalkwyk, P., "Digital Twin: Your Most Productive Remote Worker," Mar. 2020, https://xmpro.com/digital-twin-your-most-productive-remote-worker/, 3 pages.
Zhang, H. et al., "A Generic Data Analytics System For Manufacturing Production," Big Data Mining and Analytics, vol. 1, No. 2, Jun. 2018, pp. 160-171.
Prado, J.A. et al., "Visuo-auditory Multimodal Emotional Structure to Improve Human-Robot-Interaction," Int J Soc Robot, Dec. 2011, vol. 4, pp. 29-51.
Ramik, D.M. et al., "A Soft-Computing basis for robots' cognitive autonomous learning," Soft Comput, vol. 19, Oct. 2014, pp. 2407-2421.
Russell, E., "Real-Time Topic and Sentiment Analysis in Human-Robot Conversation," Dec. 2015, Master's Theses (2009), Marquette University, 91 pages.
Sarvadevabhatla, R. et al., "Extended duration human-robot interaction: tools and analysis," 19th IEEE International Symposium on Robot and Human Interactive Communication, Sep. 2010, pp. 7-14.
Tzafestas, S., "Intelligent Systems, Control and Automation: Science and Engineering," Sociorobot World, vol. 80, 2016, 228 pages.
Extended European Search Report dated Nov. 11, 2024 for EP Application No. 24195163.1, 10 pages.
Extended European Search Report dated Oct. 16, 2024 for EP Application No. 24186423.0, 12 pages.
Schuh, G. et al., "Systematization models for taylor-made sensor system applications and sensor data fit in production," Smart Sys Tech, Jun. 2015, European Conference on Smart Objects, Systems and Technologies, pp. 1-8.

(56) References Cited

OTHER PUBLICATIONS

Eid, M.A. et al., "Affective Haptics: Current Research and Future Directions," IEEE Access, vol. 4, Nov. 2015, pp. 26-40.

* cited by examiner

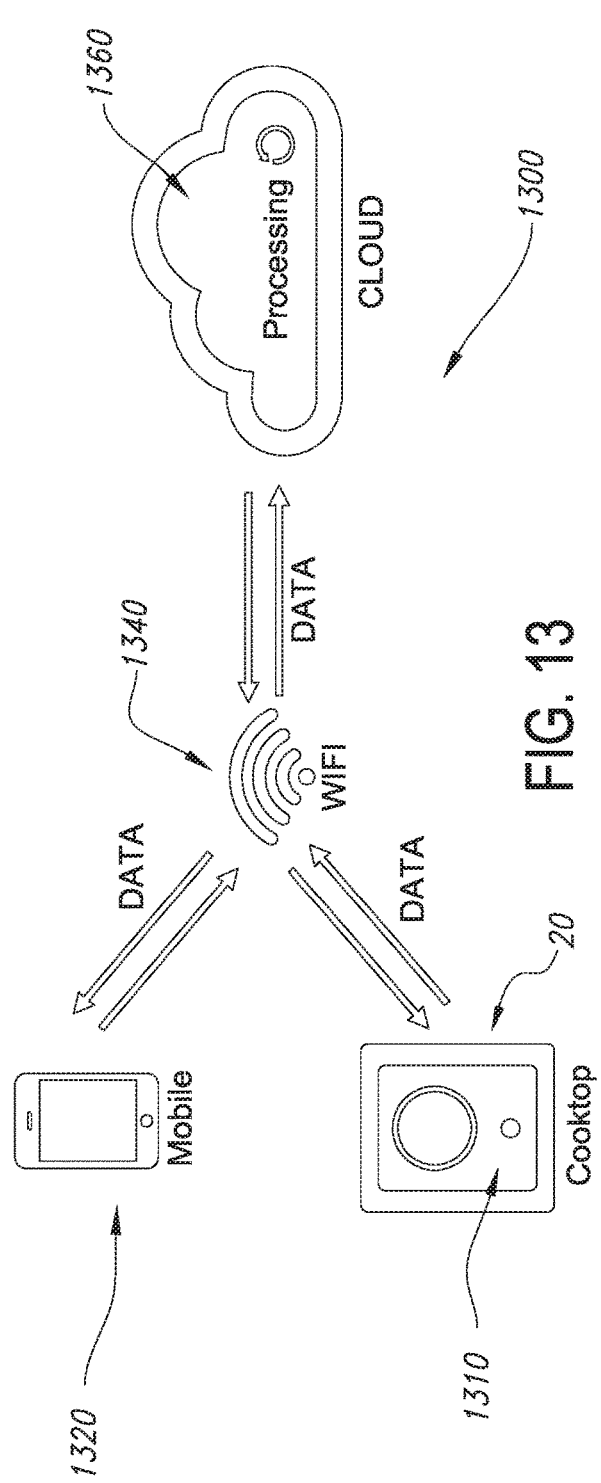
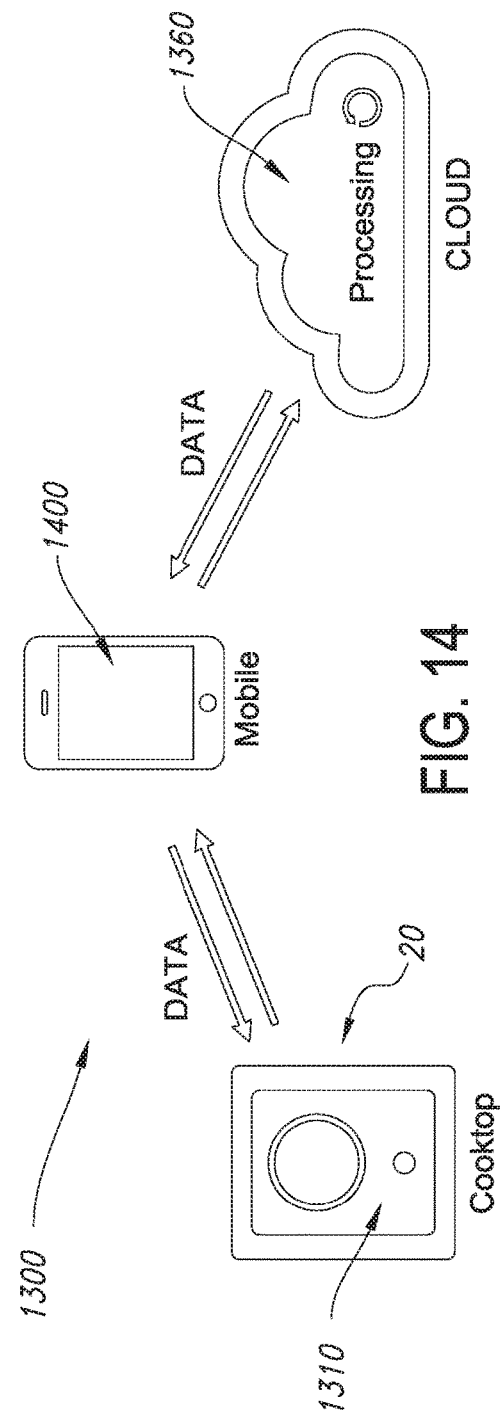
FIG. 13
FIG. 14

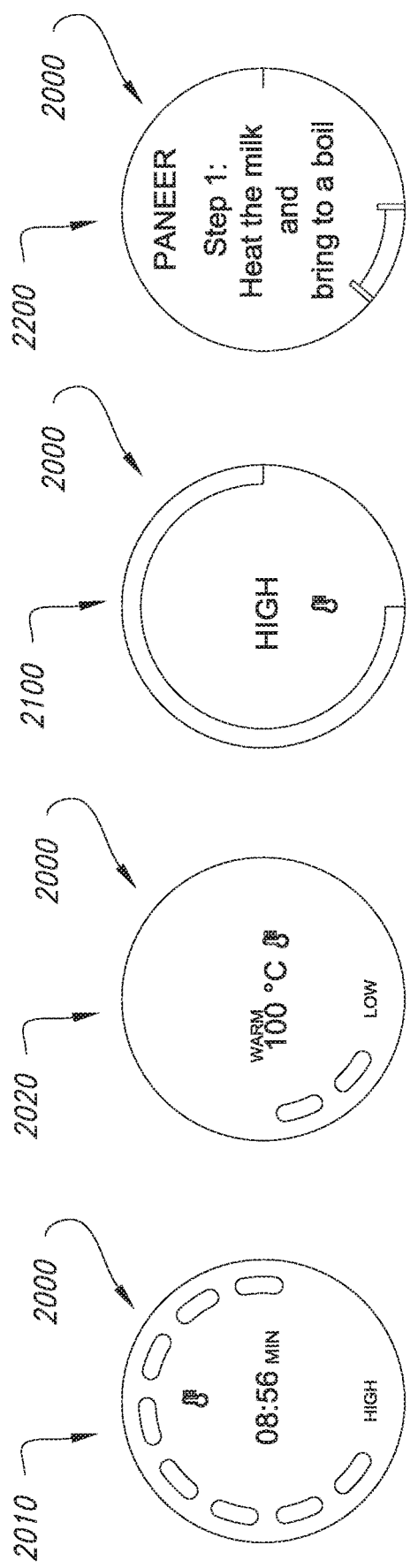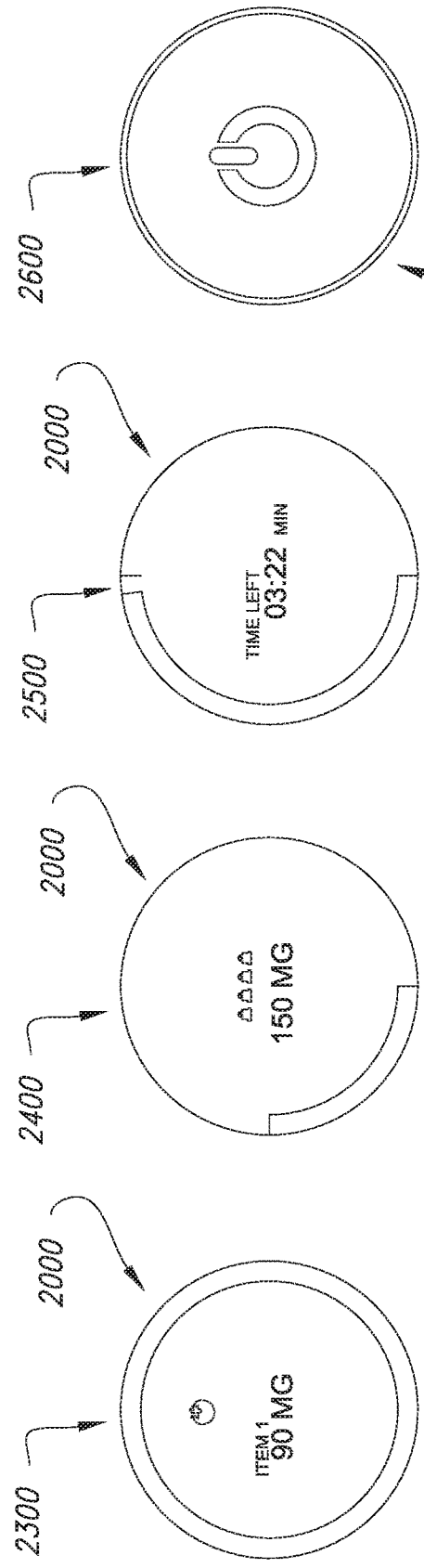

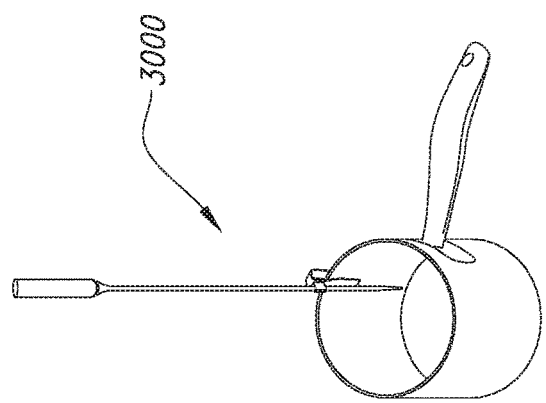
FIG. 30
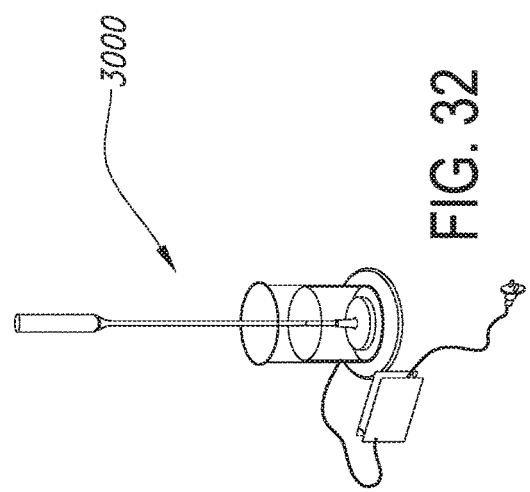
FIG. 32
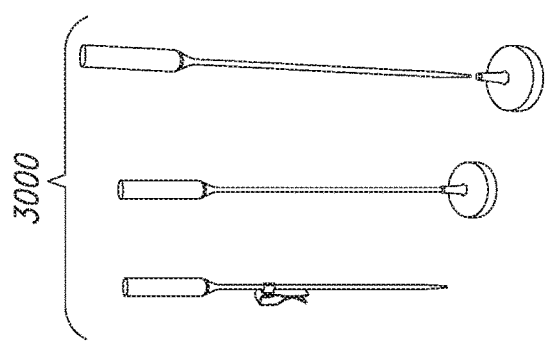
FIG. 29
FIG. 31

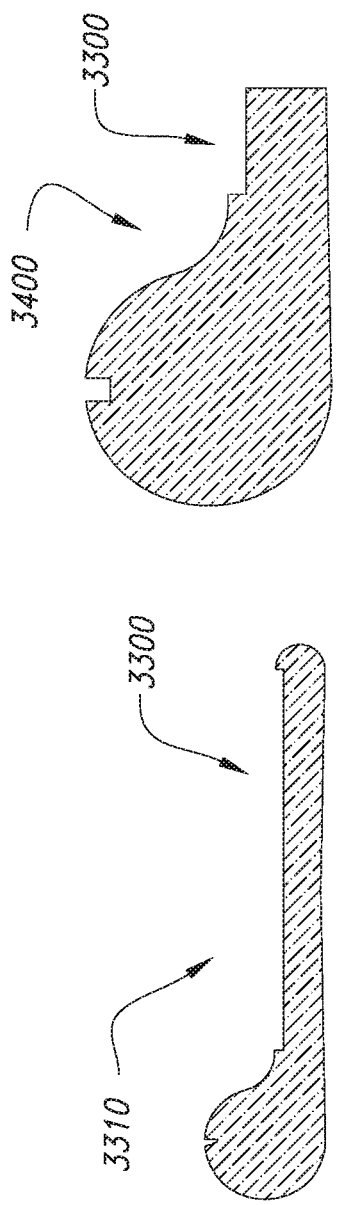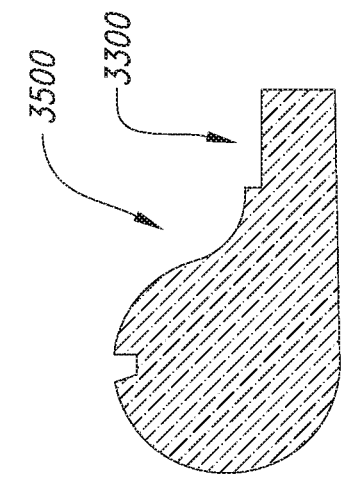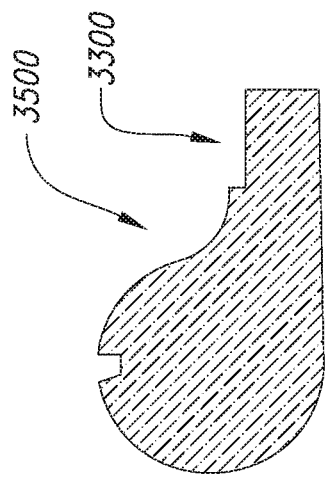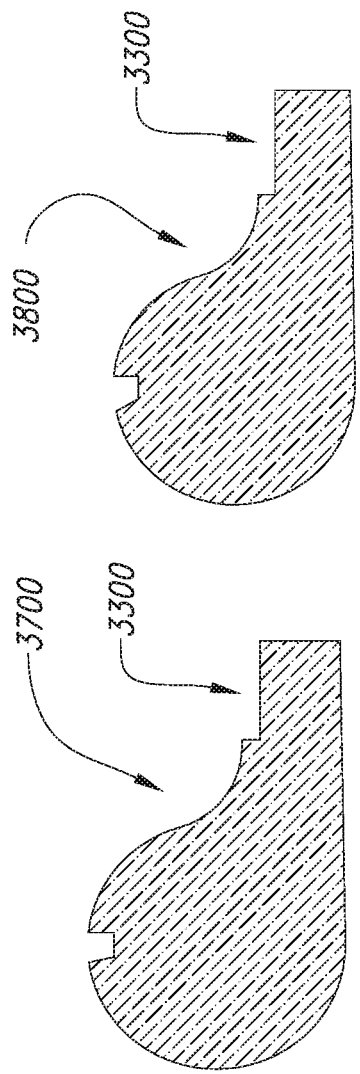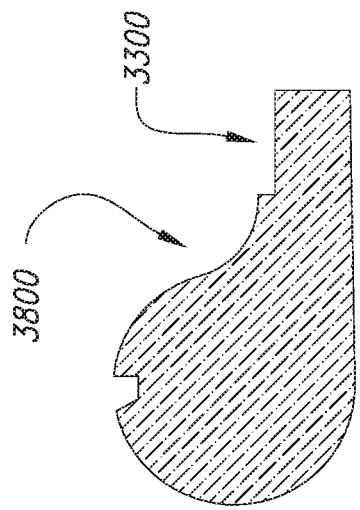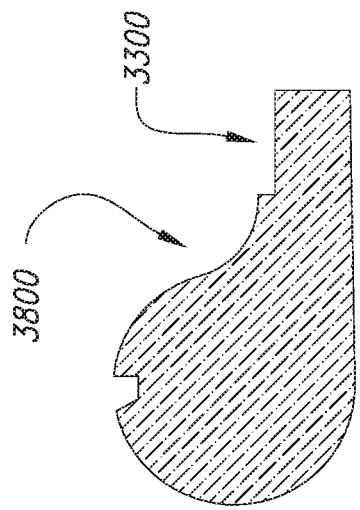

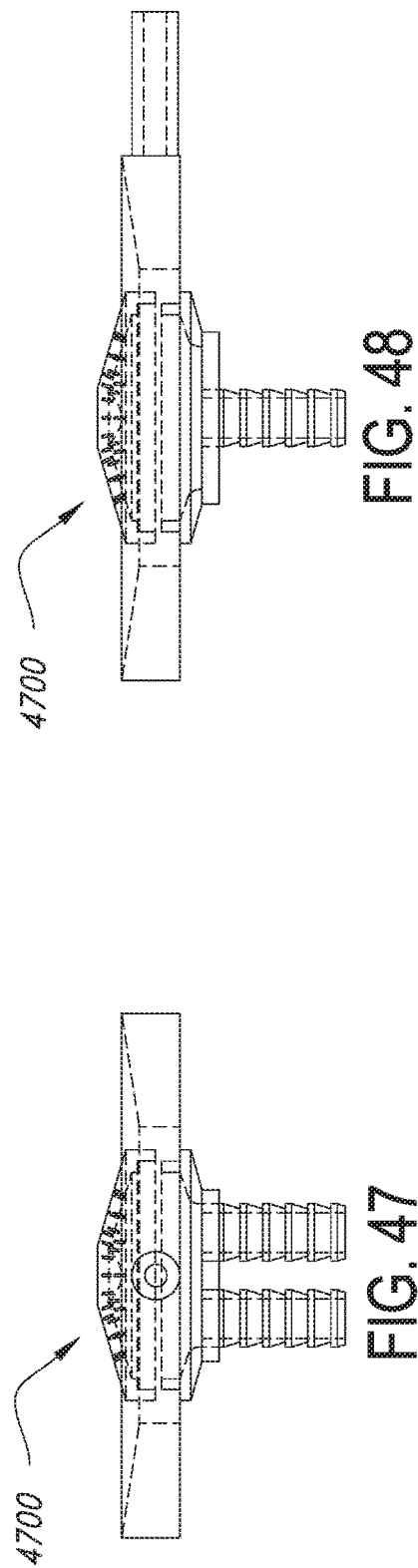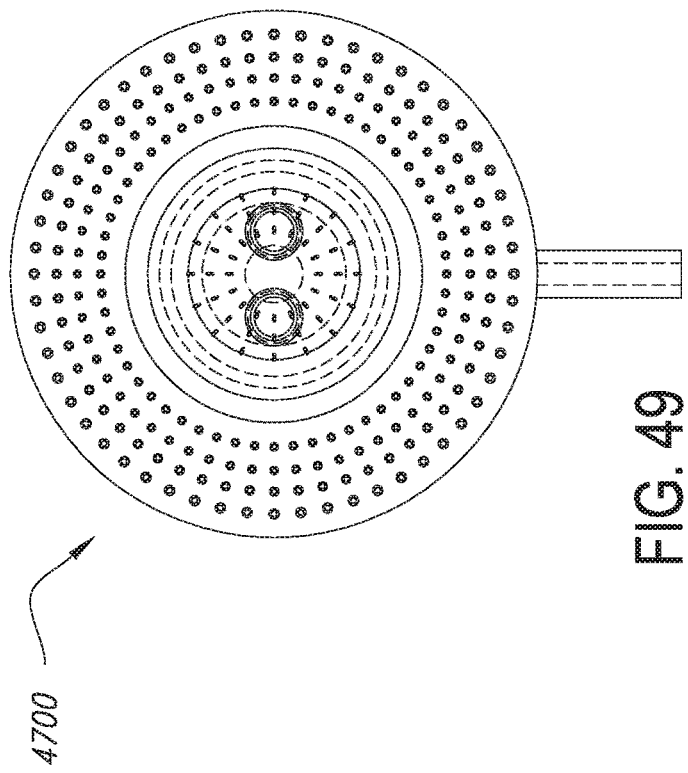
FIG. 48
FIG. 47
FIG. 49

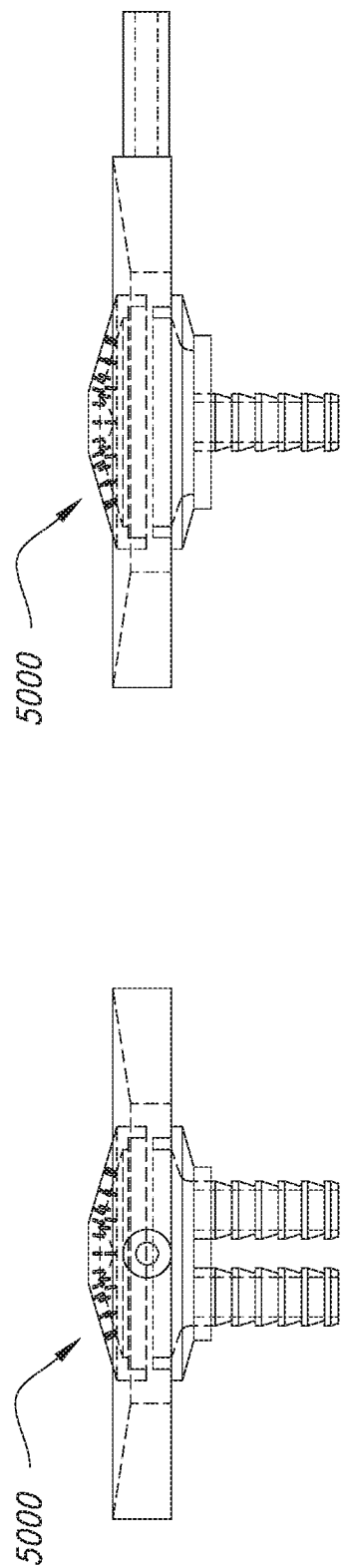
FIG. 51
FIG. 50
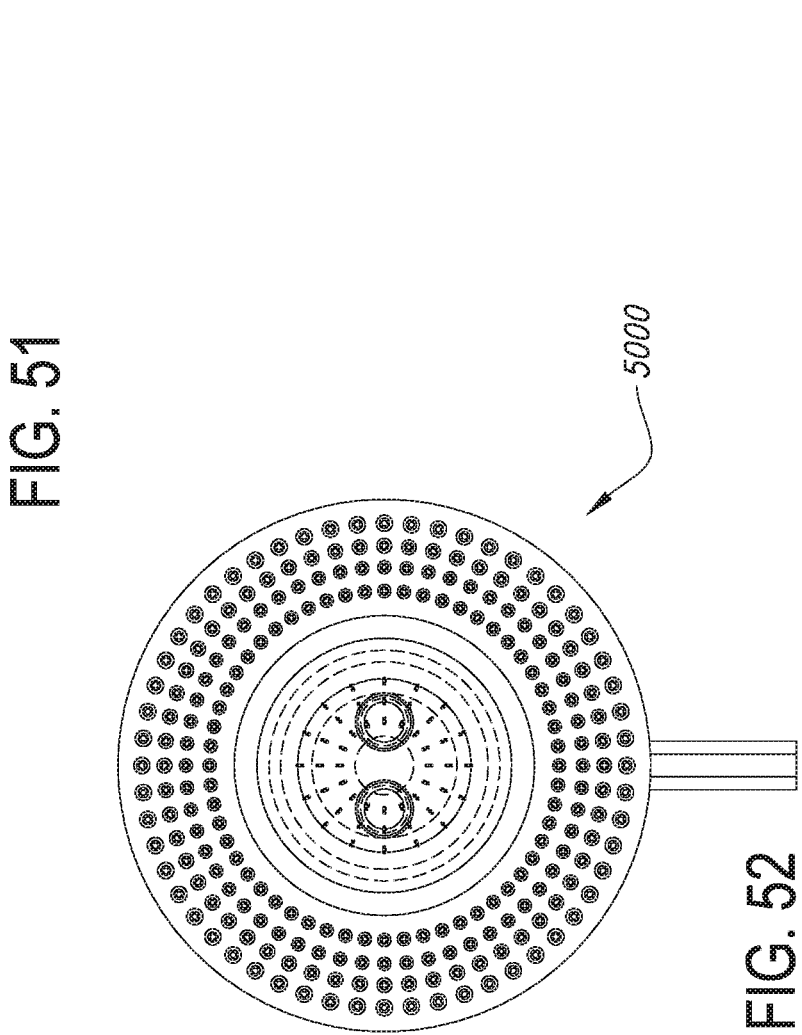
FIG. 52

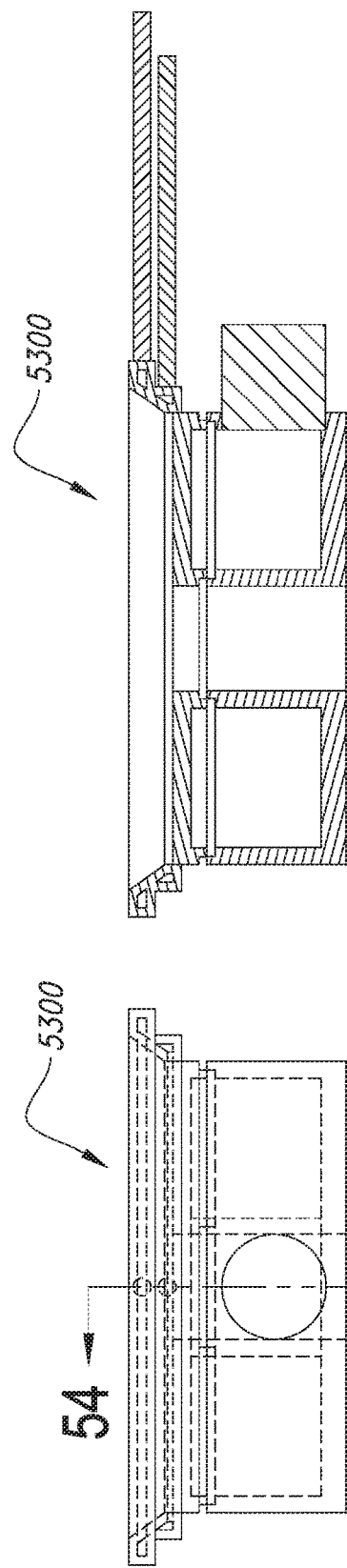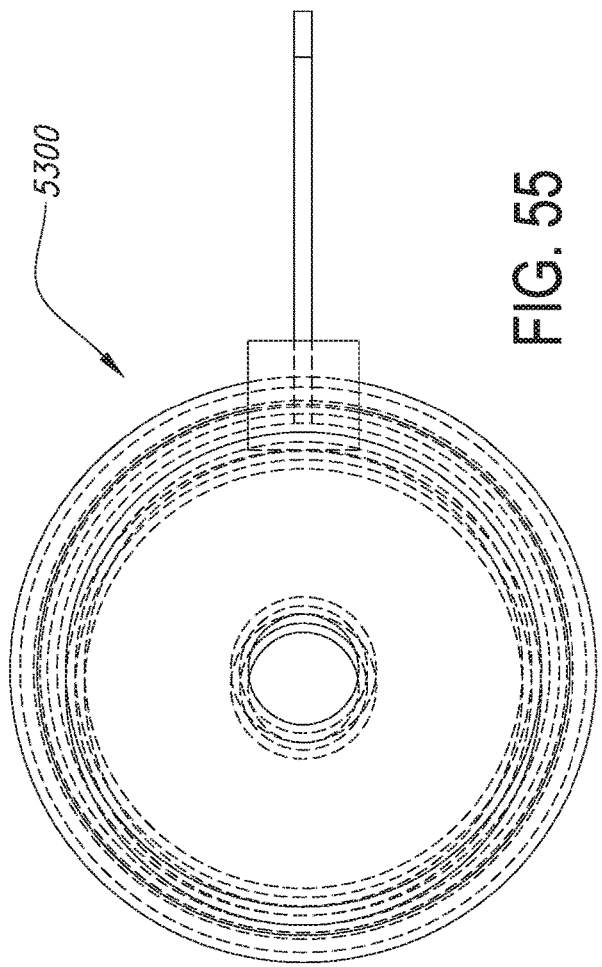
FIG. 53
FIG. 54
FIG. 55

INDUSTRIAL INTERNET OF THINGS SMART HEATING SYSTEMS AND METHODS THAT PRODUCE AND USE HYDROGEN FUEL

CROSS-REFERENCE TO RELATED APPLICATIONS

This application is a bypass continuation-in-part of International Application No. PCT/US2017/016113 filed Feb. 2, 2017, published as WO/2017/136489 on Aug. 10, 2017, which claims priority to Republic of India Provisional Pat. App. No. 201631003869, filed Feb. 3, 2016, each entitled SMART COOKTOP SYSTEM THAT PRODUCES AND USES HYDROGEN FUEL.

This application claims the benefit of U.S. Provisional Pat. App. No. 62/540,559, filed Aug. 2, 2017, entitled METHODS AND SYSTEM FOR THE INDUSTRIAL INTERNET OF THINGS; U.S. Provisional Pat. App. No. 62/540,512, filed Aug. 2, 2017, entitled SYSTEMS AND METHODS FOR SMART HEATING SYSTEM THAT PRODUCES AND USES HYDROGEN FUEL; U.S. Provisional Pat. App. No. 62/562,487, filed Sep. 24, 2017, entitled METHODS AND SYSTEMS FOR THE INDUSTRIAL INTERNET OF THINGS; and U.S. Provisional Pat. App. No. 62/583,483, filed Nov. 8, 2017, entitled METHODS AND SYSTEMS FOR THE INDUSTRIAL INTERNET OF THINGS.

This application is also a bypass continuation-in-part of International Application No. PCT/US2017/031721 filed May 9, 2017, published as WO/2017/196821 on Nov. 16, 2017, which claims priority to U.S. Provisional Pat. App. No. 62/333,589, filed 9 May 2016, entitled STRONG FORCE INDUSTRIAL IOT MATRIX; U.S. Provisional Pat. App. No. 62/350,672, filed 15 Jun. 2016, entitled STRATEGY FOR HIGH SAMPLING RATE DIGITAL RECORDING OF MEASUREMENT WAVEFORM DATA AS PART OF AN AUTOMATED SEQUENTIAL LIST THAT STREAMS LONG-DURATION AND GAP-FREE WAVEFORM DATA TO STORAGE FOR MORE FLEXIBLE POST-PROCESSING; U.S. Provisional Pat. App. No. 62/412,843, filed 26 Oct. 2016, entitled METHODS AND SYSTEMS FOR THE INDUSTRIAL INTERNET OF THINGS; and U.S. Provisional Pat. App. No. 62/427,141, filed 28 Nov. 2016, entitled METHODS AND SYSTEMS FOR THE INDUSTRIAL INTERNET OF THINGS.

All the above applications are hereby incorporated by reference as if fully set forth herein.

BACKGROUND

This disclosure relates to the field of heating, and more particularly to the field of cooking and recipes, including by use of intelligent devices.

With the emergence of the Internet of Things ("IoT"), opportunities exist for unlocking value surrounding a wide range of devices. To date, such opportunities have been limited for many users, particularly in rural areas of developing countries, by the absence of robust energy and communications infrastructure. The same problems with infrastructure also limit the ability of users to access more basic features of certain devices; for example, rather than using modern cooking systems, such as with gas burners, many rural users still cook over fires, using wood or other biofuels. A need exists for devices that meet basic needs, such as for modern cooking capability, without reliance on infrastructure, and an opportunity exists to expand the capabilities of basic cooking devices to provide a much wider range of capabilities that will serve other needs and provide other benefits to users of cooking devices.

Many industrial environments are similarly isolated from conventional energy and communications infrastructure. For example, offshore drilling platforms, industrial mining environments, pipeline operations, large-scale agricultural environments, marine exploration environments (e.g., deep ocean exploration), marine and other large-scale transportation environments (such as ships, boats, submarines, aircraft and spacecraft) are often entirely isolated from the traditional power grid, or require very expensive power transmission cables to receive power from traditional sources. Other industrial environments are isolated for other reasons, such as to maintain "clean room" isolation during semi-conductor manufacturing, pharmaceutical preparation, or handling of hazardous materials, where interfaces like outlets and switches for delivering conventional power potentially provide points of penetration or escape for contaminants or biologically active materials. For these environments, a need exists for cooking systems that provide improved independence from conventional power sources. Also, in many of these environments fire is a significant hazard, among other things because of the presence of fire hazards and significant restrictions on egress for personnel. In those cases, storage of fuel for cooking in an environment presents a risk, because the fuel can exacerbate the extent of a fire, potentially resulting in disastrous consequences. Accordingly, such platforms and environments, such as oil drilling platforms, may use diesel generators to power cooking and other systems, because diesel is perceived as presenting lower risk than propane, gasoline, or other fuel sources; however, diesel fuel also burns and remains a significant hazard. A need exists for safer mechanisms for providing cooking capability in isolated industrial environments.

SUMMARY

Intelligent cooking systems are disclosed herein, including an intelligent cooking system that is provided with processing, communications, and other information technology components, for remote monitoring and control and various value-added features and services, embodiments of which use an electrolyzer, optionally a solar-powered electrolyzer, to produce hydrogen as an on-demand fuel stream for a heating element, such as a burner, of the cooking system.

Embodiments of cooking systems disclosed herein include ones for consumer and commercial use, such as for cooking meals in homes and in restaurants, which may include various embodiments of cooktops, stoves, toasters, ovens, grills and the like. Embodiments of cooking systems also include industrial cooking systems, such as for heating, drying, curing, and cooking not only food products and ingredients, but also a wide variety of other products and components that are manufactured in and/or used in the industrial environments. These may include systems and components used in assembly lines (such as for heating, drying, curing, or otherwise treating parts or materials at one stage of production, such as to treat coatings, polymers, or the like that are coated, dispersed, painted, or otherwise disposed on components), in semi-conductor manufacturing and preparation (such as for heating or curing layers of a semi-conductor process, including in robotic assembly processes), in tooling processes (such as for curing injection molds and other molds, tools, dies, or the like), in extrusion processes (such as for curing, heating or otherwise treating results of extrusion), and many others. These may also include systems and components used in various industrial environments for servicing personnel, such as on ships, submarines, offshore drilling platforms, and other marine platforms, on large equipment, such as on mining or drilling equipment, cranes, or agricultural equipment, in energy production environments, such as oil, gas, hydro-power, wind power, solar power, and other environments. Accordingly, while certain embodiments are disclosed for specific environments, references to cooking systems should be understood to encompass any of these consumer, commercial and industrial systems for cooking, heating, curing, and treating, except where context indicates otherwise.

Provided herein is an intelligent cooking system leveraging hydrogen technology plus cloud-based value-added-services derived from profiling, analytics, and the like. The smart hydrogen technology cooking system provides a standardized framework enabling other intelligent devices, such as smart-home devices and IoT devices to connect to the platform to further enrich the overall intelligence of contextual knowledge that enables providing highly relevant value-added-services. The intelligent cooking system device (referred to herein in some cases as the "cooktop"), may be enabled with processing, communications, and other information technology components and interfaces for enabling a variety of features, benefits, and value added services including ones based on user profiling, analytics, remote monitoring, remote processing and control, and autonomous control. Interfaces that allow machine-to-machine or user-to-machine communication with other devices and the cloud (such as through application programming interfaces) enables the cooking system to contribute data that is valuable for analytics (e.g., on users of the cooking system and on various consumer, commercial and industrial processes that involve the cooking system), as well as for monitoring, control and operation of other devices and systems. Through similar interfaces, the monitoring, control and/or operation of the cooking or heating system, and its various capabilities, can benefit from or be based on data received from other devices (e.g., IoT devices) and from other data sources, such as from the cloud. For example, the cooking or heating system may track its usage, such as to determine when to send a signal for refueling the cooking system itself, to send a signal for re-supplying one or more ingredients, components or materials (such as based on detected patterns of usage of the same over time periods), to determine and provide guidance on usage of the cooking system (such as to suggest training or improvements in usage to improve efficiency or efficacy), and the like. These may include results based on applying machine learning to the use of the fuel, the use of the cooking system, or the like.

In embodiments, the intelligent cooking system may be fueled by a hydrogen generator, referred to herein in some cases as the electrolyzer, an independent fuel source that does not require traditional connections to the electrical power grid, to sources of gas (e.g., natural gas lines), or to periodic sources of supply of conventional fuels (such as refueling oil, propane, diesel or other fuel tanks). The electrolyzer may operate on a water source to separate hydrogen and oxygen components and subsequently provide the hydrogen component as a source of fuel, such as an on-demand source of fuel, for the intelligent cooking system. In embodiments, the electrolyzer may be powered by a renewable energy source, such as a solar power source, a wind power source, a hydropower source, or the like, thereby providing complete independence from the need for traditional power infrastructure. Methods and systems describing the design, manufacturing, assembly, deployment, and use of an electrolyzer are included herein. Among other benefits, the electrolyzer allows storage of water, rather than flammable materials like oil, propane and diesel, as a source of energy for powering cooking systems in various isolated or sensitive industrial environments, such as on or in ships, submarines, drilling platforms, mining environments, pipeline environments, exploration environments, agricultural environments, clean room environments, air- and space-craft environments, and others. Intelligent features of the cooking system can include control of the electrolyzer, such as remote and/or autonomous control, such as to provide a precise amount of hydrogen fuel (converted from water) at the exact point and time it is required. In embodiments, mechanisms may be provided for capturing and returning products of the electrolyzer, such as to return any unused hydrogen and oxygen into water form (or directing them for other use, such as using them as a source of oxygen for breathing).

Methods and systems describing the design, manufacturing, assembly, deployment, and use of a smart hydrogen-based cooking system are included herein. Processing hardware and software modules for operating various capabilities of the cooking system may be distributed, such as having modules or components that are located in subsystems of the cooking system (e.g., the burners or other heating elements, temperature controls, or the like), having modules or components located in proximity to a user interface for the cooking system (e.g., associated with a control panel), having modules or components located in proximity to a communications port for the cooking system (e.g., an integrated wireless access point, cellular communications chip, or the like, or a docking port for a communications devices, such as a smart phone), having modules or components located in nearby devices, such as other smart devices (e.g., a NEST® thermostat), gateways, access points, beacons, or the like, and/or having modules or components located on servers, such as in the cloud or in a hosted remote control facility.

In embodiments, the cooking system may have a mobile docking facility, such as for docking a smart phone or other control device (such as a specialized device used in an industrial process, such as a processor-enabled tool or piece of equipment), which may include power for charging the smart phone or other device, as well as data communications between the cooking system and the smart phone, such as to allow the smart phone to be used (such as via an app, browser feature, or control feature of the phone) as a controller for the cooking system.

In embodiments, the cooking system may include various hardware components, which may include associated sensors for monitoring operation, processing and data storage capabilities, and communication capabilities. The hardware components may include one or more burners or heating elements, (e.g., gas burners, electric burners, induction burners, convection elements, grilling elements, radiative elements, and the like), one or more fuel conduits, one or more level indicators for indicating fuel level, one or more safety detectors (such as gas leak detectors, temperature sensors, smoke detectors, or the like). In embodiments, a gas burner may include an on demand gas-LPG hybrid burner, which can burn conventional fuel like liquid propane, but which can also burn fuel generated on demand, such as hydrogen produced by the electrolyzer. In embodiments, the burner may be a consumer cooktop burner having an appropriate power capability, such as being able to produce 20,000 British Thermal Unit ("BTU").

In embodiments, the cooking system may include a user interface that facilitates intuitive, contextual, intelligence-driven, and personalized experience, embodied in a dashboard, wizard, application interface (optionally including or integrating with one more associated smartphone tablet or browser-based applications or interfaces for one or more IoT devices), control panel, touch screen display, or the like. The user interface may include distributed components as described above for other software and hardware components. The application interface may include interface elements appropriate for cooking foods (such are recipes) or for using the cooking system for various consumer, commercial or industrial processes (such as recipes for making semiconductor elements, for curing a coating or injection mold, and many others).

Methods and systems describing the design, manufacturing, assembly, deployment and use of a solar-powered hydrogen production facility in conjunction with a hydrogen-based cooking system are included herein.

Methods and systems describing the design, manufacturing, assembly, deployment and use of a commercial hydrogen-based cooking system that is suitable for use in a range of restaurants, cafeterias, mobile kitchens, and the like are included herein.

Methods and systems describing the design, manufacturing, assembly, deployment and use of an industrial hydrogen-based cooking system that is suitable for use as a food cooking system in various isolated industrial environments are included herein.

Methods and systems describing the design, manufacturing, assembly, deployment and use of an industrial hydrogen-based cooking system that is suitable for use as a heating, drying, curing, treating or other cooking system in various industrial environments are included herein, such as for manufacturing and treating components and materials in industrial production processes, including automated, robotic processes that may include system elements that connect and coordinate with the intelligent cooking system, including in machine-to-machine configurations that enable application of machine learning to the system.

Methods and systems describing the design, manufacturing, assembly, deployment and use of a low-pressure hydrogen storage system are described herein. The low-pressure hydrogen storage system may be combined with solar-powered hydrogen generation. In embodiments, the cooking system may receive fuel from the low-pressure hydrogen storage tank, which may safely store hydrogen produced by the electrolyzer. In embodiments, the hydrogen may be used immediately upon completion of electrolyzing, such that no or almost no hydrogen fuel needs to be stored.

Methods and systems describing the architecture, design, and implementation of a cloud-based platform for providing value-added-services derived from profiling, analytics, and the like in conjunction with a smart hydrogen-based cooking system are included herein. The cloud-based platform may further provide communications, synchronization among smart-home devices and third parties, security of electronic transactions and data, and the like. In embodiments, the cooking system may comprise a connection to a smart home, including to one or more gateways, hubs, or the like, or to one or more IoT devices. The cooking system may itself comprise a hub or gateway for other IoT devices, for home automation functions, commercial automation functions, industrial automation functions, or the like.

Methods and systems describing an intelligent user interface for a cloud-based platform for providing value-added services ("VAS") in conjunction with a smart hydrogen-based cooking system are included herein. The intelligent user interface may comprise an electronic wizard that may provide a contextual and intelligence driven personalized experience dashboard for computing devices that connect to a smart-home network or a commercial or industrial network based around the smart hydrogen-based cooking system. The architecture, design and implementation of the platform may be described herein.

Methods and systems for configuring, deploying, and providing value added services via a cloud-based platform that operates in conjunction with a smart hydrogen-based cooking system and a plurality of interconnected devices (e.g., mobile devices, Internet servers, and the like) to prepare profiling, analytics, intelligence, and the like for the VAS are described herein. In embodiments, the cooking system may include various VAS, such as ones delivered by a cloud-based platform and/or other IoT devices. For example, among many possibilities, the cooking system may provide recipes, allow ordering of ingredients, components or materials, track usage of ingredients to prompt re-orders, allow feedback on recipes, provide recommendations for recipes (including based on other users, such as using collaborative filtering), provide guidance on operation, or the like. The architecture, design, and implementation of these methods and systems and of the value-added-services themselves may further be described herein.

In embodiments, through a user interface, such as a wizard, various benefits, features, and services may be enabled, such as various cooking system utilities (e.g., a liquid propane gas gauge utility, a cooking assistance utility, a detector utility (such as for leakage, overheating, or smoke, or the like), a remote control utility, or the like). Services for shopping (e.g., a shopping cart or food ordering service), for health (such as providing health indices for foods, and personalized suggestions and recommendations), for infotainment (such as playing music, videos or podcasts while cooking), for nutrition (such as providing personalized nutrition information, nutritional search capabilities, or the like) and shadow cooking (such as providing remote materials on how to cook, as well as enabling broadcasting of the user, such as in a personalized cooking channel that is broadcast from the cooking system, or the like).

Methods and systems for profiling, analytics, and intelligence related to deployment, use, and service of a plurality of hydrogen-based cooking systems that are deployed in a range of environments including urban, rural, commercial, and industrial settings are described herein. Urban settings may include rural villages, low cost housing arrangements, apartments, housing projects, and the like where several end users (e.g., individual households, common kitchens, and the like) may be physically proximal (e.g., apartments in a building, and the like). The physical proximity can facilitate shared access to platform components, such as a hydrolyzer or low pressure stored hydrogen, and the like. To the extent that individual cook top deployments may communicate through local or Internet-based network access, additional benefits arise around topics such as, planning for demand loading, and the like. An example may include generating and storing more hydrogen during the week when people tend to cook a home than on the weekend, or using shared information about recipes to facilitate bulk delivery of fresh items to an apartment building, multiple proximal restaurants, and the like. In embodiments, the cooking system may enable and benefit from analytics, such as for profiling, recording or analyzing users, usage of the device, maintenance and repair histories, patterns relating to problems or faults, energy usage patterns, cooking patterns, and the like.

These methods and systems may further perform profiling, analytics, and intelligence related to deployment, use and service of solar-powered electrolyzers that generate hydrogen that is stored in a low-pressure hydrogen storage system.

Methods and systems related to extending the capabilities and access to content and/or VAS of a smart hydrogen-based cooking system through intelligent networking and development of transaction channels are described herein.

Methods and systems of an ecosystem based around the methods and systems of generating hydrogen via solar-powered electrolyzers, storing the generated hydrogen in low pressure storage systems, distribution and use of the stored hydrogen by one or more individuals, and the like, are described herein. In embodiments, the cooking system, or a collection of cooking systems, may provide information to a broader business ecosystem, such as informing suppliers of foods or other materials or components of aggregate information about usage, informing advertisers, managers and manufacturers about consumption patterns, and the like. Accordingly, the cooking system may comprise a component of a business ecosystem that includes various parties that provide various commodities, information, and devices.

Another embodiment of smart cooking or heating technology described herein may include an intelligent, computerized knob or dial suitable for direct use with any of the cooking systems, probes, single burner and other heating elements, and the like described herein. Such a smart knob or dial may include all electronics and power necessary for independent operation and control of the smart systems described herein.

In embodiments, the cooking or heating system is an industrial cooking system used to provide heat in a manufacturing process. In embodiments, the industrial cooking system is used in at least one of a semi-conductor manufacturing process, a coating process, a molding process, a tooling process, an extrusion process, a pharmaceutical manufacturing process and an industrial food manufacturing process.

In embodiments, a smart knob is adapted to store instructions for a plurality of different cooking or heating systems. In embodiments, a smart knob is configured to initiate a handshake with a cooking system based on which the knob automatically determines which instructions should be used to control the cooking system. In embodiments, a smart knob is configured with a machine learning facility that is configured to improve the control of the cooking system by the smart knob over a period of use based on feedback from at least one user of the cooking system.

In embodiments, a smart knob is configured to initiate a handshake with a cooking system to access at least one value-added service based on a profile of a user.

In the many embodiments, systems and methods for data collection, processing, and utilization of signals from at least a first element in a first machine in an industrial environment include a platform including a computing environment connected to a local data collection system having at least a first sensor signal and a second sensor signal obtained from at least the first machine in the industrial environment. The first machine is a smart heating system. A first sensor in the local data collection system is configured to be connected to the first machine. The methods and systems include a second sensor in the local data collection system and a crosspoint switch in the local data collection system having multiple inputs and multiple outputs including a first input connected to the first sensor and a second input connected to the second sensor. The multiple outputs include a first output and a second output configured to be switchable between a condition in which the first output is configured to switch between delivery of the first sensor signal and the second sensor signal and a condition in which there is simultaneous delivery of the first sensor signal from the first output and the second sensor signal from the second out. Each of the multiple inputs is configured to be individually assigned to any of the multiple outputs In embodiments, the multiple outputs include unassigned outputs that are configured to be switched off producing a high-impedance state.

In embodiments, the smart heating system includes an electrolyzer for producing hydrogen fuel from water and at least one heating element. The heating element is controlled by a processor and configured to use the hydrogen fuel under control of the processor In embodiments, the processor is connected to a network to enable communication to a remote server. The remote server includes at least one module for providing at least one of remote monitoring and control of the operation of the smart heating system.

In embodiments, the methods and systems further include a low-pressure hydrogen storage system for storing the hydrogen fuel produced by the electrolyzer.

In embodiments, the methods and systems include a renewable energy system for powering the electrolyzer to produce the hydrogen fuel. The renewable energy system is at least one of a solar power system, a wind power system and a hydro-power system.

In embodiments, the methods and systems include a liquid propane fuel system for providing fuel to the heating system. The heating system includes a fuel control module in operative connection with the processor to control the use of the liquid propane fuel and the hydrogen fuel for use by the heating system.

In embodiments, the methods and systems include at least one interface configured to connect with at least one system external to the heating system. The at least one interface is configured to at least one of monitor the heating system, control the heating system and obtain data collected by the heating system via interaction with the at least the one external system. The interface is at least one of an application programming interface, a machine-to-machine interface, and a graphical user interface.

In embodiments, the heating system comprises at least one sensor selected from the group consisting of a temperature sensor, a weight sensor, a pressure sensor and a gyro-based sensor.

In embodiments, the heating system is an industrial heating system used to provide heat in a manufacturing process.

In embodiments, the industrial heating system is used in at least one of a semi-conductor manufacturing process, a coating process, a molding process, a tooling process, an extrusion process, a pharmaceutical manufacturing process and an industrial food manufacturing process.

In embodiments, the heating system is configured for use in an industrial environment selected from the group consisting of a marine transportation environment, an air transportation environment, a drilling environment, a mining environment, an agricultural production environment and a pipeline environment and the heating system is configured to communicate with information technology systems of the selected industrial environment.

Smart heating and cooking systems, such as those embodiments described and depicted herein may be incorporated into one or more sensory networks of the industrial Internet of Things as described throughout and in reference the document already incorporated by reference. The smart heating systems may include capabilities, such as data collection capabilities and the like that may be applied to, accomplished with, and integrated into the methods and systems of the industrial Internet of things as described herein and in reference to the many examples in PCT/US2017/031721 published as WO/2017/196821.

In embodiments, the system for data collection, processing, and utilization of signals from at least a first element in a first machine in an industrial environment includes a platform including a computing environment connected to a local data collection system having at least a first sensor signal and a second sensor signal obtained from at least the first machine in the industrial environment. The first machine is a smart heating system. The system includes a first sensor in the local data collection system is configured to be connected to the first machine and a second sensor in the local data collection system. The system further includes a crosspoint switch in the local data collection system having multiple inputs and multiple outputs including a first input connected to the first sensor and a second input connected to the second sensor. The multiple outputs include a first output and a second output configured to be switchable between a condition in which the first output is configured to switch between delivery of the first sensor signal and the second sensor signal and a condition in which there is simultaneous delivery of the first sensor signal from the first output and the second sensor signal from the second out. Each of the multiple inputs is configured to be individually assigned to any of the multiple outputs. Unassigned outputs are configured to be switched off producing a high-impedance state.

These and other systems, methods, objects, features, and advantages of the present disclosure will be apparent to those skilled in the art from the following detailed description and drawings detailing the many aspects of the present disclosure.

BRIEF DESCRIPTION OF THE DRAWINGS

FIG. 13 is a diagrammatic view depicting auto switching connectivity in the form of ad hoc Wi-Fi from the cooktop through nearby mobile devices in a normal connectivity mode when Wi-Fi is available in accordance with the present disclosure.

FIG. 14 is a diagrammatic view depicting an auto switching connectivity in the form of ad hoc Wi-Fi from the cooktop through nearby mobile devices for ad hoc use of the local mobile devices for connectivity to the cloud in accordance with the present disclosure.

FIGS. 19-26 are views of visual interfaces depicting user interface features of a smart knob in accordance with the present disclosure.

FIGS. 29-32 are perspective views depicting smart temperature probes of the smart cooking system in accordance with the present disclosure.

FIGS. 33-38 are diagrammatic views depicting different docks for compatibility with a range of smart phone and tablet devices in accordance with the present disclosure.

FIG. 47, FIG. 48, and FIG. 49 are diagrammatic views depicting a burner design contemplated for use with a smart cooking system in accordance with a further example of the present disclosure.

FIG. 50, FIG. 51, and FIG. 52 are diagrammatic views depicting a burner design contemplated for use with a smart cooking system in accordance with yet another example of the present disclosure.

FIG. 53 and FIG. 55 are diagrammatic views depicting a burner design contemplated for use with a smart cooking system in accordance with an additional example of the present disclosure.

FIG. 54 is a cross-sectional view of FIG. 53.

DETAILED DESCRIPTION

Figure 1:
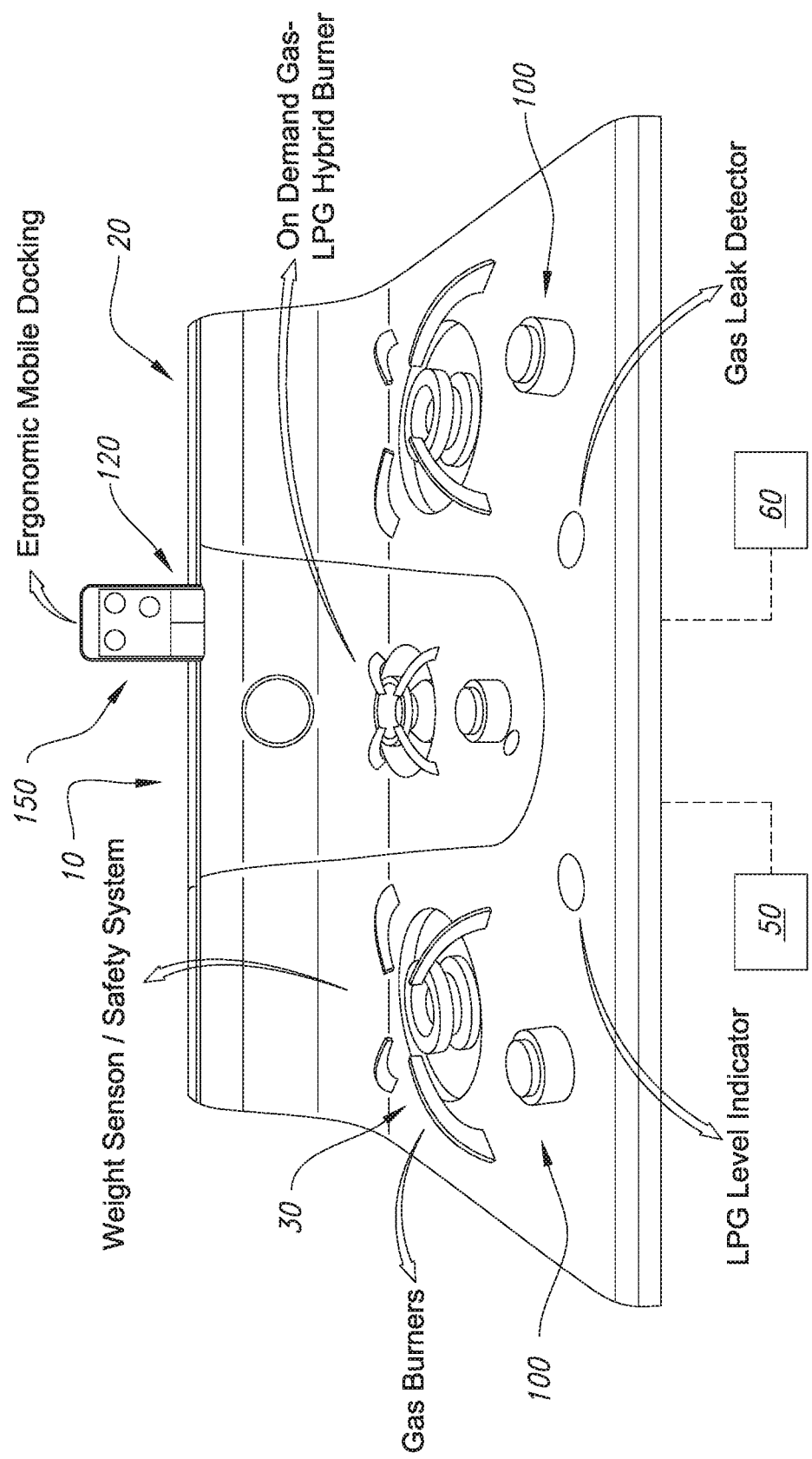
FIG. 1 is a diagrammatic view depicting an integrated cooktop of intelligent cooking system methods and systems in accordance with the present disclosure.

Referring to FIG. 1, an integrated cooktop embodiment 10 of the intelligent cooking system methods and systems 20 described herein is depicted. The cooktop embodiment 10 of FIG. 1, may include one or more burners 30 that may burn one or more types of fuel, such as Liquid Propane Gas (LPG), hydrogen, a combination thereof, and the like. Gas burners may, for example, be rated to provide variable heat, including up to a maximum heat, thereby consuming a corresponding amount of fuel. One or more of the burners 30 may operate with an LPG source 50 and a source of hydrogen gas 60 such that the hydrogen source 60 may be utilized based on a demand for fuel indicated by the burner 30, a measure of available LPG fuel, an amount of LPG fuel used over time, and any combination of use, demand, historical usage, anticipated usage, availability of supply, weather conditions, calendar date/time (e.g., time of day, week, month, year, and the like), proximity to an event (e.g., an intense cooking time, such as just before a holiday), and the like. The hydrogen source 60 may be utilized so that the amount of other fuel used, such as LPG, is kept below a usage threshold. Such a usage threshold may be based on costs of LPG gas, uses of LPG gas by other burners 30 in the cooking system 20, other cooking systems 20 in the vicinity (e.g., other cooking systems 20 in a restaurant, other cooking systems 20 in nearby residences), and the like. Each cooking system 20 and/or burner 30 within the cooking system 20 may, therefore, provide on-demand fuel sourcing dynamically without the need for user input or monitoring of the cooking system 20. By automating fuel sourcing, the burner may extend the life of available LPG by automatically introducing the hydrogen fuel, such as by switching from one source to the other or by reducing one source (e.g., LPG) while increasing the other (e.g., hydrogen). The degree to which each fuel source is utilized may be based on a set of operational rules that target efficiency, LPG fuel consumption, availability of hydrogen, and the like. Rating of the one or more burners 30 may be under the control of a processor, including to provide different levels of rating for different fuel sources, such as LPG alone, hydrogen alone, or a mixture of LPG and hydrogen with a given ratio of constituent parts.

Each of the burners 30, cooking systems 20, or collection of cooking systems 20 may be configured with fuel controls, such as fuel mixing devices (e.g., valves, shunts, mixing chambers, pressure compensation baffles, check valves, and the like) that may be controlled automatically based, at least in part on some measure of historical, current, planned, and/or anticipated consumption, availability, and the like. In an example, one or more burners 30 may be set to produce 1000 Watts of heat and a burner gas source control facility may activate one or more gas mixing devices while monitoring burner output to ensure that the burner output does not deviate from the output setting by more than a predefined tolerance, such as 100 Watts or ten percent (10%). Alternatively, a model of gas consumption and burner output, embodied in a software module that may have access to data sources regarding types of gas, burning characteristics, types of burners, rating characteristics, and the like, may be used by the control facility to regulate the flow of one or more of gasses being mixed to deliver a consistent burner heat output. Any combination of burner output sensing, modeling, and preset mixing control may be used by the control facility when operating fuel sourcing and/or mixing devices.

The one or more burners 30 may include intelligence for enhancing operation, efficiency, fuel conservation, and the like. Each of the burners 30 may have its own control facility 100. A centralized cooking system control facility may be configured to manage the operation of the burners 30 of the cooking system 20 or other heating elements noted throughout this disclosure. Alternatively, the individual burner control facilities 100 may communicate over a wired and/or wireless interface to facilitate combined cooking system burner control. One or more sensors to detect the presence of an object in the targeted heating zone (e.g., disposed on the burner grate) may provide feedback to the control facility. Object presence sensors may also provide an indication of the type, size, density, material, and other aspects of the detected object in the targeted heating zone. Detection of a material such as metal, versus cloth (e.g., a person's sleeve), versus human flesh may facilitate efficiency and safety. When cloth or human flesh is detected, the control facility may inhibit heat production so as to avoid burning the person's skin or causing their clothing to catch fire. Such a control facility safety feature may be overridden through user input to the control facility to give the user an opportunity to determine if the inhibited operation is proper. Other detectors, such as spillover (e.g., moisture) detectors in proximity to the burner may help in managing safety and operation. A large amount of spillage from a pot may cause the flame being produced by the burner to be extinguished. Based on operational rules, the source of gas may be disabled and/or an igniter may be activated to resume proper operation of the burner. Other actions may also be configured into the control facility, such as signaling the condition to a user (e.g., through an indicator on the cooking system 20, via connection to a personal mobile device, to a central fire control facility, and the like).

Burner control facilities 100 may control burner heat output (and thereby control fuel consumption) based on one or more models of operation, such as to heat a pan, pot, component, material, or other item placed in proximity to the burner 20 or other heating elements. As an example, if a user wants to boil water in a heavy metal pot quickly, a control facility may cause a burner to produce maximum heat. Based on user preferences and/or other factors as noted above related to demand, supply, and the like, the control facility may adjust the burner output while notifying the user of a target time for completion of a heating activity (e.g., time until the water in the pot boils). In this way an intelligent burner 20 (e.g., on with a burner control facility) may achieve some user preferences (e.g., heating temperature) while compromising on others (e.g., amount of time to boiling, and the like). The parameters (e.g., operational rules) for such tradeoff may be configured into the cooking system 20/burner 30 during production, may be adjustable by the user directly or remotely, may be responsive to changing conditions, and the like. In embodiments, machine learning, either embodied at the cooking system 20, in the cloud, or in a combination, may be used to optimize the parameters for given objectives sought by users, such as cooking time, quality of the result (e.g., based on feedback measures about the output product, such as taste in the case of foods or other quality metrics in the case of other products of materials). For example, the cooking system 20 may be configured under control of machine learning to try different heating patterns for a food and to solicit user input as to the quality of the resulting item, so that over time an optimal heating pattern is developed.

The intelligent cooking system 20 as described herein and depicted in FIG. 1 may include an interface port 120 with supporting structural elements to securely hold a personal mobile device 150 (e.g., a mobile phone) in a safe and readily viewable position so that the user can have both visual and at least auditory access to the device. The cooking system 20 may include features that further ensure that the mounted mobile device 150 is not subject to excessive heat, such as heat shields, deflectors, air flow baffles, heat sinks, and the like. A source of air-flow may be incorporated to facilitate moving at least a portion of heated air from one or more of the burners 30 away from a mounted personal mobile device 150.

Figure 2:
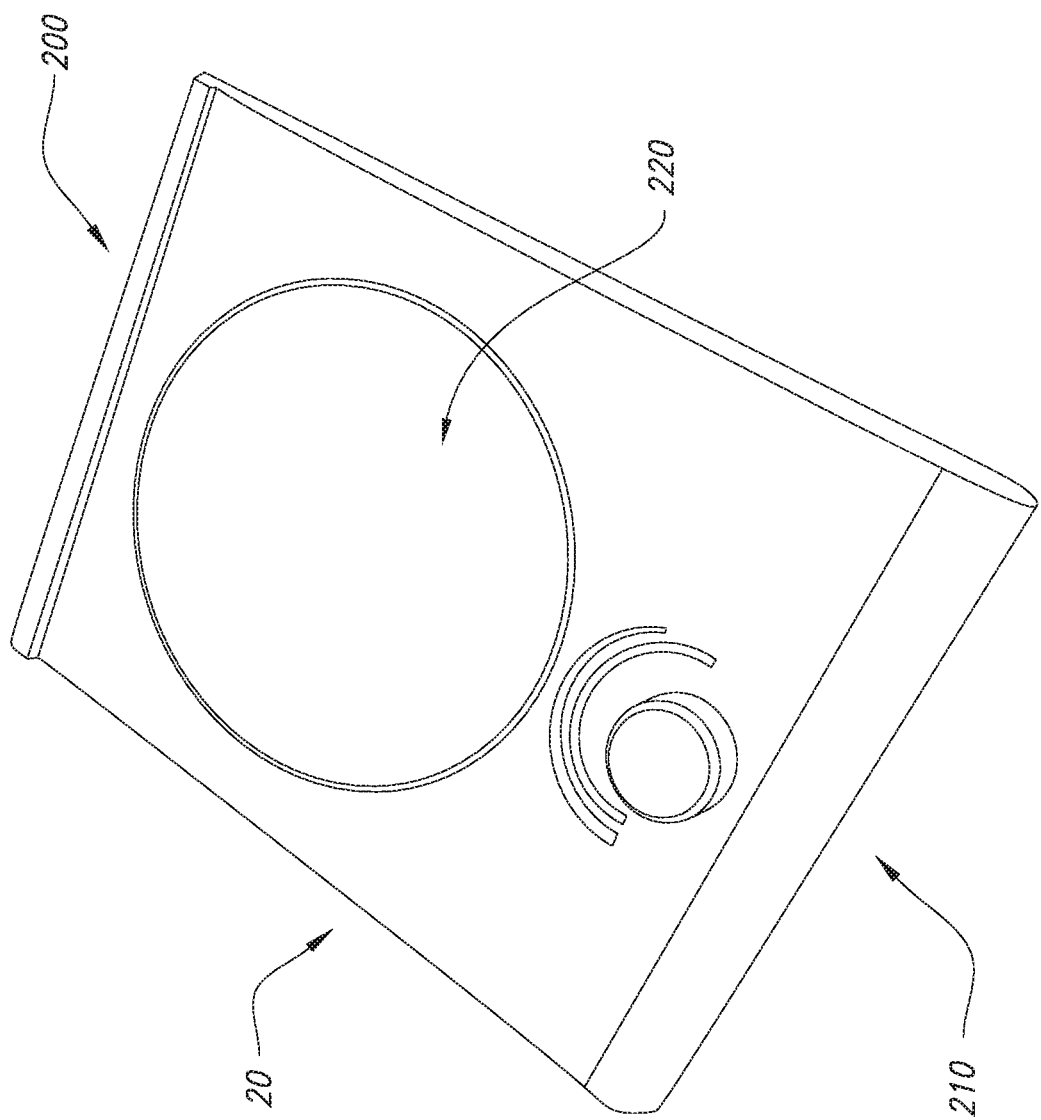
FIG. 2 is a diagrammatic view depicting a single intelligent burner of the intelligent cooking system in accordance with the present disclosure.

The intelligent burner embodiment 200 depicted in FIG. 2 represents a single burner embodiment 210 of the intelligent cooking system 20 described herein. Any, none, or all features of a multi-burner intelligent cooking system 20 may be configured with the single burner version depicted in FIG. 2. Further depicted in FIG. 2 is a version of the intelligent burner 200 that may have an enclosed burner chamber 220 that provides heat in a target heat-zone as a plane of heat rather than as a volume of heat. This may be generated by induction, electricity, or the like that may be produced by converting a source of fuel, such as LPG and/or hydrogen with a device that can produce electricity from a combustible gas.

Figure 3:
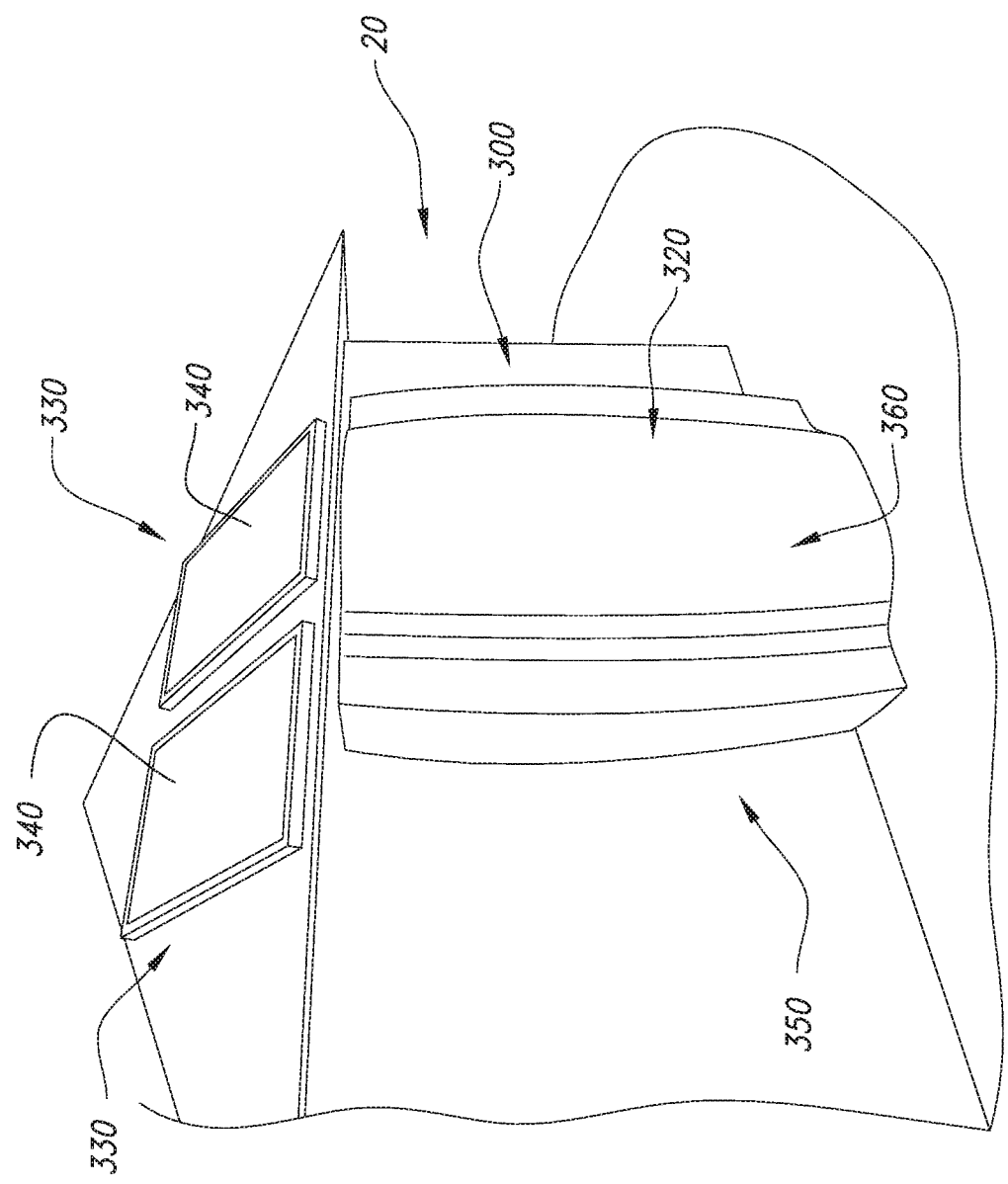
FIG. 3 is a partial exterior view depicting a solar-powered hydrogen production and storage station in accordance with the present disclosure.
Figure 7:
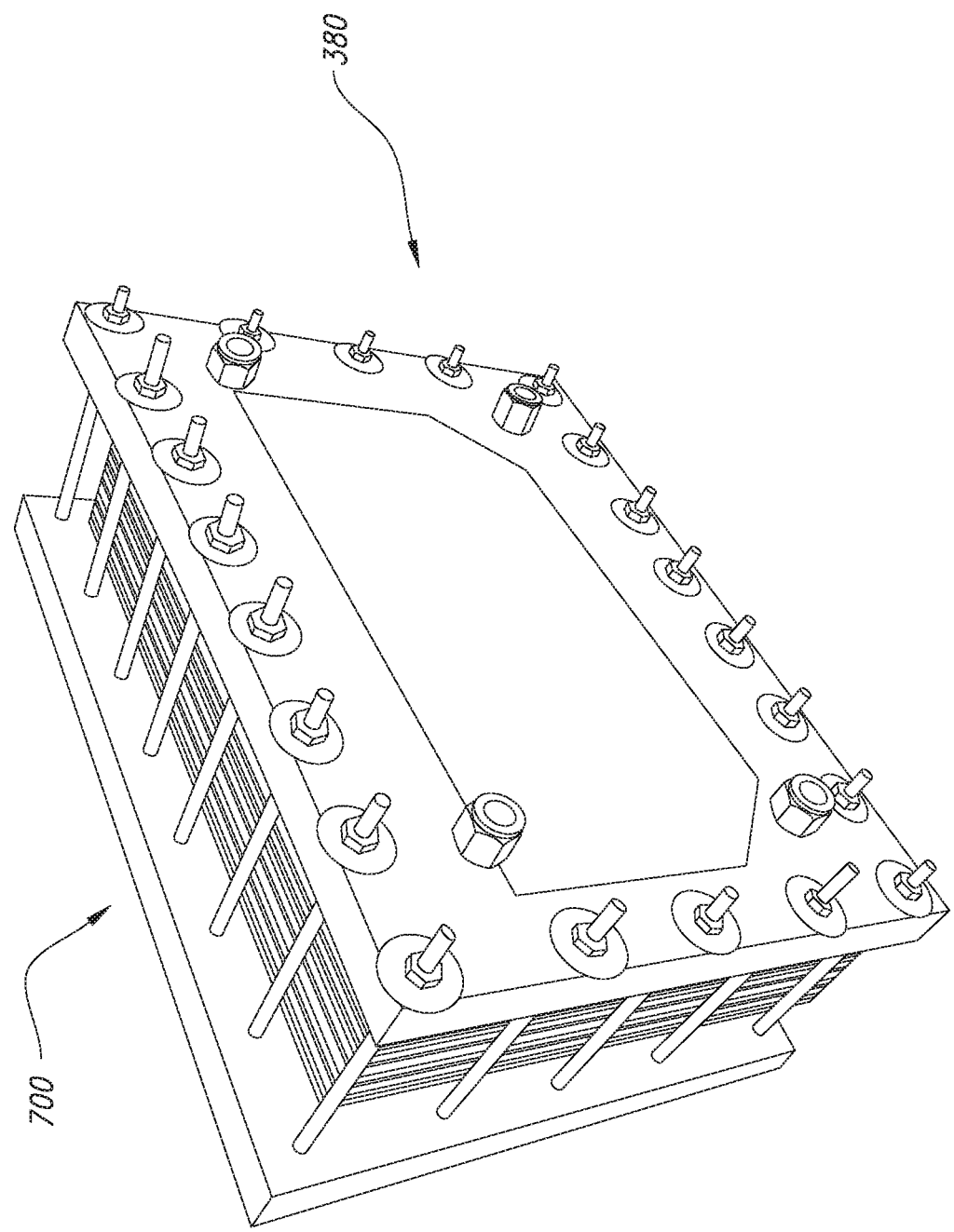
FIG. 7 is a diagrammatic view depicting an electrolyzer in accordance with the present disclosure.

The intelligent cooking system 20 may be combined with a hydrogen generator 300 to provide a source of hydrogen for use with the burners 30 as described herein. FIG. 3 depicts a solar-powered hydrogen production and storage station 320. The hydrogen production station 320 may be configured with one or more solar collectors 330, such as sunlight-to-electricity conversion panels 340 that may produce energy for operating an electrolyzer 350 that converts a hydrogen source, such as water vapor, to at least hydrogen and oxygen for storage. Energy from the solar collectors 330 may power one or more electrolyzers 350, such as one depicted in the embodiment 700 of FIG. 7. The one or more electrolyzers 350 may process water vapor, such as may be available in ambient air, for storage in a storage system 360, such as a low-pressure storage system 370 depicted in FIG. 3. Alternatively, and/or in addition to processing air-born water vapor, a source of water, such as collected rainfall, public water supply, or other sources may be processed by the electrolyzer 350 to produce hydrogen fuel.

As hydrogen fuel is produced, it may be stored in a suitable storage container, such as the low-pressure storage system 370 that may be configured with the solar-powered electrolyzer system 350. The hydrogen produced by the solar-powered electrolyzer 350 may be routed to one or more intelligent cooking systems 20 in addition to or in place of being routed to a storage system 360. A hydrogen production and storage system 320 may produce hydrogen based on a variety of conditions including, without limitation, availability of a source of water vapor, availability of power to the electrolyzer, an amount of sunlight being collected, a forecast of sunlight, a demand for hydrogen energy, a prediction of demand, based on availability of LPG, usage of LPG, and the like.

Figure 5:
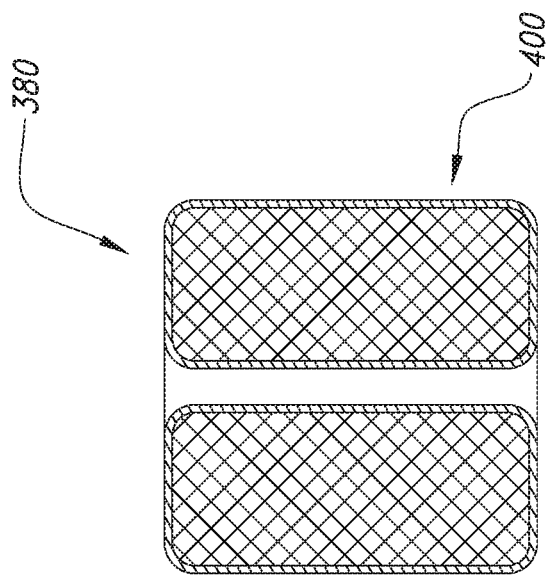
FIG. 5 and FIG. 6 are cross-sectional views of FIG. 4.
Figure 6:
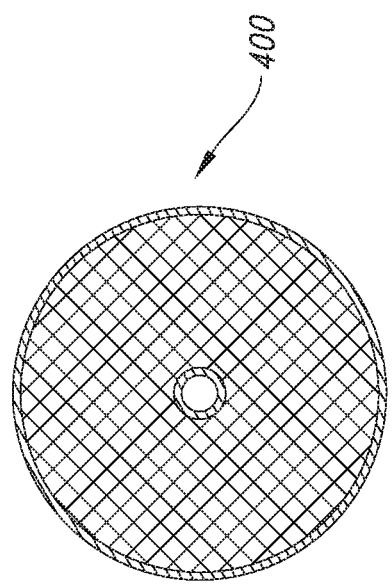
Figure 4:
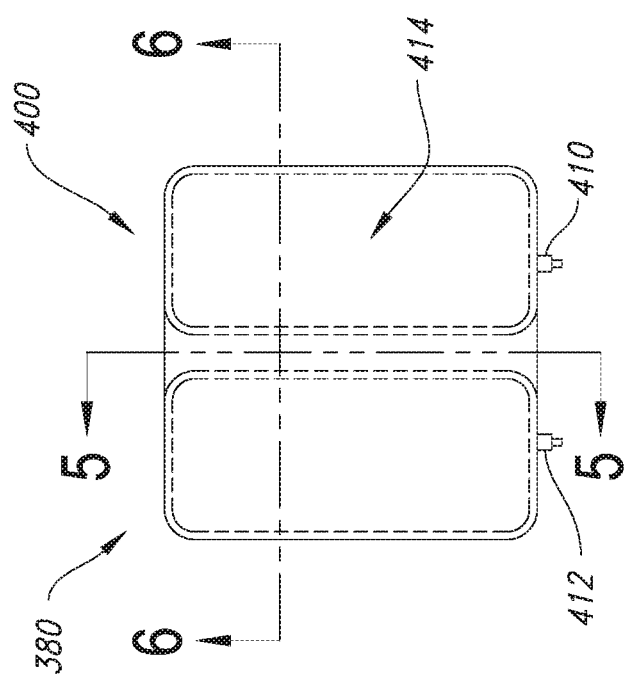
FIG. 4 is a diagrammatic view depicting a low-pressure storage system in accordance with the present disclosure.

The low-pressure gas storage system 370 may store the hydrogen and oxygen in ultraviolet ("UV") coated plastic bags or through water immersion technology (e.g., biogas). The maximum pressure inside the system may be less than 1.1 bar, which promotes safety, as the pressure is very low. Also, as no compressors are used, the cost for storage is much lower than for active storage systems that store compressed gas. FIG. 4, FIG. 5 and FIG. 6 depict an embodiment 400 of such a low-pressure storage system 370, with an inlet valve 410 and outlet valve 412 providing ports into an interior storage area 414 with the internal volume separated into two parts.

The low pressure set up can directly work from renewable energy, such as solar energy collected by solar cells, wind energy, hydro-power, or the like, improving the efficiency. The selected source of renewable energy may be based on characteristics of the environment; for example, marine industrial environments may have available wind and hydro-power, agricultural environments may have solar power, etc. Also, if the renewable energy (e.g., solar energy) collection facility is connected to a power grid, the electricity generated and the energy stored can be provided to the grid, e.g., during high cost periods. Likewise, the grid can be used to restore any used energy during off peak hours at reduced costs.

The designed low-pressure storage can be used to store hydrogen, as a source of energy, that can be converted into electricity. The designed system can store energy at very low cost and may have a lifetime of years, e.g., more than 15 years, which modern batteries do not have. Amounts of storage may be configured to satisfy safety requirements, such as storing little enough to cause a minimal fire hazard as compared to storing larger amounts of other fuels.

In an embodiment, the intelligent cooking system 20 may signal to the electrolyzer system 350 a demand for hydrogen fuel. In response, the electrolyzer system 350 may direct stored hydrogen to the cooking system 20, begin to produce hydrogen, or indicate that hydrogen is not currently available. This response may be based, at least in part on conditions for producing hydrogen. If conditions for producing hydrogen are good, the electrolyzer system may begin to produce hydrogen fuel rather than merely sourcing it from storage. In this way, the contemporaneous demand for hydrogen fuel and an ability to produce it may be combined to determine the operation of the energy production and consumption systems.

The intelligent cooking system 20 and/or hydrogen production and storage systems described herein may be combined with a platform that interacts with electronic devices and participants in a related ecosystem of suppliers, content providers, service providers, regulators, and the like to deliver VAS to users of the intelligent cooking system 20, users of the hydrogen production system, and other participants in the ecosystem. Certain features of such a platform 800 may be depicted in FIG. 8. The platform 800, which may be a cloud-based platform, may handle cooking system utilities, such as leakage sensing, fuel sourcing, usage assistance, remote control, and the like. In an example, a user who is located remotely from the intelligent cooking system 20 may configure the cooking system 20 to operate at a preset time, or based on a preset condition from his/her computing device (e.g., a personal mobile phone, desktop computer, laptop, tablet, and the like). The user may further be notified when the cooking system 20 begins to operate, thereby ensuring the user that the cooking system 20 is operating as expected. A user or third party (e.g., a regulatory agency, landlord, and the like) may configure one or more present conditions. Such conditions may include a variety of triggers including time, location of a user or third party, and the like. In an example, a parent may want to have a cooking system operate to warm up ingredients based on an anticipated arrival of someone to the home. This anticipation may be based on a detected location of a mobile device being carried by a person whose arrival is being anticipated.

The platform 800 may further connect cooking system users with participants in the ecosystem (e.g., vendors and/or service providers) synergistically so that both the user and the participants may benefit from the platform 800. In an example, a user may plan to prepare a meal for an upcoming dinner. The user may provide the meal plan to the platform 800 (e.g., directly through the user's mobile phone, via the user's intelligent cooking system 20, and the like). The platform 800 may determine that fresh produce for the meal is preferred by the user and may signal to retailers and/or wholesalers to have the produce available for the user to pick up on his/her return to the home to prepare the meal. In this way, vendors and service providers who participate in the ecosystem may gain insight into their customer's needs. Likewise, users may indicate a preference for a type of meal that may be prepared with a variety of proteins. Participants in the ecosystem may make offers to the user to have one or more of the types of protein available for the user on the day and at the time preferred by the user. A butcher that is located in proximity to the user's return path may offer conveniences, such as preparation of cuts of meat for the user. Butchers who may not be conveniently located in proximity to the user's return path may offer delivery services on a day and time that best complies with the user's meal plans.

A user of such a platform-connected intelligent cooking system may leverage the platform 800 to gain both access to and analysis of information that is available across the Internet to address particular user interests, such as health, nutrition, and the like. As an example, a user may receive guidance from a health professional to reduce red meat intake and increase his seafood intake. The platform 800 may interact with the user, the cooking system, and ecosystem participants to facilitate preparing variations of a family's favorite meals with fish instead of red meat. Changes in spices, amounts, cooking times, recipes, and the like may be provided to the user and to the cooking system 20 through the platform 800 to make meal preparation more enjoyable. The platform 800 may help with nutritional assistance, such as by providing access to quality nutritional professionals who may work personally with a user in meal selection and preparation.

The platform 800 may also help a user of the platform 800, even one who does not have access to the intelligent cooking system 20, to benefit from the knowledge gathering and analysis possible from a platform 800 interconnected with a plurality of cooking systems, users, and ecosystem participants. In an example, the platform 800 may provide guidance to a user in the selection and purchase of an intelligent burner and/or integrated cooking system and related appliances (e.g., refrigeration), utensils, cookware, and the like.

The platform 800 may further facilitate integration with VAS, such as financial services (e.g., for financing infrastructure and operating costs), healthcare services (e.g., facilitating connecting healthcare providers with patients at home), smart home solutions (e.g., those described herein), rural solutions (e.g., access to products and services by users in rural jurisdictions), and the like. Information (e.g., profiles, analytics, and the like) gathered and/or generated by the platform 800 may be used for other business services either directly with or through other partners (e.g., credit rating agencies for developing markets).

The platform 800 may facilitate a range of user benefits, including shopping, infotainment, business development, and the like. In a business development example, a user may utilize her intelligent integrated cooking system 20 to produce her own cooking show by setting up her personal phone with a camera on the cooking system 20 so that the user activity on the cooking system 20 can be captured and/or distributed to other users via the platform 800. Further in the example, a user may schedule a cooking demonstration and may allow other users to cook along with him in an autonomous and/or interactive way. A user may opt into viewing and cooking along with the cooking show producer without directly interacting with the producer. Whereas, another user may configure his cooking system 20 with a personal mobile device and allow others to provide feedback based on the user's activities on the cooking system 20 via the camera and user interface of the mobile device.

Figure 56:
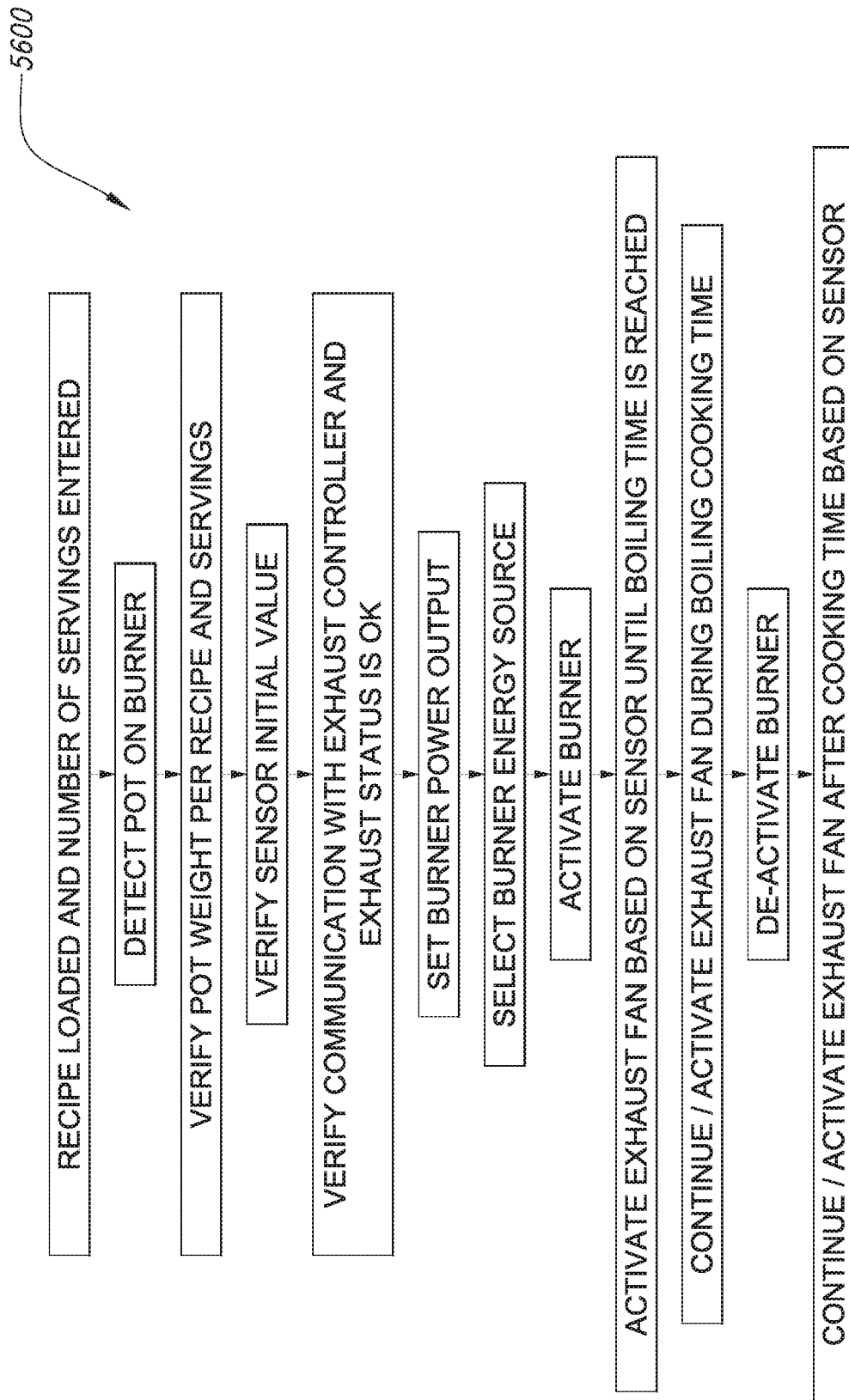
FIG. 56 is a flowchart depicting a method associated with a smart kitchen including a smart cooktop and an exhaust fan that may be automatically turned on as water in a pot may begin to boil in accordance with the present disclosure.

The platform 800 may facilitate establishing an IoT ecosystem of smart home devices, such as, in embodiments, a smart kitchen that enables and empowers the homemaker. The smart kitchen may include a smart cooking system 20, IoT middleware and a smart kitchen application. The smart cooking system 20 may provide a hardware layer of the platform 800 that may provide plug and play support for IoT devices, with each new device acting as a node providing more information, such as from additional sensors, to the entire system. IoT cloud support, which may be considered as a middleware layer of the platform 800, may enable the communication (such as by streaming) and storage of data on the cloud, along with enabling optional remote management of various capabilities the platform 800. A smart kitchen application may include a user interface layer that may provide a single point of access and control for the entire range of smart devices for the ease of the homemaker or other users. As an example of a smart kitchen enabled by the smart cook top methods and systems described herein, an exhaust fan may be turned on as the water in a pot begins to boil, thereby directing the steam output of the pot away from the kitchen. This may be done through a combination of sensors (e.g., a humidity sensor), automated cooking system control that determines when the pot will begin to boil based on the weight of the pot on the burner, and the energy level of the burner, and the like. Similar embodiments may be used in industrial environments, such as coordination with ventilation systems to maintain appropriate temperature, pressure, and humidity conditions by coordination of heating activities via the cooking system 20 and routing and circulation of air and other fluids by the ventilation system. The cooking or heating system controller may, for example, communicate with an exhaust fan controller to turn on the fan based on these inputs and/or calculations; thereby improving the operation of the smart kitchen appliances while conserving energy through timely application of the exhaust fan. A flowchart representative of operational steps 5600 for this example is depicted in FIG. 56.

The value created by such a platform 800 may be broadly classified into (i) VAS; (ii) profiling, learning and analytics; and (iii) a smart home solution or IoT solution for a commercial or industrial environment. The VAS of the system, may include without limitation: (a) personalized nutrition; (b) information and entertainment (also referred to as "infotainment"); (c) family health; (d) finance and commerce services (including online ordering and shopping); (e) hardware control services; and many other types of services.

Profiling, learning and analytics may provide a number of benefits to various entities. For example, a homemaker may get access to personalized nutrition and fitness recommendations to improve the health of the entire family, including healthy recipe and diet recommendations, nutritional supplement recommendations, workout and fitness recommendations, energy usage optimization advice for cooking and use of other home appliances, and the like. Device manufacturers and other enterprises may also benefit, as the platform 800 may solve the problems faced by home appliance device manufacturers in integrating their devices to the cloud and leveraging the conveniences provided by the same.

Device manufacturers and other enterprises may be provided with an interface to the platform 800 (such as by one or more application programming interfaces, graphical user interfaces, or other interfaces) that can enable them to leverage capabilities of the platform 800, including, one or more machine learning algorithms or other analytic capabilities that can learn and develop insights from data generated by the device. These capabilities may include an analytics dashboard for devices; a machine learning plug and play interface for developing data insights; a health status check for connected appliances (e.g., to know when a device turns faulty, such as to facilitate quick and easy replacement/servicing); and user profiling capabilities, such as to facilitate providing recommendations to users, such as based on collaborative filtering to group users with other similar users in order to provide targeted advice, offers, advertisements, and the like.

A smart home solution or IoT solution for a commercial or industrial environment may provide benefits to device manufacturers who find it difficult to embed complex electronics in their devices to make them intelligent due to development and cost constraints. The platform 800 simplifies this by providing a communication layer that can be used by partners to send their device data, after which the platform 800 can take over and provide meaningful data and insights by analyzing the data and performs specific actions on behalf of an integrated smart home for the user. The additional value of each partner interacting through the platform 800 is the access to various sensory data built into the system for effectively making any connected device more intelligent. For example, among many possibilities, the ambient temperature sensor inside the smart cooking system 20 can be leveraged by a controllable exhaust facility to accordingly increase the airflow for the comfort of the homemaker.

Figure 8:
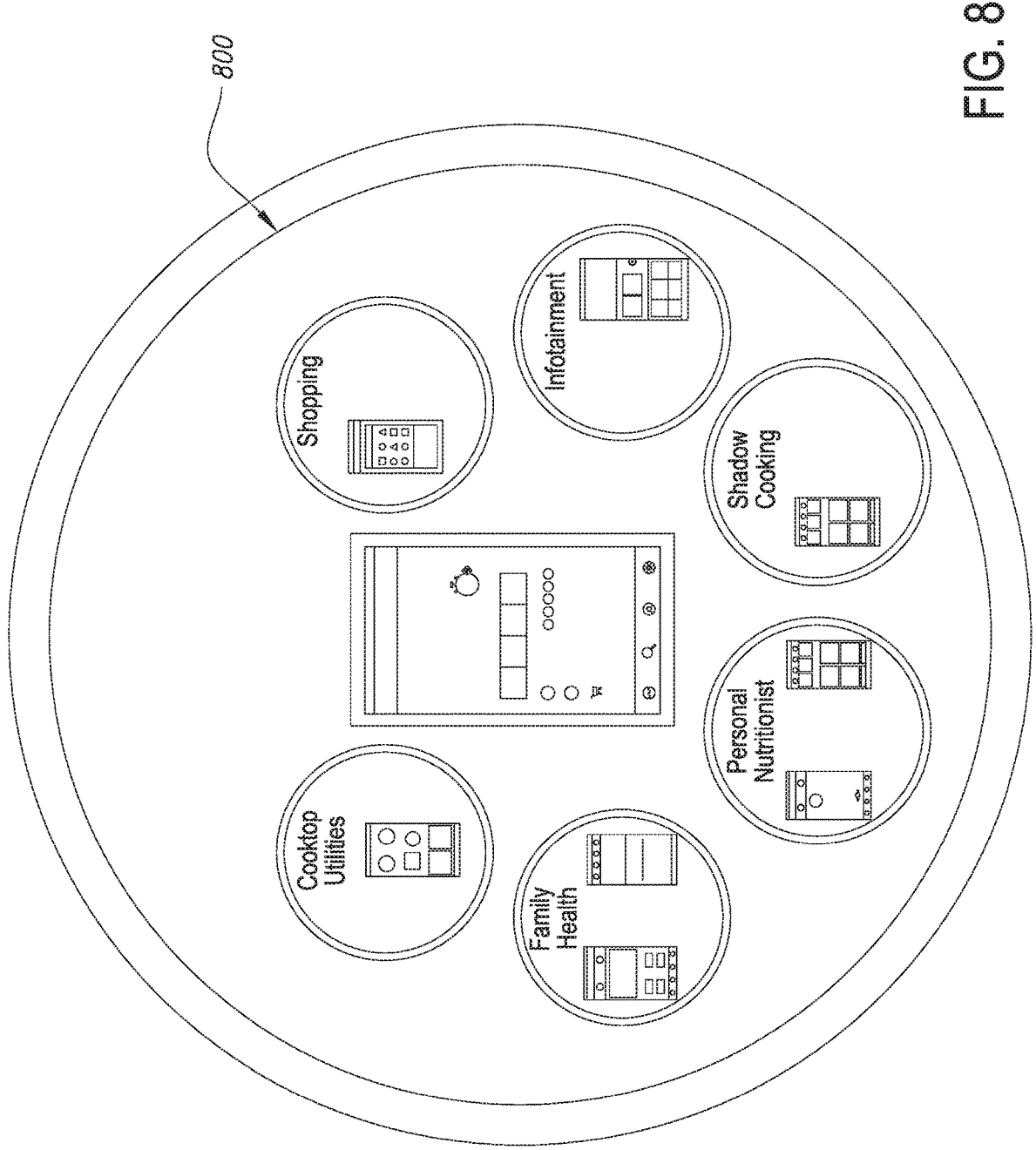
FIG. 8 is a diagrammatic view depicting features of a platform that interact with electronic devices and participants in a related ecosystem of suppliers, content providers, service providers, and regulators in accordance with the present disclosure.
Figure 9:
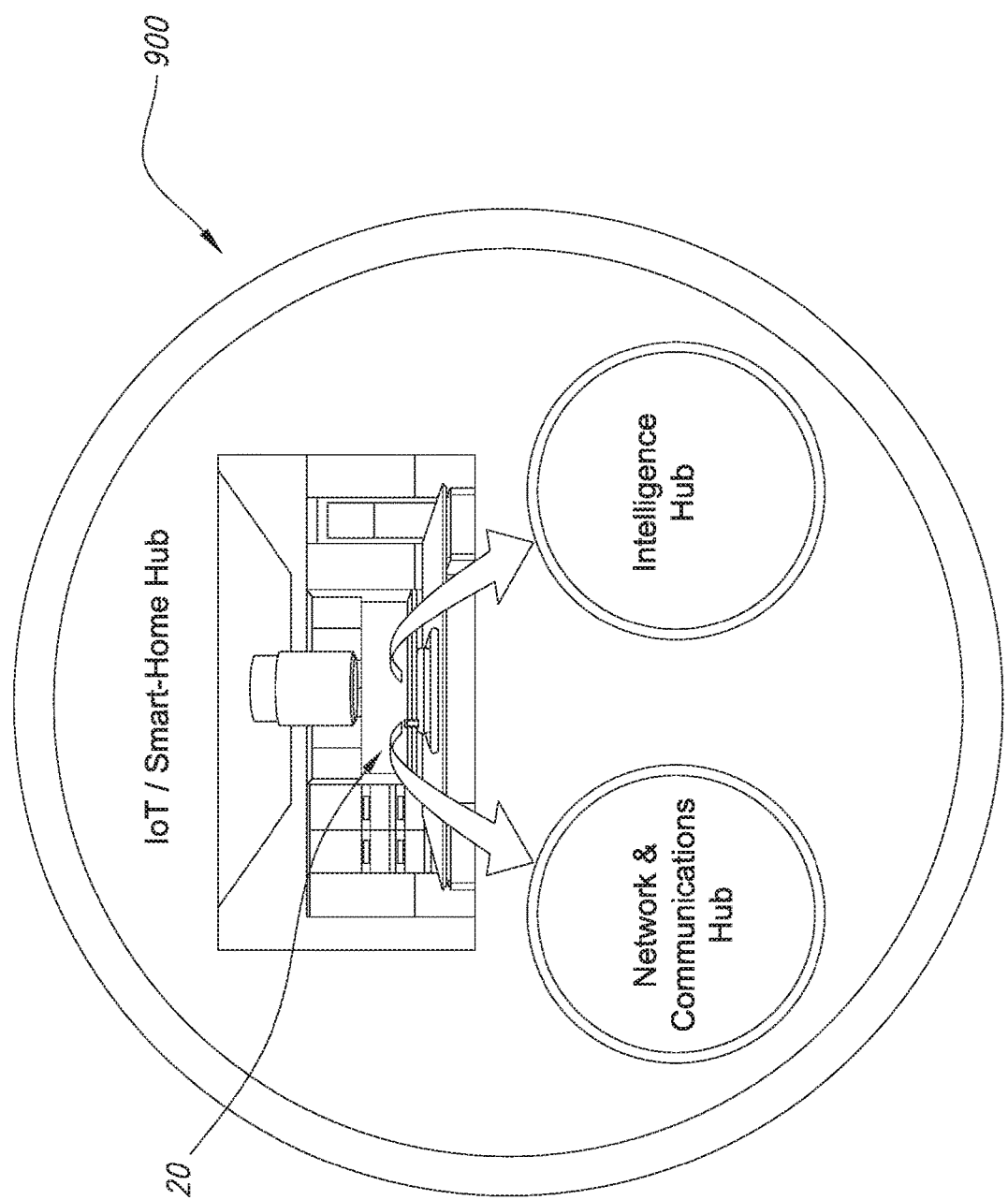
FIG. 9 is a diagrammatic view depicting a smart home embodiment of the intelligent cooking system in accordance with the present disclosure.

Referring to the smart home embodiment of FIG. 9, an intelligent cooking system 900 may be a participant in or may be a gateway to a home appliance network that may include other kitchen appliances, sensors, monitors, user interface devices, processing devices, and the like. The home appliance network, and/or the devices configured in the home network, may be connected to each other and to other participants of the ecosystem through the platform 800 (FIG. 8). Data collected from these appliances, participants in the ecosystem, users of the platform, third parties, and the like may provide an interactive environment to explore, visualize, and study patterns, such as fuel usage patterns. Data collected may further be synthesized through deep machine learning, pattern recognition, modeling, and prediction analysis to provide valuable insights related to all aspects of the platform participants, devices, suppliers, and the larger ecosystem.

Further embodiments of the hydrogen generation and consumption capabilities are now described.

The system may use water and electricity as fuel to generate the gas-on-demand that may be used, for example, for cooking. The hydrogen and oxygen generated in the cell may be separated out within the cell and kept separate until reaching the combustion port in a burner. A specially designed burner module may comprise different chambers to allow passage of hydrogen, oxygen and cooking gas. The ports for hydrogen and cooking gas may be designed in such a way as to avoid flame flashbacks and flame lift-offs, and the like. The oxygen ports may be designed to ensure optimum supply of oxygen with respect to the hydrogen supply. The hydrogen and oxygen ports may be on mutually perpendicular planes ensuring proper intermixing of the burning mixture. The hydrogen and cooking gas connections may be mutually independent and can be operated separately or together to generate a mixed flame.

Figure 10:
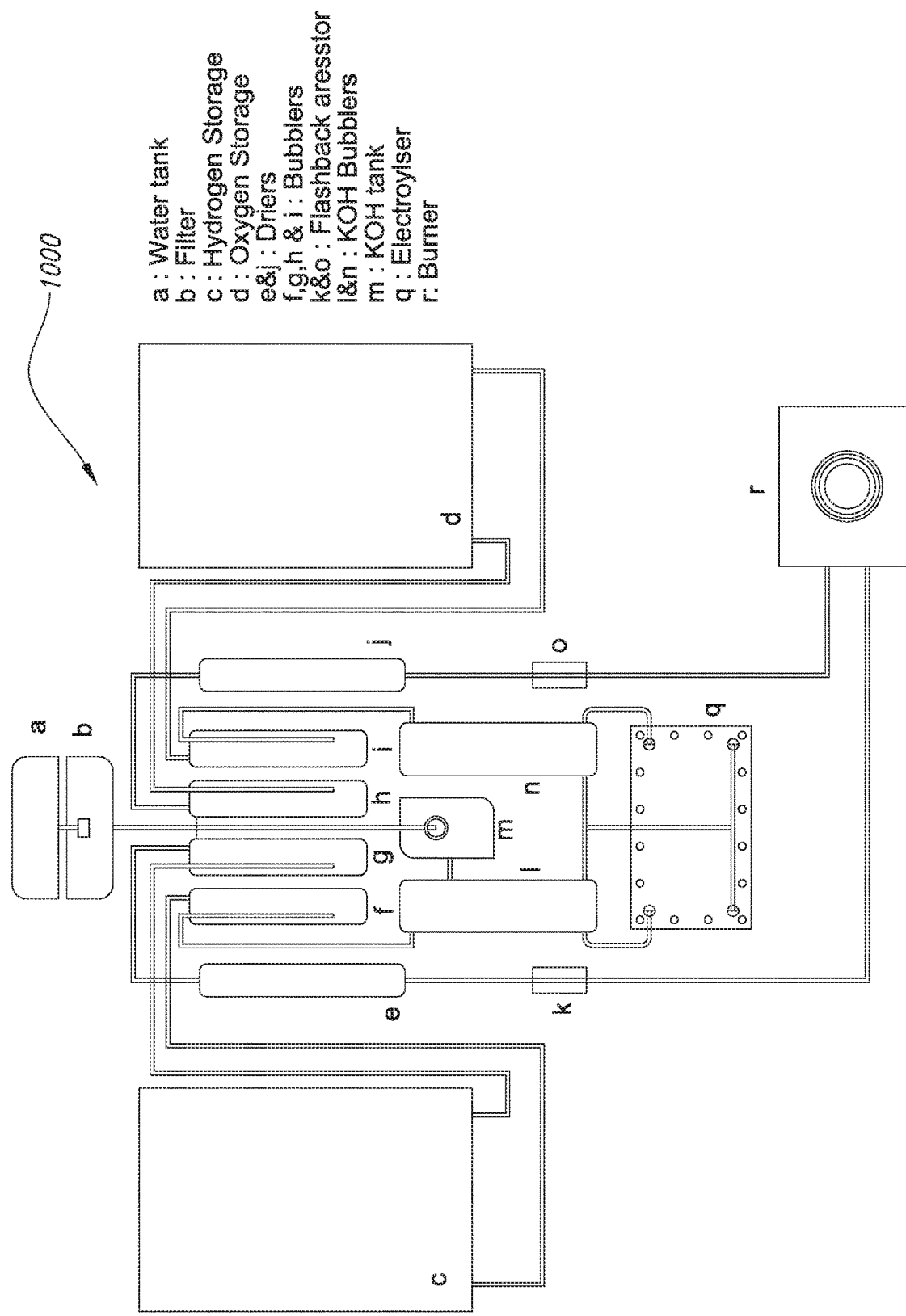
FIG. 10 is a diagrammatic view depicting a hydrogen production and use system in accordance with the present disclosure.
Figure 11:
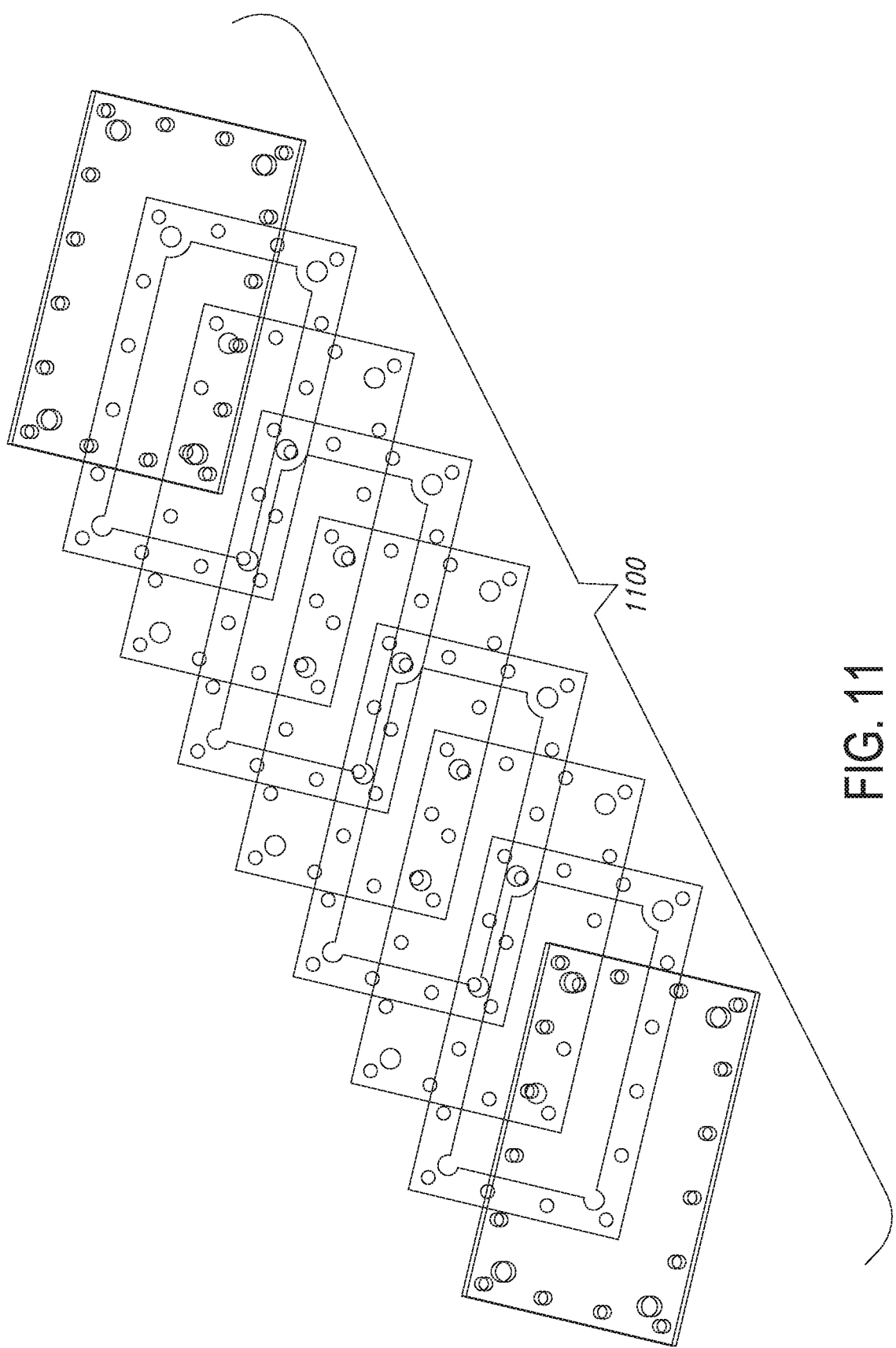
FIG. 11 is a diagrammatic view depicting an electrolytic cell in accordance with the present disclosure.

A hydrogen production and use system 1000 as disclosed herein may comprise one or more of the following elements as depicted in FIGS. 10 and 11. An electrolytic cell 1100 is detailed in FIG. 11, which shows an exploded view of the cell consisting of steel electrodes separated by nylon membranes inside polyvinyl chloride ("PVC") gaskets sandwiched by acrylic sheets. The cell may comprise an alkaline electrolytic cell that separates water into its constituent components of hydrogen and oxygen. A mixture tank, such as a concentrated alkaline mixture tank may serve as the electrolyte source for the electrolytic cell. The alkali mixture may be prepared by mixing a base like potassium hydroxide ("KOH") or sodium hydroxide ("NaOH") with water. In the case of KOH, in embodiments, the concentration may be around 20%. The membrane for separation of gases within the cell may be made from a variety of materials. One such material is a nylon sheet with catalyst coating that has enough thread count to allow ion transfer and minimal gas transfer. The electrodes used may be, for example, stainless steel or nickel coated stainless steel.

Also provided may be gas bubbling tanks. The hydrogen and oxygen generated from the electrolytic cells may be passed through gas bubbling tanks. The tanks may be made with recirculation or non-recirculation modes. In a non-recirculation mode, the gas is bubbled through water and any impurities in the gas gets purified in the process. In recirculation mode, the gas is bubbled through KOH solution, which may be identical in concentration to the alkaline mixture tank. In this methodology, any additional electrolyte that flows out with the gas gets re-circulated into the alkaline mixture tank. The two bubbling tanks may be connected together, such as at the bottom, to ensure pressure maintenance across them. Dehumidifiers may also be included. The gas passed through the bubblers may have excess moisture content that reduces the combustion efficiency. Hence, the gas may be passed through dehumidifiers, which can use a desiccant, water-gas separator membranes, or other dehumidification technologies, or a combination thereof, to reduce the humidity content of the gas. A hydrogen burner arrangement is provided and a conventional hydrogen burner, as known in the art, may be connected to the dehumidifier, such as through a flashback arrestor.

In embodiments, there are no ports for air intake, as combustion of the hydrogen-air mixture may result in an elevated concentration of mono-nitrogen oxides ("NOx"), which in turn may result in a potential for flame flashback. The burner ports may have a small diameter, such as lower than 0.5 millimeters, to reduce the chance of any flame flashback. The ports may be aligned in such a way as to cross-ignite, resulting in combustion of the complete gas supply with a single spark. The hydrogen concentration throughout the supply line may be above the maximum combustion limit, and hence there is little safety hazard. The oxygen supply may be through a channel that is completely separate from the hydrogen one. The oxygen ports may be located on a plane perpendicular to the hydrogen ports to ensure proper mixing of the combustion mixture. Above the burner, a catalyst may be placed so as to lower the temperature of combustion, reducing the concentration of NOx generated. An economically feasible high temperature catalyst mesh may be used to lower the temperatures of combustion.

The power supply may supply a desired voltage that may be optimized according to the conditions of the system, such as the water temperature, pressure, etc. The voltage per cell may vary, such as from 1.4 v to 2.3 v, and the current density may be as low as 44 mA/cm$^2$ for maximum efficiency. As the current density is low, the efficiency tends to be high.

An LPG/cooking gas burner arrangement may be provided. The LPG/cooking gas burner arrangement may be added to the hydrogen burner arrangement. In embodiments, the system may be similar to a closed top burner arrangement, where the burner ports are along the sides of the burner and the flame fueled by the LPG surrounds the hydrogen flame. In embodiments, the gas supply channel may be kept separate from the hydrogen supply channel and the oxygen supply channel and would hence pose no safety risk in that regard. In alternative embodiments, the fuels may be mixed, such as under control of a processor.

A renewable energy connection may be provided. In embodiments, the whole system, including the storage system, may be connected to renewable energy sources like solar power, wind power, water power, or the like. The hydrogen storage may act as storage for energy produced by such a renewable energy source.

In yet another embodiment of the system, the actuation of the combustion may be done using a sensor placed along the oxygen supply channel to detect the presence of a cooking utensil on the burner. The sensor may be shielded from the heat and made to work at an optimum temperature.

In yet another embodiment of the system, the hydrogen flame may be used to heat a coil that could hence radiate heat for more spread out cooking. The hydrogen supply to the radiator may be regulated by the temperature within the radiator.

In yet another embodiment of the system, the heat absorbed by the catalyst mesh may be used to generate electric power, increasing the net efficiency of the system.

Figure 12:
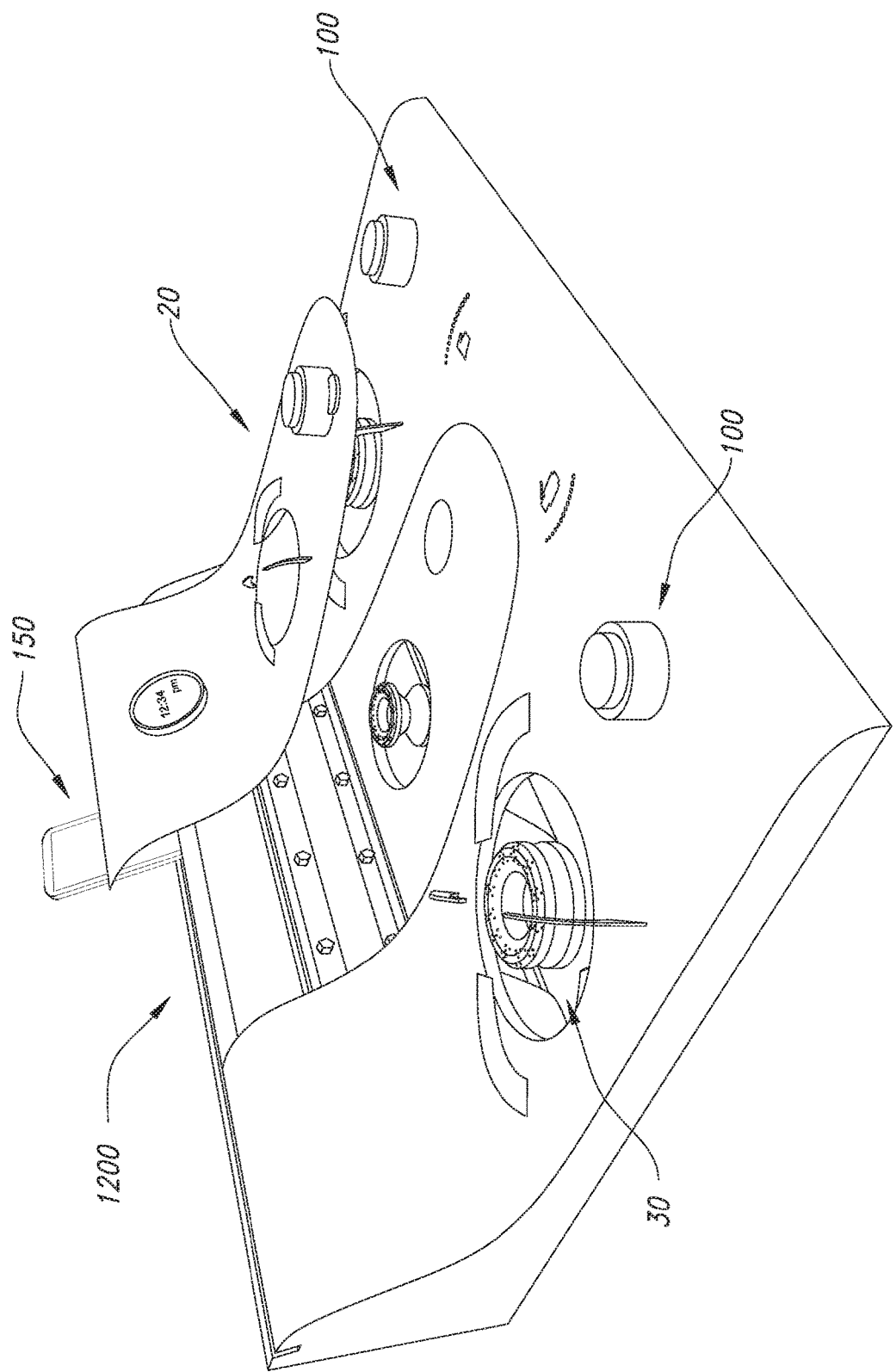
FIG. 12 is a diagrammatic view depicting a hydrogen production system integrated into a cooking system in accordance with the present disclosure.

The hydrogen production system may be integrated into a cooking system 1200 as depicted in FIG. 12, which may include the smart cooking system comprising a microcontroller with basic sensors, such as gyro, accelerometer, temperature and humidity. Other sensors like weight, additional temperature sensors, pressure sensors, and the like may be mounted on the cooking system and, based upon various inputs from the user and the system (including optional remote control), the actuators may control the cooking temperature, time and other cooking functions.

A speaker may sometimes be used to read out the output or simply play music.

The microcontroller may also be interfaced with a display and touch interface.

The microcontroller may be connected with the cloud, where information regarding recipes, weight and temperature, and the like may be stored and accessed by the controller. The microcontroller may also provide information on the user's cooking patterns.

In an embodiment, smart system configuration, control, and cooking algorithms may be executed by computers (e.g., in the cloud) to process all gathered and sensed information, optionally providing a recommendation related to the operation to the end user. The recommendation may include suggesting suitable recipes, auto turning of the heat in the burner, and the like. The microcontroller may communicate via Bluetooth low energy ("BLE"), Wi-Fi and/or Lowaran, or the like, such as to ensure connectivity to the cloud. Lowaran is a wireless network that leverages long-range radio signals for communicating between IoT devices and cloud devices via a central server. The microcontroller may be designed in such a way that it has enough processing power to connect to other IoT devices that may have little or no processing power and also do processing for these IoT devices to give the end user a smart and intelligent, all in one, smart home solution.

FIG. 13 and FIG. 14 depict auto-switching connectivity 1300 in the form of ad hoc Wi-Fi from a cooktop 1310 through nearby mobile devices 1320 may be performed in the event of unavailability of a common home Wi-Fi router 1340 to ensure cloud connectivity 1360 whenever possible. FIG. 13 depicts a normal connectivity mode when Wi-Fi 1340 is available. FIG. 14 depicts ad hoc use of local mobile devices 1400 for connectivity to the cloud 1360.

Figure 15:
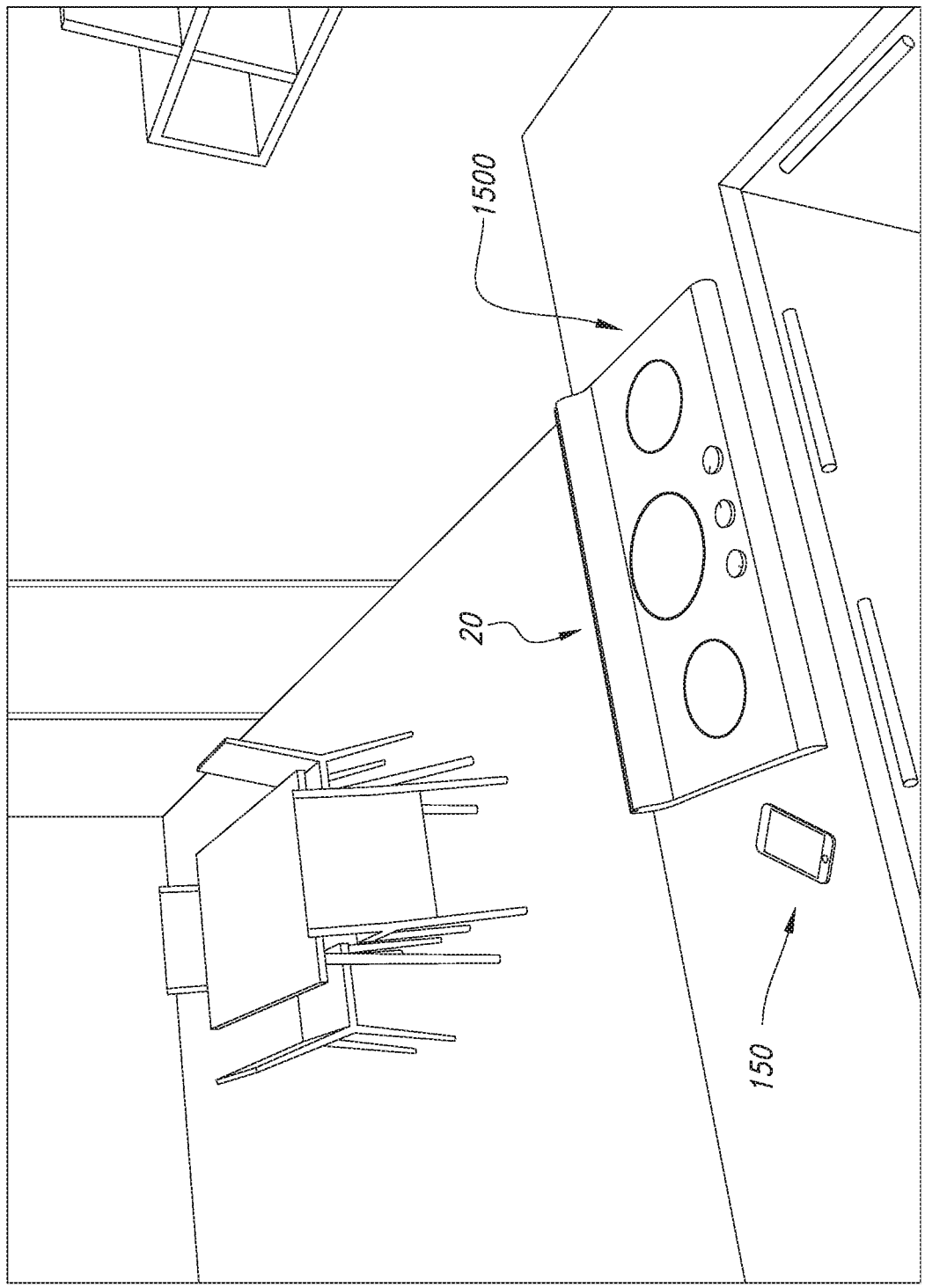
FIG. 15 is a perspective view depicting a three-element induction smart cooking system in accordance with the present disclosure.
Figure 16:
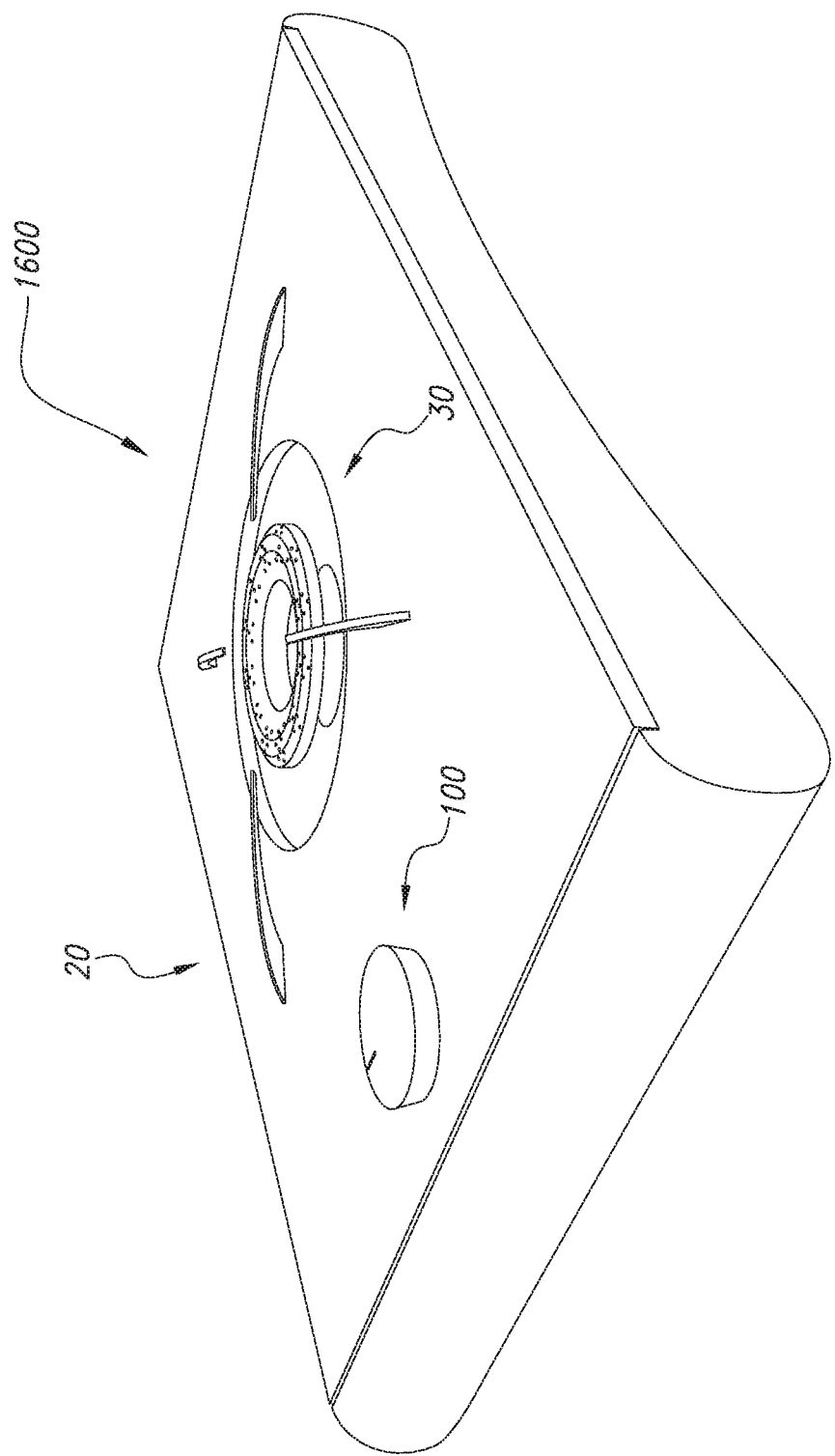
FIG. 16 is a perspective view depicting a single burner gas smart cooking system in accordance with the present disclosure.
Figure 17:
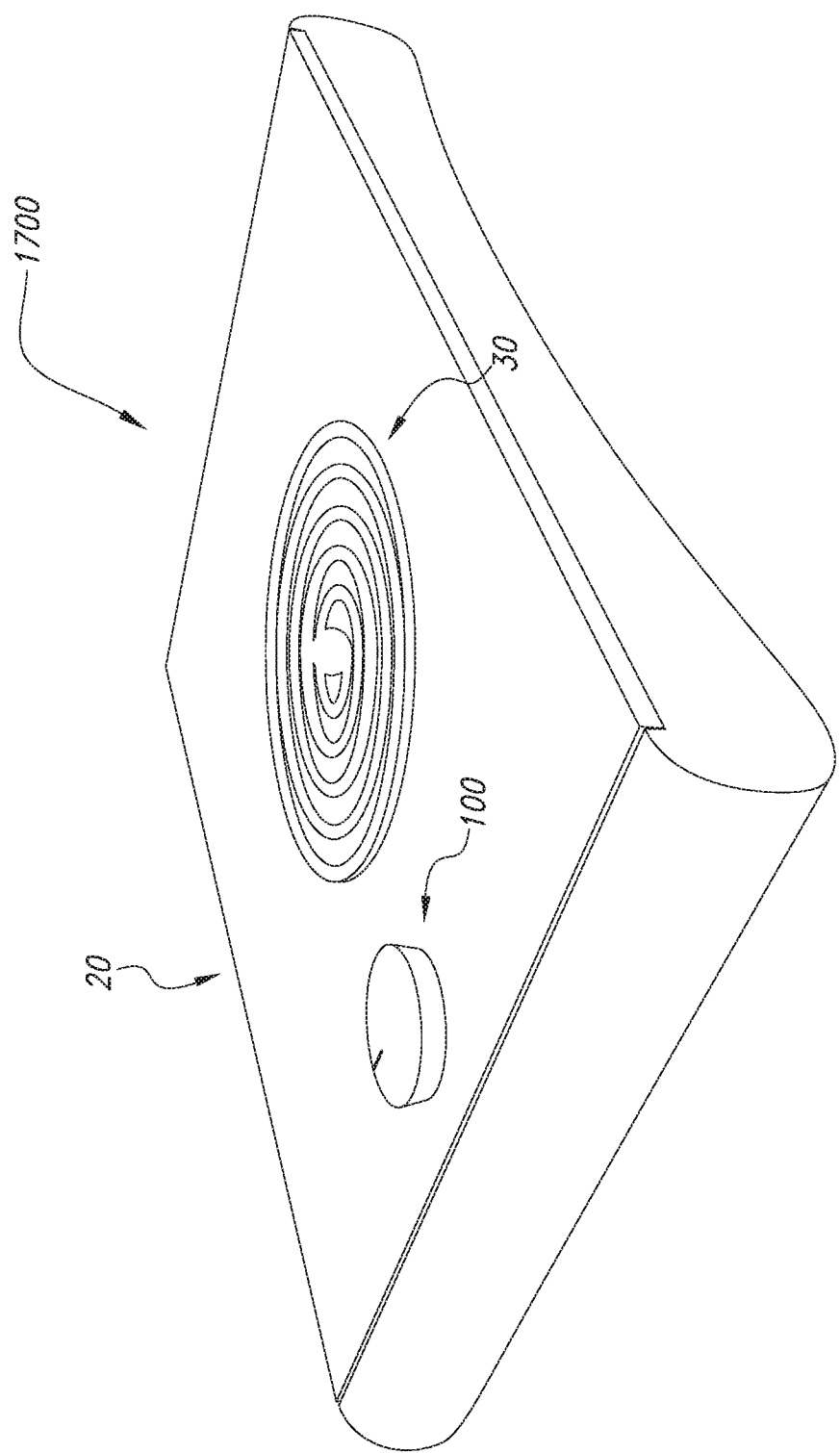
FIG. 17 is a perspective view depicting an electric hot plate smart cooking system in accordance with the present disclosure.
Figure 18:
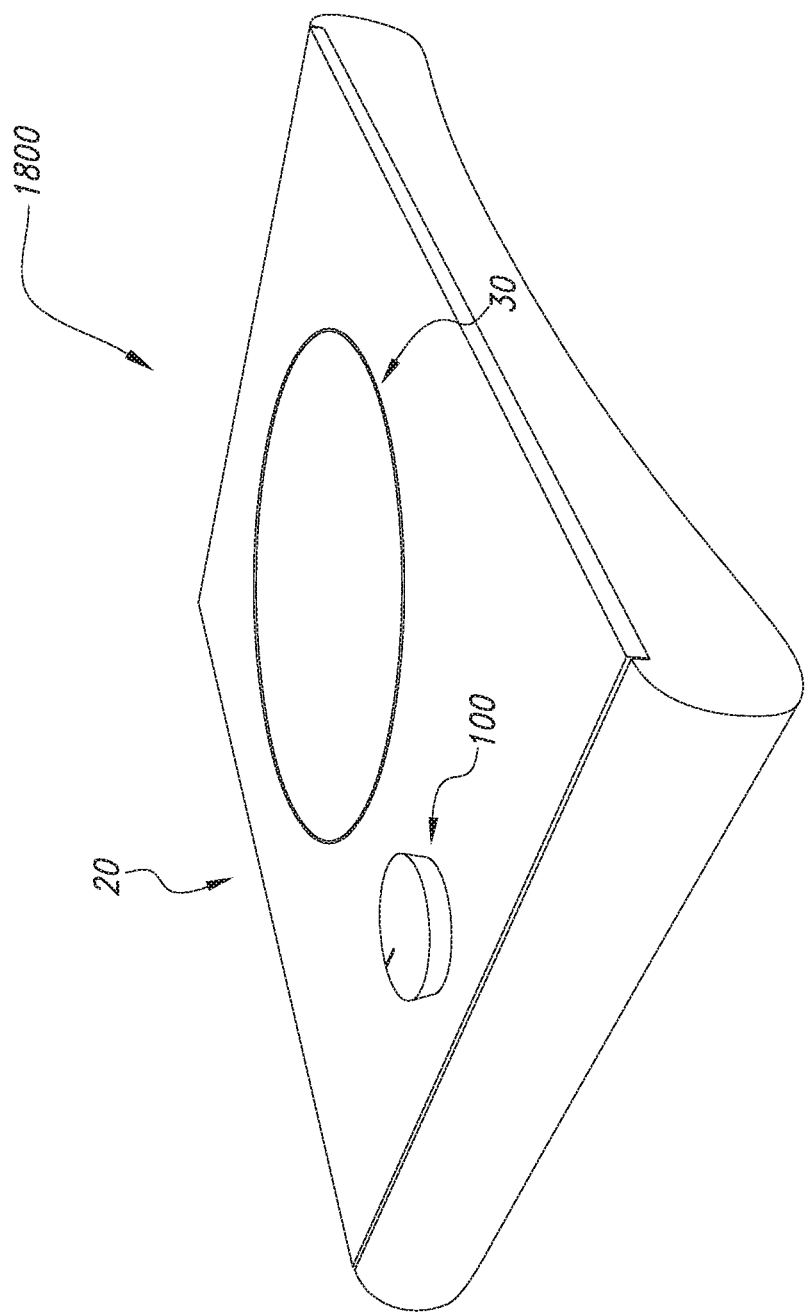
FIG. 18 is a perspective view depicting a single induction heating element smart cooking system in accordance with the present disclosure.

Additional smart cooking system features and capabilities may include weight sensors for each heating element that, when combined with cooking learning algorithms, may control fuel consumption to minimize overcooking and waste of fuel. This may also benefit configurations that employ multiple heating elements, so that unused heating elements do not continue to operate and waste fuel. FIG. 15 depicts a three-element induction smart cooking system 1500. Heating elements may be gas-based or may alternatively include heating with induction, electric hot plate, electric coil, halogen lamp, and the like. FIG. 16 depicts a single burner gas smart cooking system 1600. FIG. 17 depicts an electric hot plate (coil) smart cooking system 1700. FIG. 18 depicts a single induction heating element smart cooking system 1800.

Another embodiment of smart cooking technology described herein may be an intelligent, computerized knob, dial, slider, or the like suitable for direct use with any of the cook tops, probes, single burner elements, and the like described herein. Such a smart knob 2000 may include all electronics and power necessary for independent operation and control of the smart systems described herein. References to a smart knob 2000 should be understood to encompass knobs, dials, sliders, toggles and other physical user interface form factors that are conventionally used to control temperature, timing and other factors involved in heating, cooking, and the like, where any of the foregoing are embodied with a processor and one or more other intelligent features.

The smart knob 2000 may include an embodiment with a digital actuator, such as for electric-based cooking systems and another embodiment with a mechanical actuator, such as for gas models. The smart knob 2000 may be designed with portability and functionality in mind. The knob may include a user interface (e.g., display, audio output, and the like) through which it may provide users step-by-step recipes, and the like. The smart knob 2000 can operate wirelessly, so that it can set alarms and also monitor the operation of a plurality of smart cooking systems 20 even if it is removed from the cooking system actuator. The smart knob 2000 may, in embodiments, store information that allows it to interface with different kinds of cooking systems, such as by including programs and instructions for forming a handshake (e.g., by Bluetooth™ or the like) with a cooking system to determine what control protocol should be used for the cooking system, such as one that may be managed remotely, such as in a cloud or other distributed computing platform.

In embodiments, a user may bring the smart knob 2000 in proximity to the cooking system 20, in which case a handshake may be initiated (either under user control or automatically), such that the smart knob 2000 may recognize the cooking system 20 and either initiate control based on stored instructions on the knob 2000 or initiate a download of appropriate programming and control instructions for the cooking system 20 from a remote source, such as a cloud or other distributed computing platforms to which the knob 2000 is connected. Thus, the knob 2000 serves as a universal remote controller for a variety of cooking systems, where a user can initiate control using familiar motions, such as turning a dial to set a timer or temperature setting, moving a toggle or slider up or down, setting a timer, or the like. In embodiments, a plurality of knobs 2000 may be provided that coordinate with each other to control a single burner or heating element or a collection of burners or heating elements. For example, one of the knobs 2000 in a pair of knobs might control the temperature of a burner or heating element, while a second knob in the pair might control timing for the heating.

In embodiments, the smart knob 2000 may be used to embody complex protocols, such as patterns of temperatures over time, such as suitable for heating an item to different temperatures over time. These may be stored as recipes, or the like, so that a user can simply indicate, via the knob 2000, the desired recipe, and the knob 2000 will automatically initiate control of a burner or heating element to follow the recipe.

A user may use the smart knob 2000 with an induction cooking system for controlling the temperature of a cooking system, such as an induction stove, providing step-by-step instructions, and the like. The user may, for example, switch to cooking with a gas burner-based smart cooking system by simply taking the smart knob 2000 off of the induction cooking system, configuring it to operate the gas burner cooking system (such as by initiating an automated handshake), and mounting the knob 2000 in a convenient place, such as countertop, wall, refrigerator door, and the like. It should be noted that while the knob 2000 may be placed on the cooking system, once a connection has been established, such as by Bluetooth™, near-field communication ("NFC"), Wi-Fi, or by programming, the knob 2000 may be placed at any convenient location, such as on the person of a user (such as where a user is moving from place to place in an industrial environment), on a dashboard or other control system that controls multiple devices, or on another object. The knob 2000 may be provided with alternative interfaces for being disposed, such as clips for attachment to objects, hook-and-loop fasteners, magnetic fasteners, and physical connectors.

The smart knob 2000 can use, include or control the various features of the smart cooking systems 20 described throughout this disclosure. Additionally, the smart knob 2000 can be connected to other IoT devices, such as smart doorbell, remote temperature probe (e.g., in a refrigerator or freezer), and the like. The smart knob 2000 can be used for kitchen tasks other than cooking. By connecting with a temperature probe, the smart knob 2000 can be used to inform a user of the progress of an item placed in the refrigerator or freezer to cool down.

As it requires only very little power and as it is mountable on the smart cooking system 20, the smart knob 2000 may, in embodiments, be recharged through thermoelectric conversion of the heat from a burner on the cooking system 20, so that the use of external power supply is not required.

FIGS. 19-26 depicts a variety of user interface features 2010, 2020, 2100, 2200, 2300, 2400, 2500, 2600 of the smart knob 2000.

Figure 27:
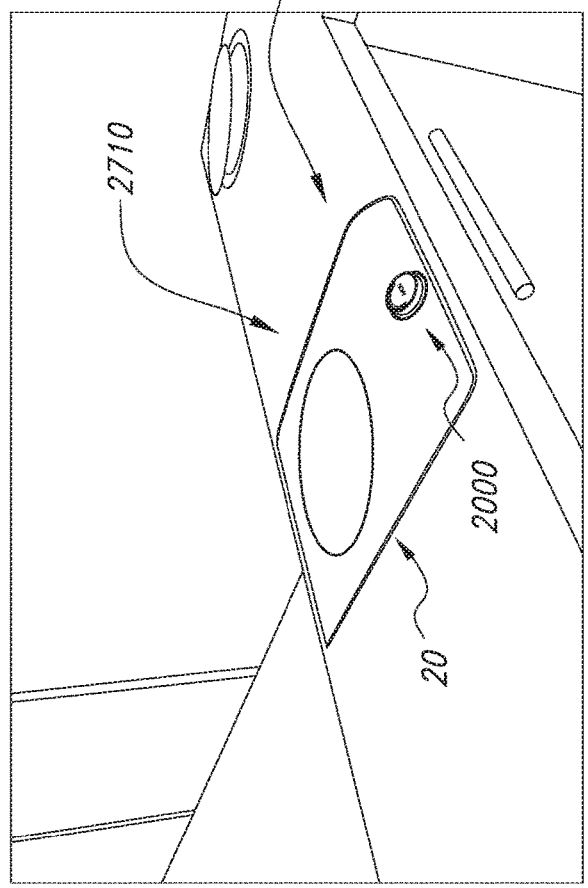
FIG. 27 is a perspective view depicting a smart knob deployed on a single heating element cooking system in accordance with the present disclosure.
Figure 28:
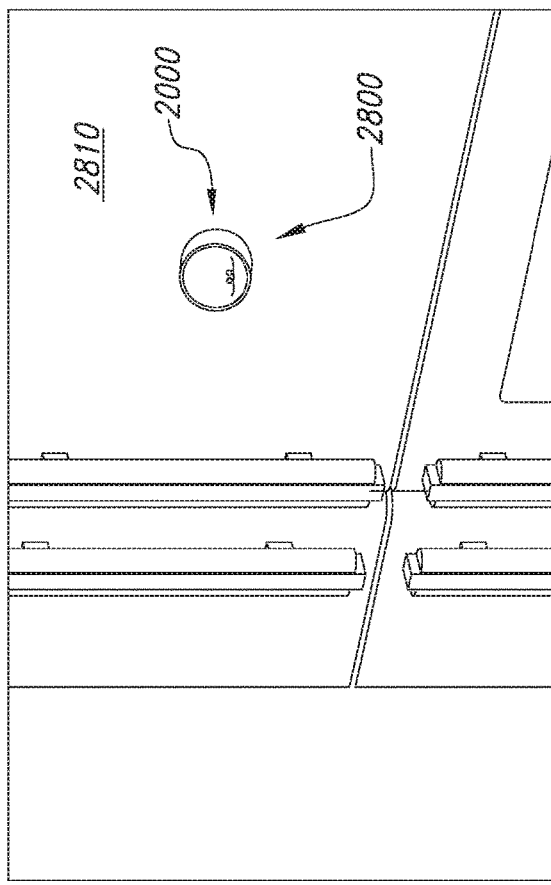
FIG. 28 is a partial perspective view depicting a smart knob deployed on a side of a kitchen appliance for a single heating element cooking system in accordance with the present disclosure.
Figure 39:
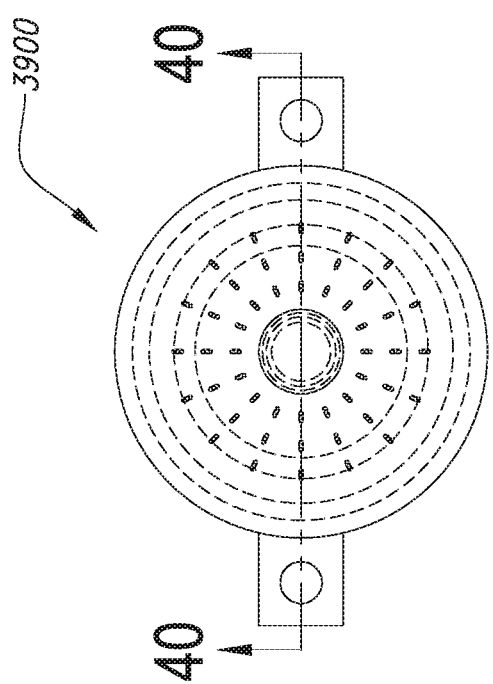
FIG. 39 and FIG. 41 are diagrammatic views depicting a burner design contemplated for use with a smart cooking system in accordance with the present disclosure.
Figure 41:
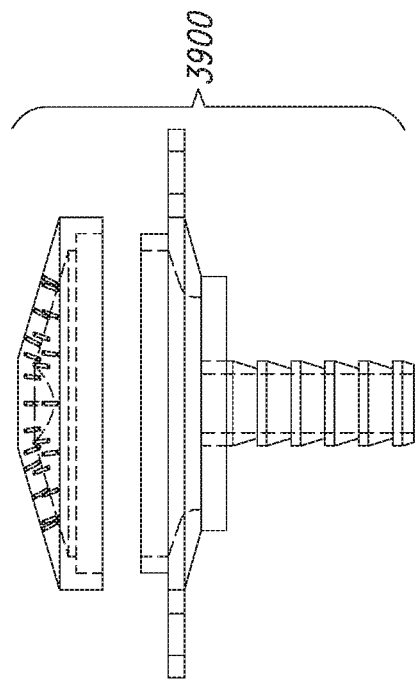
Figure 40:
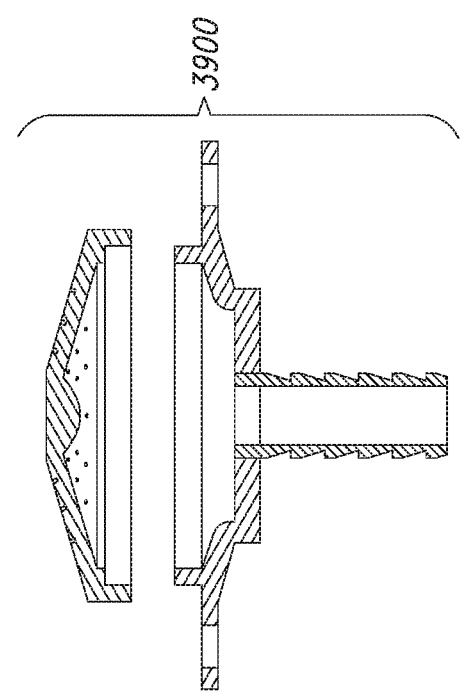
FIG. 40 is a cross-sectional view of FIG. 39.
Figure 46:
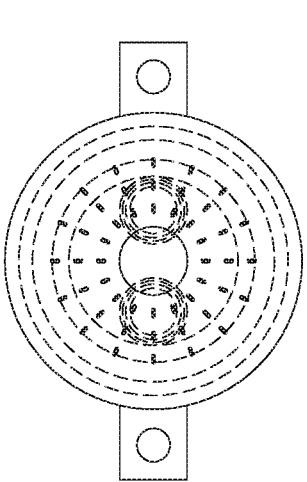
FIG. 42, FIG. 44, and FIG. 46 are diagrammatic views depicting a burner design contemplated for use with a smart cooking system in accordance with another example of the present disclosure.
Figure 43:
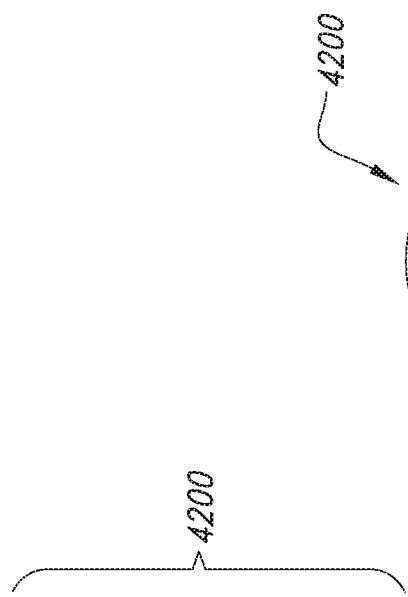
FIG. 43 and FIG. 45 are cross-sectional views of FIG. 42 and FIG. 44, respectively.
Figure 45:
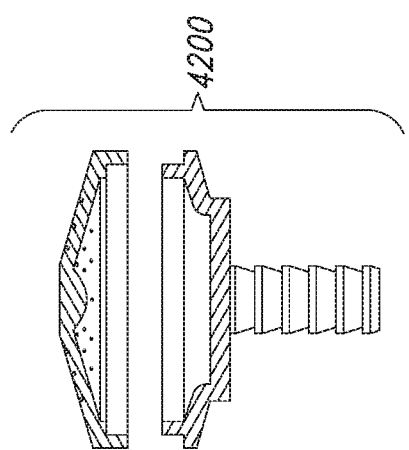
Figure 42:
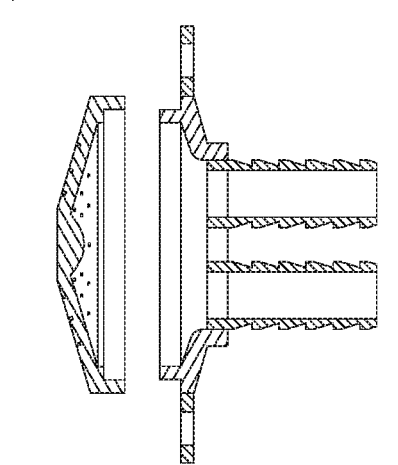
Figure 44:
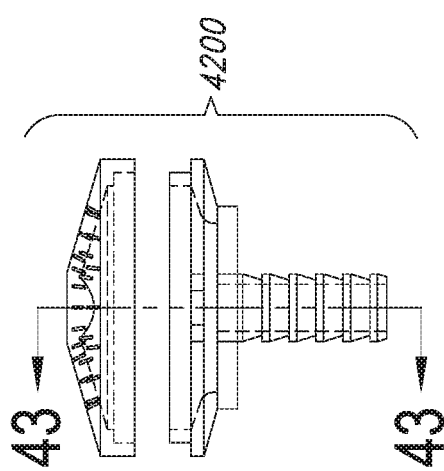

FIG. 27 depicts a smart knob 2700 deployed on a single heating element cooking system 2710, while FIG. 28 depicts a smart knob 2800 placed on a side of a kitchen appliance 2810.

Other features of a smart cooking system 20 may include examples of smart temperature probes 3000 depicted in FIGS. 29-32. The temperature probe 3000 may consist of a wired or wireless temperature sensor that can be interfaced with a smart cooking system 20, smart knob 2000, and/or a mobile phone 150 for cooking. The temperature probe 3000 can, in embodiments, be dipped into a liquid (such as a soup, etc.) or inserted interior of a solid (such as a piece of meat or a cooking baked good), to cook very precisely based on the measured interior temperature of the liquid or solid. Also, the smart temperature probe 3000 can facilitate the use of an induction base to control the temperature of the base for heating water to a precise temperature (e.g., for tea) with any type of non-magnetic cooking vessel.

The smart cooking system 20 may include a smart phone docking station 3300 that may be configured to prevent cooking heat from directly impacting a device in the station while facilitating easy access to the phone for docking, undocking and viewing. A variety of different docks 3310, 3400, 3500, 3600, 3700, 3800 for compatibility with a range of smart phone and tablet devices are depicted in FIGS. 33-38.

Various burner designs are contemplated for use with a smart cooking system as described herein. FIGS. 39-55 depict exemplary burners 3900, 4200, 4700, 5000, 5300.

The Internet-connected smart cooking system 20 described herein may include tools and features that can help a user, such as a homemaker, a commercial chef, or cook in an industrial environment to prepare healthier meals, learn about food choices of other users, facilitate reduced meal preparation time, and repeatable cooking for improved quality and value. A few applications that can leverage the capabilities of the present Internet-connected smart cook top may include a fitness application that helps one estimate daily calorie consumption requirements for each member of a user's family or other people for whom the user may prepare meals. This may help a user to control and track the user's family fitness over time. Using data from recipes and weight sensors for pots/pans used to cook the food for the recipes, a fitness application may generate a calorie consumption estimate and suggest one or more healthy alternative recipes. Through combining sensing and control of the cook top functionality (e.g., burners) with Internet access to food nutrition and weight values for recipe ingredients being cooked, the calorie count of a content of a pan placed on a smart cook top burner can be estimated. As an example, if a recipe calls for ¼ cup of lentils per serving combined with a serving-unit of water, a total weight of a pan being used to prepare the lentils can be sensed. By knowing the weight of the pan, a net weight of the ingredients in the pan can be calculated so that a number of servings in the pan can be determined by calculating the total weight and dividing it by a weight per serving. By accessing recipe comparison tools (e.g., as may be available via resources on the Internet) that may include lists of corresponding meals that have lower fat, higher nutritional ingredients, alternate recipes could be suggested to the user that would provide comparable nutrition with lower calories or fat, for example.

A food investigation application may gather information from the smart cook tops and user activity about recipes being used by users of the smart cook top systems throughout a region (e.g., a country such as India) to calculate various metrics, such as most often cooked recipe, preferred breakfast meal, popular holiday recipes, and the like. This information may be useful in planning purposes by food suppliers, farmers, homeowners, and the like. As an example, on any given day, information about the recipes that people in your region are preparing might be useful in determining which dishes are trending. An Internet-based server that receives a recipe and corresponding limited demographic information over time may determine which meals are trending. A count of all uses of all recipes (or comparable recipes) during a period of time (e.g., during evening meal preparation time) can be calculated and the recipes with the greatest use counts could be identified as most popular, currently trending, and the like.

Cooking becomes more repeatable so a cook (e.g., a less experienced cook) can rely on the automation capabilities of an Internet-connected smart cook top system to avoid mistakes, like overcooking, burning due to excessive heat, and the like. This may be possible due to use of information about the items being cooked and the cooking environment, such as the caloric output value of each burner in any heat output setting, the weight of the food being cooked, target temperature and cooking time (e.g., from a recipe), a selected doneness of the food, and the like. By combining this information with modeled and/or sensed burner operation (e.g., temperature probes may be used to detect the temperature of the food being cooked, the temperature of the cooking environment, and the like) to facilitate automated control of heat, temperature, and cooking time thereby making meal cooking repeatable and predictable. Each type of burner (e.g., induction, electric, LP gas, hydrogen gas, and the like) can each be fully modeled for operational factors so that cooking a recipe with induction heating today and with hydrogen gas heat tomorrow will produce repeatable results. Similar capabilities to combine information from the cooking system and information from sensors or other systems may be used to improve repeatability and improvement of industrial processes, such as manufacturing processes that produce materials and components through heating, drying, curing, and the like.

In embodiments, the methods and systems disclosed herein can include, connect with or be integrated with hydrogen production, storage, and use systems. In embodiments, the hydrogen production, storage, and use systems may use renewable energy as a source of energy for various operations including hydrogen production, hydrogen storage, distribution, monitoring, consumption and the like. In embodiments, hydrogen production, such as with a hydrolyzer system, may be powered by renewable energy such as solar power (including systems using direct solar power and photovoltaic systems (including ones using semiconductors, polymers, and other forms of photovoltaic), hydro power (including wave motion, running water, or stored potential energy), gravity (such as involving stored potential energy), geothermal energy, energy derived from a thermal gradient (such as a temperature gradient in a body of water, such as ocean water, or a temperature gradient between a level of the earth, such as the surface, and another level, such as a subterranean area), wind power and the like and where applicable. References to renewable energy throughout this disclosure should be understood to encompass any of the above except where the context indicates otherwise.

In embodiments, solar collector panels or the like may be configured with a hydrogen production system, such as a system described herein, to provide electricity for powering the production of hydrogen, including from water. A hydrogen production system may be built with integrated solar collector panels and the ability to connect to further solar systems, so that placement of the hydrogen production system in an ambient environment that is exposed to sunlight may facilitate its self-powered operation or partially-self-powered operation via solar power.

In embodiments, solar power harvesting subsystems, such as a single panel or an array of solar panels, may be configured to be deployed separately, and optionally remotely, from the hydrogen production system. Solar power harvesting subsystems may be connected to one or more hydrogen production systems to facilitate deployment in environments with localized limited access to sunlight, such as in a multi-unit dwelling, a building with few windows, a building with interior areas that do not receive direct or sufficient sunlight (such as a warehouse, manufacturing facility, storage facility, laboratory, or the like) and the like. Other operational processes of a system for hydrogen production, storage, and use may be powered via solar power.

Solar energy harvested for the production of hydrogen may be shared and/or diverted to these other operations or sold back into the local grid as needed. Solar energy harvesting may also be used to charge a battery, charge various thermal systems, or other electrical energy storage facility that may directly provide the energy needed for hydrogen production immediately or with a time-shift and on-demand functions and other operational elements as described herein. In this way, while solar power provides a renewable source of energy, the impact of an absence of sunlight and therefore diminished solar power production may be mitigated through the use of an intermediate battery or the like. In embodiments, a data collection system, involving one or more sensors and instruments, may be used to monitor the solar power system or components thereof, including to enable predictive maintenance, to enable optimal operation (including based on current and anticipated state information), and the like. Monitoring, remote control, and autonomous control may be enabled using machine learning and artificial intelligence, optionally under human training or supervision, as with other embodiments described herein. These capabilities for data collection, monitoring, and control, including using machine learning, may be used in connection with the other renewable energy systems, and components thereof, described throughout this disclosure.

In embodiments, the methods and systems disclosed herein can include, connect with or be integrated with other sources of renewable energy including wind power. Wind power may be harvested through a windmill, turbine, roots-blade configuration, or similar wind power collection facility that may be configured with the hydrogen production, storage and use systems and components similar to a solar collection facility or other electric sources as described herein. In many examples, configuring a turbine or similar wind power collection and conversion device attached to a hydrogen production, storage, and use system may facilitate deployment in a variety of environments where sufficient moving gas (such as blowing wind, air flowing around a moving element (such as part of a vehicle), exhaust from an industrial machine or process, or the like) is available. These and other embodiments are intended to be encompassed by the term "air flow" in this disclosure except where the context indicates otherwise.

In embodiments, a variety of sources of air movement may be utilized as a source of power from the air flow. In various examples, heated air that may result from the use of the hydrogen, such as for cooking and the like, may pass through a wind harvesting facility, such as a turbine that may be disposed in the heated air flow path. In embodiments, other heat harvesting devices may be deployed such as positive displacement device or other heated mediums through which energy can be absorbed and power a suitable heat engine. In embodiments, disposing a turbine directly above a stove, cooking system, or other heat generating use of the hydrogen produced may produce energy that may be used to power, directly or indirectly, partially or wholly, such as through recharging a battery, operational processes of a hydrogen production, storage and use system.

In yet another use of renewable energy for powering one or more operational processes of a hydrogen production, storage, and/or use system, such as may be described herein, hydropower may be a source of renewable energy. In embodiments, hydropower may be converted into a form that is usable to operate processes of a hydrogen production, storage and use system as described herein including electrical production and possibly harvesting mechanical power. In these examples, electricity from hydropower may be utilized to operate a hydrolyzer to produce hydrogen from a hydrogen source, such as water or ambient air-based water vapor. In embodiments, configuring a hydrogen production, storage, and use system that may directly utilize hydro power may involve building an enclosure that keeps a source of hydropower, such as a moving body of water (e.g., a river, waterfall, water flowing through a dam, and the like) from interfering with the operational processes such as hydrogen production, storage, and use. In embodiments, such an enclosure may facilitate deployment of a hydropower-sourced system directly in a flow of water by making at least portions of such a system submersible. Hydrogen production and storage, for example, may benefit from such an enclosure. In particular, a submersible hydrogen production system may take advantage of the hydrodynamic water in which the system is submerged as a source of hydrogen, as a source of energy to produce the hydrogen, as a source to cool the process, or the like.

Figure 57:
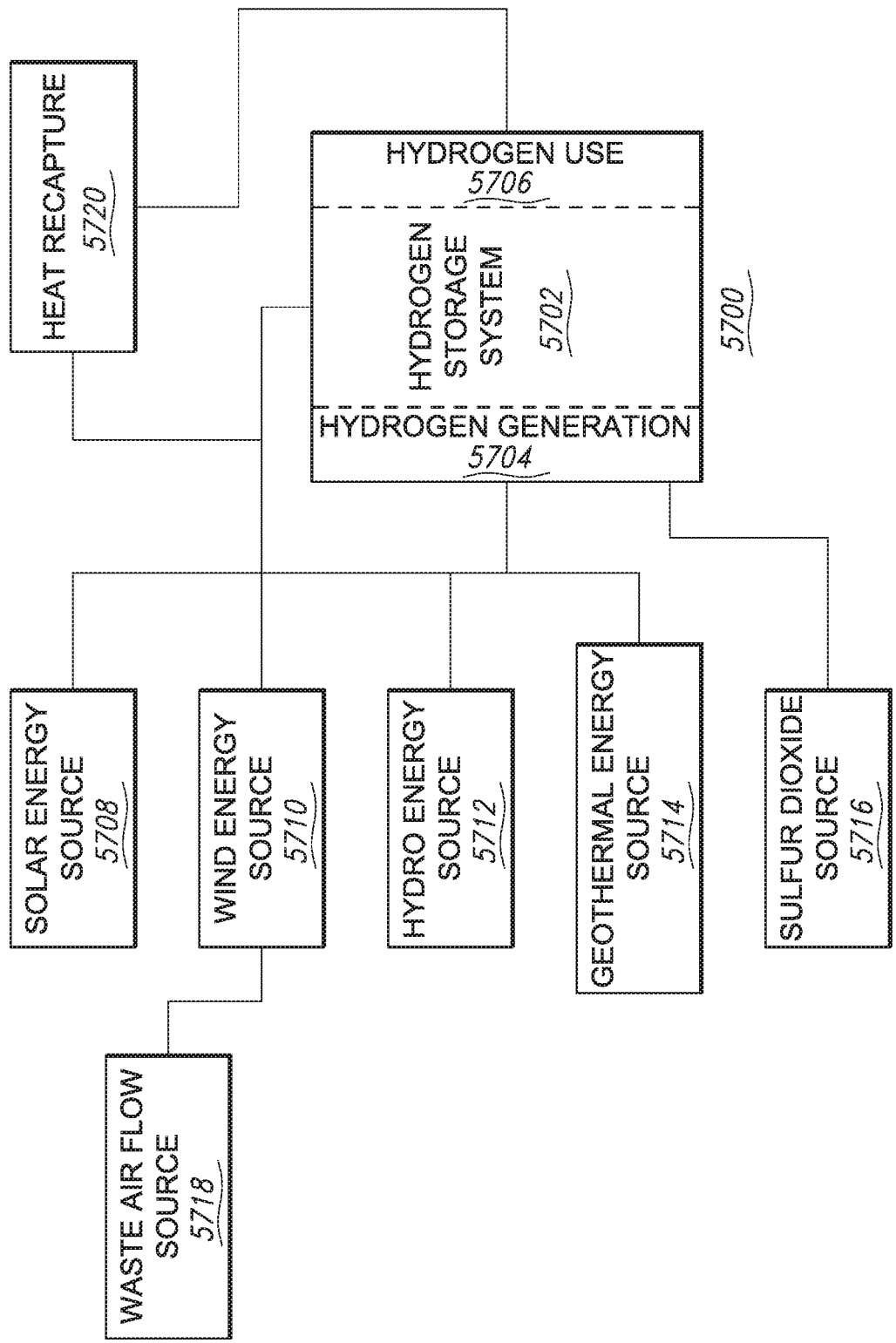
FIG. 57 is a diagrammatic view that depicts methods and systems related to renewable energy sources for hydrogen production, storage, distribution and use in accordance with the present disclosure.

Referring to FIG. 57, embodiments of the methods and systems related to renewable energy sources for hydrogen production, storage, distribution and use are depicted. A system the facilitates the use of renewable energy as described herein may include a hydrogen production facility 5074 that may be coupled to a hydrogen storage facility 5702. The hydrogen production facility 5704 and/or the hydrogen storage facility 5702 may be coupled to one or more hydrogen use facilities 5706. One or more of the hydrogen use facilities 5706 may be coupled through a hydrogen distribution network (not shown).

Hydrogen production, storage, distribution, and use may be at least partially powered by one or more renewable energy sources, such as solar energy source 5708, wind energy source 5710, hydro energy source 5712, geothermal energy source 5714, and the like. A wind energy source 5710 may be natural air currents, motor driven air currents, air currents resulting from movement of a vehicle, or waste air flow sources 5718 (such as waste heat from heating operations, such as cooking and the like). Any of these renewable energy sources may be converted into a form of energy that is suitable for an intended use by the hydrogen production, storage, distribution, and use system. As an example, a solar energy source 5708 may be converted to electricity as described herein to provide electrical power to the hydrogen production facility 5704, hydrogen storage facility 5702, use facility 5706 and the like.

Another form of energy that may be sourced by the hydrogen production facility 5704 may include a sulfur dioxide source 5716, such as fossil fuel combustion systems that produce waste sulfur dioxide. As described herein, a sulfur dioxide source 5716 may supply heat energy and raw material from which hydrogen gas may be produced by a hydrogen production facility 5704 adapted to use sulfur dioxide.

Yet another form of energy that may be sourced by the hydrogen production facility 5704 and/or storage facility 5702 may include heat recapture 5720 from one or more of the hydrogen use facilities 5704. The recovered heat may be used directly, converted into another form, such as steam and/or electricity, or provided as input raw material from which hydrogen may be harvested.

Figure 58:
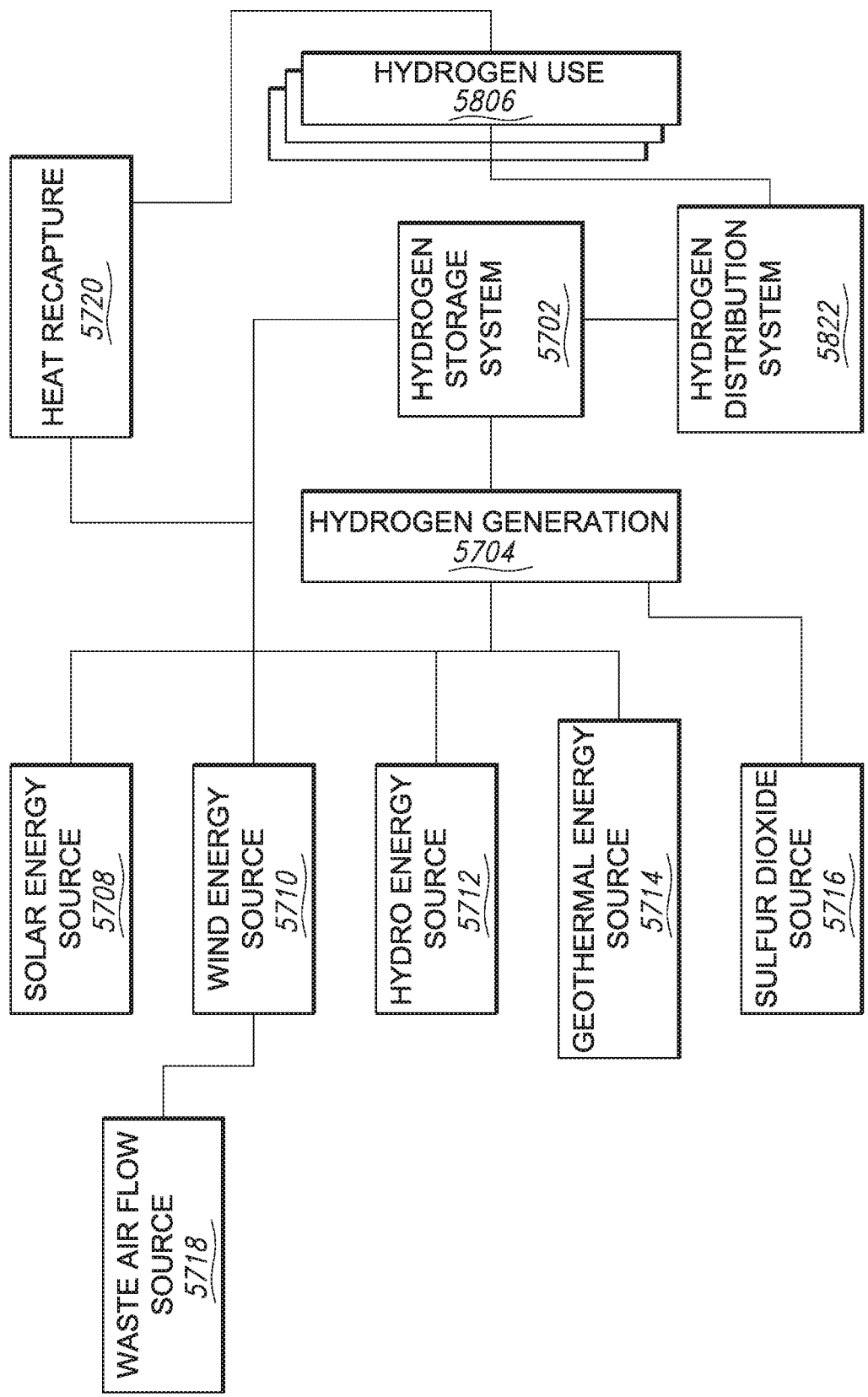
FIG. 58 is a diagrammatic view that depicts methods and systems related to renewable energy use with at least one hydrogen production facility and at least one hydrogen storage facility in accordance with the present disclosure.

Referring to FIG. 58, an alternate embodiment of renewable energy use with at least one hydrogen production facility 5704, at least one hydrogen storage facility 5702. In the embodiment of FIG. 58, hydrogen production, storage, distribution, and uses may be connected, but may not be integrated, such as into a standalone combined function system. In the embodiment of FIG. 58, renewable energy sources as described for the embodiment of FIG. 57 may be used to provide energy for hydrogen production 5704 and storage 5702. However, hydrogen use may be provided through a hydrogen distribution system 5822 that may be coupled to the hydrogen production facility 5704, storage facility 5702 and to hydrogen use facilities 5706 that may be located at distinct physical locations, such as individual apartments in an apartment building, and the like.

Figure 59:
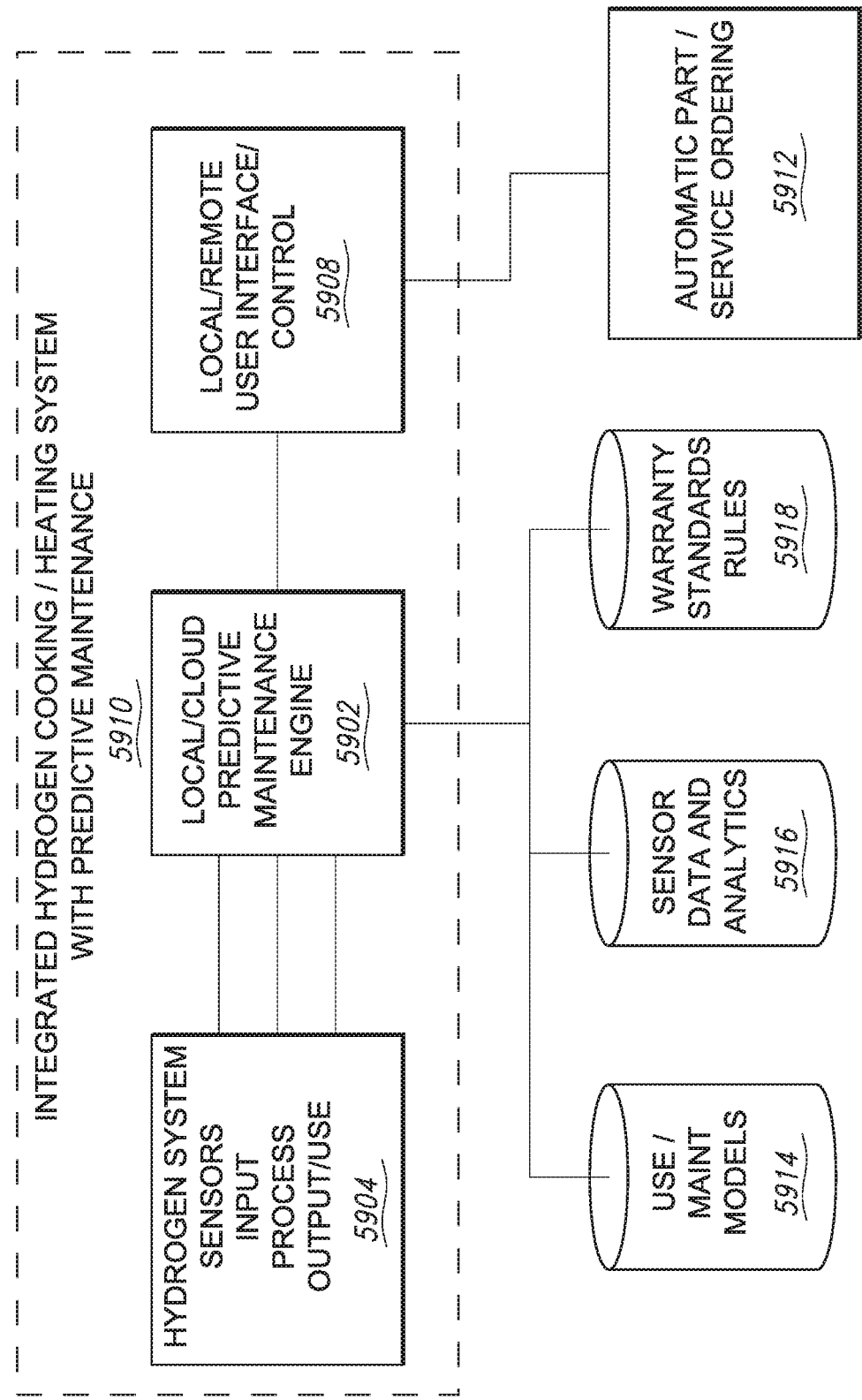
FIG. 59 is a diagrammatic view that depicts methods and systems related to hydrogen production, storage, distribution, use, and control that may be coupled with predictive maintenance methods and systems to facilitate improved operation with less unplanned downtime and fewer component failures in accordance with the present disclosure.

Referring to FIG. 59, the methods and systems described herein for hydrogen production, storage, distribution, use, and control may be coupled with predictive maintenance methods and systems to facilitate improved operation with less unplanned downtime and fewer component failures. In the embodiment of FIG. 59, predictive maintenance facility 5902 may be configured to operate on a processor associated with or more particularly integrated with a hydrogen production, storage, and use facility. Alternatively, predictive maintenance facility may be configured to operate on a processor that is not integrated, such as a cloud computer, a stand alone computer, a networked server, and the like. Predictive maintenance facility 5902 may receive input from various system sensors 5904 along with information from various data sets, such as a use/maintenance model 5914, warranty and standards rules 5918, and an archive of sensor data and analytics derived there from 5916, among other sources.

System sensors 5904 may include hydrogen system sensors, input energy sensors, process sensors (e.g., catalytic sensors and the like), output sensors, use sensors, and a range of other sensors as described herein. Each or any of these sensors may provide data directly or through an intermediate processor to the predictive maintenance facility 5902. For a local/integrated predictive maintenance facility 5902, sensor data may be provided through a range of inputs, including direct inputs and the like. For a remote/cloud preventive maintenance facility, sensor data may be provided through a networking interface, such as the Internet, an intranet, a wireless communication channel, and the like.

The predictive maintenance facility 5902 may further be coupled with a local or remote user interface for providing reports, facilitating control, interacting with the predictive maintenance facility 5902 to facilitate user participation in maintenance actions, planning, and analysis. The user interface facility 5908 may be integrated with the predictive maintenance facility 5902, such as being an integrated component of a hydrogen production, storage, and use system. Alternatively, the user interface 5908 may be remotely accessible, such as through a network including without limitation the Internet and the like.

To facilitate at least semi-automated predictive maintenance, replacement parts, service, and the like may be automatically ordered based on a result of the predictive maintenance facility 5902 indicating that some form of preventive activity is required. The automatic part/service ordering facility 5912 may be connected directly or indirectly to the user interface/control facility 5908 to enable users to approve or adjust an automated order.

The embodiments of FIG. 59 include at least two configurations; (i) an integrated hydrogen cooking/heating system with predictive maintenance 5910, and (ii) modular system that may take advantage of shared resources such as cloud computing capabilities, cloud storage facilities and the like.

In embodiments, the methods and systems disclosed herein can include, connect with or be integrated with one or more computing device functions that interface with operational, monitoring, and other electronic aspects of a hydrogen production, storage and optional use system as described herein and that may be accessed through a variety of interfaces. Functions, several of which are described elsewhere herein, may include control and monitoring of hydrogen production, control, and monitoring of hydrogen storage including distribution and the like, control and monitoring of the use of generated and/or stored hydrogen. In embodiments, access to these functions, such as to provide control input and receive monitor output, may be done through an interface, such as an application programming interface (API) or an interface to one or more services, such as in a services oriented architecture, that may expose certain aspects of these functions, services, components, or the like, to facilitate access thereto. The terms "API" or "application programming interface" should be understood to encompass a variety of such interfaces to programs, services, components, computing elements, and the like except where the context indicates otherwise. In embodiments, API type interfaces may include a library of features, such as algorithms, software routines, and the like through which the exposed aspects may be accessed. In embodiments, API type interfaces may facilitate access to a control function of a hydrogen production subsystem as described herein to enable third-party control and/or monitoring of the subsystem, to facilitate analytics with outside resources, to facilitate interconnection of multiple resources, coordination of fuel and renewables between multiple systems, and the like.

In embodiments, a single hydrogen production subsystem may be utilized to provide hydrogen to a plurality of hydrogen storage systems. By way of these examples, one or more of the hydrogen storage systems may use the API to access a flow valve, fuel distribution architecture, or the like that may facilitate distribution of hydrogen produced by the storage systems so that storage systems that are at or near storage capacity may direct a control function of the flow valve to reduce or stop distribution of the hydrogen to the storage system. In embodiments, Application programming interfaces may be utilized across a range of control and monitoring functions, including providing access to hydrogen consumption monitoring elements, renewable energy utilization monitoring systems, hydrogen use systems, smart cook top systems as described herein, and the like.

In addition to API type interfaces as described herein, a hydrogen production, storage, and use system may be accessed through one or more machine-to-machine interfaces. In embodiments, such interfaces may include directly wired interfaces, such as between a monitoring machine and a sensor disposed to sense the flow of water, the flow of energy used for hydrolysis, the flow of resulting hydrogen, or one or more levels, such as liquid levels, of any of the foregoing. In embodiments, machine-to-machine interfaces may be indirect, such as through a standard communication portal such as a network, e.g., an intranet, an extranet, the Internet, and the like. In embodiments, communication protocols such as HTTP and the like may be utilized to exchange control, monitoring, and other information between some portion of the hydrogen production, storage, and use system and another machine. In embodiments, a machine-to-machine interface may facilitate third party control of hydrogen use. This may manifest itself in a variety of modes, examples of which may be a user remotely accessing a cooking function from his mobile device using the Internet as a machine-to-machine interface between the mobile device and the cooking function.

In embodiments, interfacing with a hydrogen production, storage and use system as described herein may also be accomplished through a graphical user interface (GUI). In the many examples, such an interface may facilitate human direct access to control, monitoring, and other features of the system. In embodiments, a GUI may include a variety of screens that may be logically related to facilitating user access to a range of features of the system within a single GUI. In the many examples, there may be a main system GUI screen that may include links to a main production GUI screen that may include, among other things, links to further production GUI screens, e.g., a main screen may link to an energy source control screen, a storage system control, system health, predictive information, and the like. In embodiments, a main GUI screen may also facilitate accessing one or more GUI screens for other aspects of the system, such as hydrogen storage monitoring and control, hydrogen distribution monitoring and control, hydrogen use, cooking functions of a smart cooktop, heating functions for a heater subsystem, and the like.

In embodiments, the methods and systems disclosed herein can include, connect with or be integrated with predictive maintenance functions that may facilitate smart replacement of components thereby avoiding failure and down time. In embodiments, predictive maintenance functions that are described herein may be further enhanced using one or more sensors that may facilitate monitoring and/or control of portions of the system that may require maintenance. In the examples, one or more sensors may be deployed that facilitate monitoring and/or control of an electrolyzer function. By way of the examples, the one or more sensors that may monitor the membrane portion of the electrolyzer may provide data that may be useful for detecting one or more conditions that requires attention immediately or may culminate with other factors and may later require attention, such as a condition that requires the membrane to be replaced. Such sensors may further be configured to generate one or more alerts, such as audio, visual, electronic, logical signals when sensing a condition that may indicate replacement of the membrane or other portion of the hydrolyzer is recommended. Such sensors may further be configured to generate one or more alerts that may trigger one or more recordings of data from the sensors for a long duration to capture signals that may capture events at various intervals, frequencies, and magnitudes that may be indicative of the need to replace the membrane or other portion of the hydrolyzer.

In embodiments, such alerts may be generated by the sensors and/or by one or more computing facilities that may interface with the sensors and may analyze data from the sensors. In embodiments, sensors, such as a membrane sensor, may be integrated into the system physically (to monitor a physical aspect of the system), and/or logically (such as an algorithm that processes data from one or more sensors). In embodiments, one or more membrane sensors, or the like, may detect one or more conditions that may be indicative that another action or precaution should be taken. In embodiments, one or more alerts from such sensors may indicate the type of condition sensed as well as a degree of the condition sensed. In embodiments, when sensor alert and/or sensor data is combined with other information known about the system, an alert may be generated that indicates one or more actions or precautions that should be taken to counteract the condition causing the alert. In one example, an alert (or set of alerts) may require an action to reduce an amount of hydrogen being produced, such as by turning off or cycling with a greater duty cycle the operation of the hydrolyzer.

In embodiments, the methods and systems disclosed herein can include, connect with or be integrated with sensors that may monitor interconnections for corrosion or other conditions, such as internal buildup that reduces the flow of hydrogen or the like through the interconnections may be associated with the system. In embodiments, such sensors may provide data indicative of a degree of corrosion, conditions that might speed corrosion, and the like to a computing device that may detect a condition indicative of needing to take action immediately or at such time as the degree of corrosion would demand such as replace an affected portion of the interconnections. In an example, the condition may be determined by comparing data from the sensor with data values that suggest an unacceptable degree of corrosion.

In embodiments, a monitoring subsystem with one or more sensors may collect, analyze, and/or report the real-time measurement of sensed data. Likewise, such a subsystem may collect, analyze, and/or report real-time failure data, such as to facilitate measuring and/or tracking material failure data, e.g., frequency, degree, time since deployment, and the like.

In embodiments, the methods and systems disclosed herein can include, connect with or be integrated with other sensing modalities to monitor catalytic activities to determine, for example, catalytic performance, efficiencies and the like. Based on these sensed activities, alerts that may indicate a need for catalyst replacement and/or other actions or precautions to be performed may be generated.

In embodiments, the methods and systems disclosed herein can include, connect with or be integrated with various methods and systems to monitor and determine input demand, output production, need for increases therein, and the like.

In embodiments, a facility with multiple hydrogen operations including production and/or storage may benefit from monitoring to balance storage and production rate capacity, such as for variable demand. In embodiments, monitoring input demand may provide insight into the amount of hydrogen being used, when it is used, with what other gases it is being used, which use subsystems are demanding input, quality of hydrogen produced, amount of energy required to produce the hydrogen, rate of hydrogen production and use over time and under a variety of conditions, and the like. In embodiments, sensors may be deployed and integrated with monitoring and control systems to monitor and coordinate efficient and safe storage or transfer of hydrogen.

In embodiments, the methods and systems disclosed herein can include, connect with or be integrated with one or more sensors to monitor and coordinate efficient and safe storage and/or transfer of hydrogen may be implemented in the Internet of things (IoT) applications. In examples when hydrogen is stored as part of a micro/smart grid solution, monitoring system functions, such as input demand, production, and storage may facilitate determining a need for increasing input/supply. Likewise, sources of energy for operating a hydrolyzer and the like as described herein, such as renewable energy from solar and wind can be managed so that available sunlight and/or the wind can be tied to hydrogen production demand predictions from users such as industrial and others. In embodiments, this may facilitate ensuring allocation of available hydrogen for grid stability and the like. In embodiments, sensors that measure integrated energy use may similarly provide information to further facilitate managing for grid stability, among other things. In examples, predicted demand may be used in determining when and how much hydrogen should be produced and whether it should be stored to facilitate grid stability. In embodiments, this information may be used when portions of a grid are predicted to have high demand, while other portions are predicted to have low demand. Supply, from the production of hydrogen and/or from stored hydrogen, may be directed where when it is predicted to be needed.

In embodiments, another form of system sensing may involve fuel quality sensing. In embodiments, sensors that may accurately measure fuel and oxidant compositional characteristics may be used in a control system to direct hydrogen to different storage facilities based on the information. By way of these examples, uses of hydrogen that can tolerate higher oxidant composition may be sourced from storage facilities appropriately, perhaps at a lower cost than for hydrogen with a lower oxidant composition.

In embodiments, the methods and systems disclosed herein can include, connect with or be integrated with sufficiently reliable flame monitoring systems that may sense flame quality, flame stability, flame temperature, and the like. In embodiments, the methods and systems disclosed herein can include, connect with or be integrated with one or more sensors that can provide for continuous flue gas analysis that can be used to adjust the efficiency and magnitude the flame. In embodiments, further sensors and control systems related to flame or combustion products monitoring can be used including continuous heat flux meter In embodiments, the methods and systems disclosed herein can include, connect with or be integrated with particle sensors to determine how clean something is, e.g., as air, exhaust from a process or liquid including from hydrocarbon combustion. In embodiments, one or more emission detection sensors can be used to detect inefficient combustion and can also be used to detect leaks from the system. By way of these examples, the one or more sensors can be configured to measure partial pressure or particle count when sensing internal and/or external emission such as diatomic hydrogen, carbon dioxide, carbon monoxide, and other combustion byproducts.

In embodiments, methods and systems that may include, connect with, or be integrated with hydrogen production, storage, and use may be deployed in a variety of environments. Systems that can facilitate production of a consumable energy source, such as hydrogen gas may be utilized in environments such as cooking meals or food preparation heating and/or cooking processes, including without limitation industrial cooking.

Preparation of meals or of food items that may be stored long term, such as canned foods and the like may be performed with the methods and systems described herein. Preparation of meals or food items in environments in which direct access to a reliable source of energy, such as electricity or natural gas, is not readily available, such as in mobile, sea-borne, air-borne, and other environments that are often actively in travel may benefit from the methods and systems described herein for autonomous production of hydrogen gas for use as a cooking energy source. Use of a cooking system that is described herein may be beneficial for use in mobile environments by reducing a total amount of fuel to be stored for use while in motion. By producing a clean burning energy source, such as hydrogen from renewable energy sources and through harvesting hydrogen from an ambient environment, deploying such systems on long duration travel vehicles, such as cargo ships, military ships, submarines, and the like can reduce the payload required to be carried for purposes such as meal preparation, cooking and the like.

Renewable energy to power processes of hydrogen production, monitoring, storage, distribution, and use may be harvested through the methods and systems described herein including solar power harvesting, wind power harvesting, thermal (e.g., geothermal) when deployed in mobile environments. Solar energy harvesting systems or components thereof that may be included with, connected to, or integrated with the hydrogen production, storage and use systems described herein may be deployed on sun-exposed surfaces, such as a roof of a vehicle, aircraft, ship, and the like. Air movement around and/or through a moving vehicle, as a result of propulsion of the vehicle and the like may be harvested and converted into an energy source suitable for use with hydrogen production, storage, distribution and the like. Heat generated by mobile system propulsion systems may be converted into a form of energy suitable for use in production, storage, distribution, and use of hydrogen. This may be accomplished through the use of inline turbine systems, wind capture systems, exhaust heat recapture systems, and the like. By using these readily available sources of energy, many of which are not otherwise utilized, total external energy requirements that may only be met through onboard storage, may be significantly reduced.

Use of the methods and systems for hydrogen storage and use may include deployment in marine transportation, such as on a submarine where the generation of toxic waste gas is undesirable. Hydrogen gas may be produced from sea water, stored as needed onboard, and safely consumed for cooking and other heating uses in a submarine without risk or costs of dealing with waste gas cleansing or removal.

Other environments of deployment of the hydrogen-based systems described herein may include use on aircraft, such as for preparation of meals to be consumed on the flight. Other aircraft-based uses may include industrial cooking while in-flight to, for example, produce cooked goods for use, storage or distribution after the aircraft returns to earth. Inflight-based cooking with the methods and systems for autonomous hydrogen cooking systems and the like described herein may facilitate cooking food and the like for extended duration flights, such as aircraft that remains aloft rather than just being operated from one location to another. Meals, foods, and other goods could be cooked while in-flight can be transported to/from the in-flight aircraft through shuttle or other aircraft to facilitate longer duration flights.

Earth-bound operations such as drilling and mining that may have very limited access to cooking fuel sources may benefit from the use of such a system. Equipment that transports materials, supplies, and workers to/from subterranean drill sites and mines may be equipped with such a system to facilitate preparation of food for the workers. Use of a fuel, such as hydrogen that produces no toxic exhaust may be well suited for use in drilling and mining environments.

Agricultural production, including harvesting, planting, and the like may also benefit from the deployment of hydrogen-based cooking and/or heating systems as described herein. Food preparation operations that may include heating or cooking freshly harvested foods may benefit from an automated or semi-automated hydrogen-based cooking system as described herein. Such a system may be deployed on or connected with a harvesting system, such as a produce harvester and the like so that cooking and optional storage operations can occur as the food is harvested.

Other deployments, such as industrial cooking deployments, may include job-site deployment, food truck deployment, canteen truck deployment, food production pipelines, and the like.

Yet other deployments, such as industrial cooking deployment may include residential environments, such as nursing homes, group homes, soup kitchens, school and business cafeterias, disaster relief food preparation stations, and the like.

The methods and systems of autonomous or semi-autonomous hydrogen production, storage, distribution, and use may be deployed as components in a smart power grid that may operate cooperatively with other components of a smart grid to attempt to deliver reliable energy available throughout the grid. In an example, a renewable energy-based hydrogen production system may utilize its renewable energy harvesting components to deliver electricity to a smart grid based on various factors, such as local demand for hydrogen and the like. When a renewable energy source is available, yet hydrogen production is not called for (e.g., sufficient supply is stored, or an amount that is anticipated to be needed, such as based on machine learning or the like of prior local hydrogen demand over time is expected to be producible before needed), then electricity or the like produced from the renewable energy source could be fed back into the smart grid.

Other types of industrial applications of the methods and systems of hydrogen production, storage, distribution and use may include air and inline heaters, and the like. Exemplary environments may include deployment for aerospace operation and testing, such as component temperature testing, heating, hot air curing, and the like. Production of temperatures that emulate extremes associated with aerospace travel, such as earth atmosphere entry and the like could be replicated with such systems for use in component testing and the like.

Other industrial heating applications may include automotive production (heat treating components, heat shrinking and the like), assembly (hot air bonding, etc.), customization (hot air bonding of vinyl body panel covers, paint curing and the like), repair (reshaping dented plastic components, such as a bumper) and the like.

Yet other industrial heating applications may include packaging, sterilization, and the like. Particular packaging uses may include high-speed poly-coated paperboard sealing, high-speed heat shrink installations, material heat forming, curing adhesives, sterilizing bottles and cartons (e.g., through heating water and/or steam therefore), production and packaging of pharmaceuticals, sterilization and packaging of surgical tools and hardware, replacement dental features (e.g., crowns and the like), production and sealing of packaging material, and the like.

Paper and printing heating-related applications of the methods and systems described herein may include the production of coated paper, including speed drawing the coating, adhesive activation, ink drying, paper aging, pulp drying, and the like.

Plastics and rubber production heating applications that may benefit from the methods and systems described herein may include rubber extrusion salt removal, curing plastics, bending and forming plastic components, de-flashing of molded parts and the like.

The methods and systems described herein may be used to produce heat needed for some semiconductor and electronics production and assembly operations including soldering operations, such as air knife for wave soldering, heating of printed circuit boards, lead frames, components (e.g., capacitors) for soldering/desoldering, centralized source of heat for a multi-station desoldering system, wafer and PC board drying, heat shrink wire insulation, preheating processes gases and the like.

Soldering and/or brazing requires heating that may be provided by the hydrogen-based heating systems described herein. Heat for soldering and brazing may be generated locally at each brazing station or may be provided from a centralized source for multiple soldering operations, including manual and semi-manual operations.

Other heated air applications that may be suitable for application of a hydrogen-based system as described herein may include textiles industrial uses, such as welding plastic or vinyl fabrics, heat-treating specialty fabrics, heat sealing fabric shipping sleeves, bonding multi-ply fabrics and the like. Industrial hot air applications may include the exemplary embodiments described herein, but may also include other comparable applications, such as home fabric bonding, plastic sheet dispensing and the like in which heat is used to increase the temperature of air or devices to perform various functions.

In embodiments, the methods and systems described herein that relate to hydrogen production, storage, distribution, use, regulation, monitoring, control, energy conversion, and the like may also be used for heating operations including immersion, circulation and customer heating. Example applications include energy production environments where fuel sources for cooking and heating may be used, such as alternative fuels processing, chemical processing, mining and metals, oil, and gas, petrochemical, power generation, fuel storage, fuel distribution, heat exchangers, waste disposal, heated storage, and the like. Industrial applications may include biopharmaceutical processing, industrial equipment (such as temperature test chambers), engine block heaters, preheating industrial burners, furnaces, kilns and the like, medical equipment laboratory and analytic equipment, military and defense including weapons, personnel management, and other military uses, production of rubber and plastics through controlled heating of petrochemicals and the like, transportation (such as passenger compartment temperature regulation, preheat or temperature regulation of vehicle systems in extremely low temperature environments) and the like, water processing, waste water processing and the like. Commercial applications of the methods and systems described herein for use as heating for immersion, circulation and the like may include integration, connection or use with commercial food equipment, building and construction systems, commercial marine and shipping systems and environments, heat-powered cooling, refrigeration, air conditioning, and other cooling applications and the like.

In addition to cooking and air heating applications, the methods and systems of autonomous hydrolyzer operation, generated fuel storage, distribution and use described herein may also be applied to processes that use heat from a heating element that may be powered from the fuel (e.g., hydrogen and the like) produced from the hydrolyzer. Manufacturing operations may include pharmaceutical manufacturing, industrial food manufacturing, semiconductor manufacturing, and the like. Other heating element-like applications may include coating such as vinyl automotive panel wrapping, molding such as injection molding, heat staking, and the like, hard tooling, heating material for extrusion operations, combustion systems (such as flame-based combustion devices, e.g., burners that would improve on existing combustion methods including improving efficiency, cost, reduce or eliminate emissions), enhance heat transfer from combustion products to the material processed for a variety of applications, such as by applying a clean-burning fuel in proximity to the material being processed, other types of combustion systems (e.g., non-burner types) such as catalytic combustion, combustion systems that include heat recovery devices such as self-recuperative burners, and the like.

Other applications for heat-dependent operations that can be powered by the fuel produced from a hydrolyzer may include heat and power uses such as integrated heating systems such as super boilers and other applications that deliver both heat and power to an operation (e.g., super pressurized steam systems, and the like). Other heat utilization applications may include heat production include use for testing materials such as products for mining (e.g., heat treating drilling machine elements), drying and moisture removal (such as clothes dryers, dehumidifiers, and the like). Other applications in which a hydrolyzer-based energy producing system may be used include heat as a catalyst for chemical reactions and processing including, without limitation chemical scrubbing of exhaust from industrial systems including petrochemical-based combustion systems, on-site production of chemicals, such as high-value petroleum products from lower grade, lower cost petroleum supplies, and the like.

Other applications that may benefit from the use of an autonomous hydrogen generation system as described herein may include desalination, such as local desalination systems for pleasure boats, ferries, and the like. Because of the high efficiency and potential for only using renewable energy sources, hydrogen generation-based desalination systems may be fully self-operative, producing hydrogen directly from a source of water being desalinated.

Yet other applications include using heat to power carbon capture, purification of material and systems such as a palladium electrolyzer, and the like. Industrial washing systems, such as laundry, preheating boiler water feeds, sterilizing, sanitation, and cleaning processes for clothing, uniforms, safety gear, hospital and medical care facilities (e.g., floors and the like) may also be target applications for systems that include, connect to, or integrate hydrogen production, storage, and distribution, including systems that are powered by renewable energy sources and the like.

Filtering and purifying materials and equipment used in various processes, such as food service, food manufacturing, pharmaceutical production and handling, livestock handling and processing and the like are also candidate application environments for the methods and systems described herein. In production environments that may rely on highly purified materials, such a system may be applied to provide the necessary heating or energy required. In embodiments, the methods and systems described herein may be applied to corrosion and hydrogen embrittlement activities.

Figure 60:
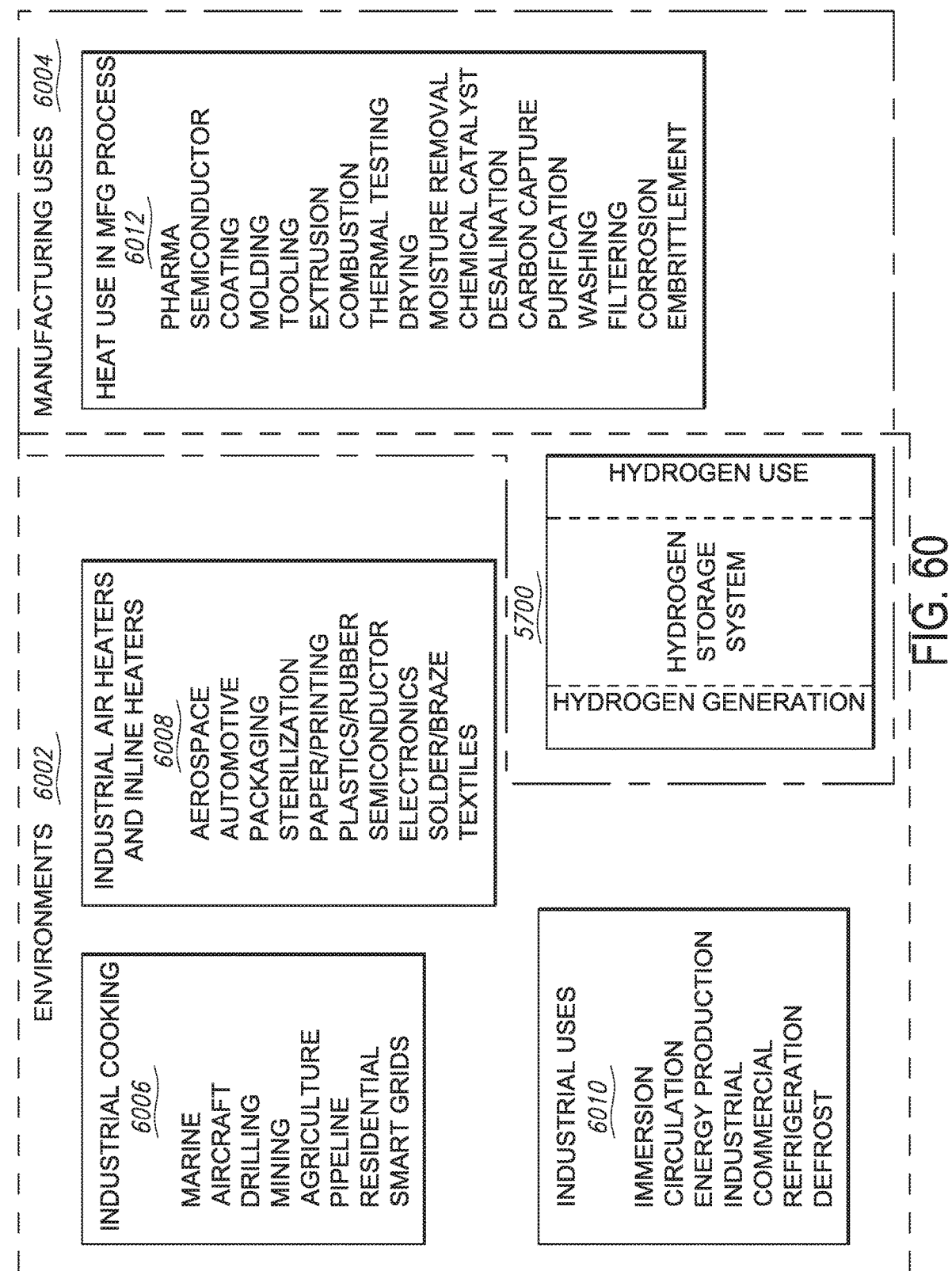
FIG. 60 is a diagrammatic view that depicts methods and systems related to environments and manufacturing uses of hydrogen production, storage, distribution, and use systems in accordance with the present disclosure.
Figure 61:
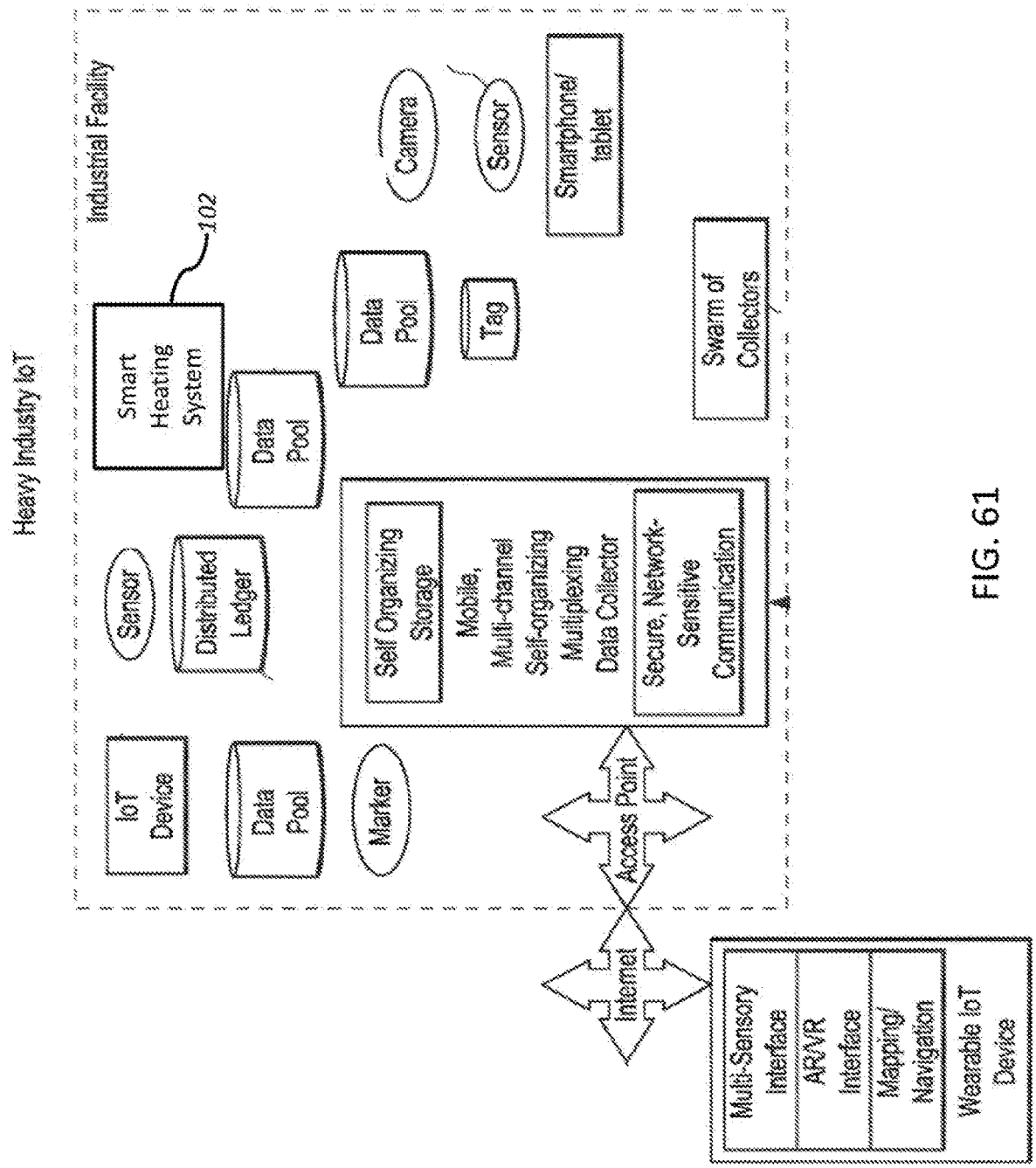
FIG. 61 is a diagrammatic view that depicts a smart heating system as an element in a network for in an industrial Internet of Things ecosystem in accordance with the present disclosure.

Referring to FIG. 60, environments and manufacturing uses of hydrogen production, storage, distribution, and use systems are depicted. As described above herein, hydrogen system 5700 may be deployed in environments including industrial cooking 6006, industrial air heaters and inline heaters 6008, and industrial environments 6010. A hydrogen system 5700 may also be used in manufacturing use cases 6004, such as heat used in manufacturing processes 6012. Deployment in environments 6002 and manufacturing uses 6004 may overlap, resulting in a hydrogen system 5700 operating in combinations of environment and use that are depicted in FIG. 60 and described herein.

The methods and systems described herein may be used to provide hydrogen directly from a hydrolyzer for certain uses including uses that do not require the introduction of oxygen. In such embodiments that may only require a hydrogen gas, the hydrogen can be produced and sent directly for real-time uses such as a burner for heating, industrial heating processes like welding and brazing, and all other use cases that require direct-use hydrogen. Some other cases may include coating, tooling, extrusion, drying and the like. The methods and systems described herein may produce high-quality hydrogen gas for applications that require it, such as laser cutting. Other uses may include the production of hydrogen gas that can then be combined with other combustible gases for operations such as to generate a flame suitable for welding, and the like.

In applications where both the separated hydrogen and separated oxygen may be required for different purposes, the generation, storage, distribution and/or heating (e.g., cooking) system can direct independently both gases to their appropriate process uses. An example could be an electrolyzer on a submarine where the hydrogen can be used for a burner, and the oxygen used in the submarines air circulation system, and the like. In yet other embodiments the oxygen and hydrogen that have been separated during the hydrolysis process may need to be recombined under a protocol that produces a desired combination and rate of the combination of oxygen and hydrogen. One such example is Oxy-Hydrogen welding.

In embodiments, other examples of time-shifted uses of electrolyzer products that may benefit from and/or include hydrogen storage may include storing hydrogen in its non-compressed state in a small tank that is part of a cooking or other industrial system, in a larger tank on or near the cooking system, or transported to very large holding tanks at a facility that is not nearby. Alternatively, the produced hydrogen can be compressed and stored in a small tank that is part of the cooking system, in a larger tank on or near the cooking system or transported to very large holding tanks at a facility that is not nearby. In yet other embodiments, hydrogen produced from hydrogen production systems described herein can be compressed into a liquid form and stored in a small tank that is part of the cooking system, in a larger tank on or near the cooking system or transported to very large holding tanks at a facility that is not nearby. Yet another example of hydrogen storage technology may include absorbing the hydrogen by a substrate. The substrate can then be stored in a small tank or other substrate storage facility that may be part of the cooking system, in a larger tank on or near the cooking system, transported to very large holding tanks at a facility that is not nearby, or distributed across a plurality of small, medium, and large storage facilities that may facilitate local access to the stored energy. At the appropriate time, the substrate can be heated and the hydrogen can return to its original gaseous state.

Cooking and other heating systems that may use hydrogen as one of a plurality of sources of fuel may participate in automatically selecting among the sources of fuel. These systems may include processing capabilities that are connected to various information sources that can provide data regarding factors that may be beneficial to consider when determining which energy source to select. Determining which energy source to select may be based, for example on a single factor, such as a current price for one or more of the sources of energy. An energy source that provides sufficient energy at a lowest current price may be selected. A cooking or other heating system may automatically, under computer control, be configured for the selected source of energy. In an example, if hydrogen is selected, connections to a source of hydrogen may be activated, while connections to other sources may be deactivated. Likewise, burners, heater controls, heat and safety profiles, cooking times, and a range of other factors may be automatically adjusted based on the selected energy source. If during a cooking or heating operation, another source of energy is found to be less costly (such as electricity), systems may automatically be reconfigured for use of the other source of energy. Gas-fired heaters may be disabled and electric heating elements may be energized to continue the cooking and/or heating operation with minimal interruption. Such hybrid energy source cooking and/or heating processes may require a distinct protocol for completing a cooking or heating process based on the new source of energy.

Alternatively, automatic selection of a fuel source may be based on a multitude of factors. These factors may be applied to a fuel source selection algorithm that may process individually, in groups, or in combination a portion of the factors. Example factors may include the price of other energy sources, including energy sources that are available to the cooking and heating system as well as those that are not directly available. In this way, selecting an energy source may be driven by other considerations, such as which energy source is better for the environment, and the like. An automatic energy source selection may be based, at least in part on the anticipated availability of an energy source. Predictions of energy outage, such as brownouts, may be based on a range of factors, including direct knowledge of scheduled brownouts and the like. Such predictions may also be based on prior experience regarding the availability of the source(s) of energy, which may be applied to machine learning algorithms that may provide predictions of future energy availability. Yet other factors that may be applied to an algorithm for automatically determining a source of energy may include availability of a source of water for producing hydrogen, availability of renewable energy (e.g., based on a forecast for sunlight, winds, and the like), level and/or intensity of need of the energy, anticipate level of need over a future period of time, such as the next 24 hours and the like. If an anticipate need over a future period of time includes large swings in demand over that timeframe, each peak in demand may be individually analyzed. Alternatively, an average or other derivatives of the demand over time may be used to determine a weighting for the various sources of energy.

In addition to energy selection for direct application to cooking and heating, energy selection for operating a hydrolyzer to produce hydrogen may be automated. Energy sources that may be included in such an automated selection process may include solar energy, wind energy, hydrogen energy, sulfur dioxide, electricity (such as from an electricity grid), natural gas, and the like. An algorithm that may facilitate automatic energy selection may receive information about each energy source, such as availability, costs, efficiency, and the like that may be processed by, for example comparing the information to determine which energy source provides the best fit for operating the hydrolyzer in a given time period. The algorithm may favor energy sources that are more reliable, more available, and lower costs than those that are less reliable, less available, and costlier. Combinations of these three factors may result in certain sources being selected. If a demand for reliable energy at a particular time is weighted more highly than price, for example, a costlier energy source may be automatically selected due to it being more reliably available. An automatic fuel selection algorithm may also produce recommendations for fuel selection and a human or other automated process may make a selection. In an example, an automated fuel selection algorithm may recommend a fuel that is less costly but may be somewhat less reliable than another source; however, given the weighting or other aspects of the available information about the sources, such a recommendation may meet acceptance criteria of the algorithm.

Methods and systems described herein may be associated with methods and systems for automatic selection of an energy source, such as a method for determining an optimal use of renewable energy (such as solar, wind, geothermal, hydro and the like) or non-renewable fuel. A selection of energy source to power an onsite, stand alone cooking or heating system may be based on a variety of factors including access and distance to a source of renewable energy source as a primary source, directly to the cooking system. As an example, while production cost data available regarding hydro-based renewable energy may support its selection, a delivery network may not be in place or may charge a substantive premium for access to that particular renewable source; therefore hydro-based renewable energy may not be an optimal use. Other factors include pricing and amount of electricity required to use the cooking system and electrolyzer and the; ability of the source to match up availability with demand for generated power is required for both sustained periods of usage as well as short-term requirements. Other factors that may impact an automated energy source selection process may include availability and ability to reuse excess heat from the cooking system and/or other nearby industrial facilities. Excess heat may include exhaust heat, sulfur dioxide byproduct and the like that can be used to generate heat through a heat exchange process. Another set of criteria for determining which energy source may be optimal for use by a cooking system as described herein may include comparing the need for short-term accessibility to power at arbitrary times throughout the day, versus limiting timing of demand to power given timing and availability of power sources, such as nearby power sources. Sulfur dioxide as a waste heat byproduct may be used in a heat transfer process to recapture heat from the sulfur dioxide gas; however, it may also be applied directly to the hydrolyzer system to produce hydrogen.

In embodiments, external systems, such as information systems may be associated with or connected to hydrogen production, storage, distribution, and use systems as described herein. Information systems may receive information from all aspects and system processes including, energy selection (such as automated energy selection) including actual results versus predicted results, energy consumption, hydrogen generation for each type of energy source (solar, hydro-based, wind, exhaust gas, including sulfur dioxide use, and the like), hydrogen refinement processes, hydrogen storage (including compressed, natural state storage, substrate infusion-based, and the like), hydrogen distribution, uses, combinations with other fuel sources (such as hydrogen with another flammable energy medium) and the like, uses of the hydrogen including timing, costs, application environment, and the like.

Communication to and from external systems may be through exchange of messages that may facilitate remote monitoring, remote control and the like. Messages may include information about a source of the message, a destination, an objective (e.g., control, monitoring, and the like), recommended actions to take, alternate actions to take, actions to avoid, and the like.

In embodiments, methods and systems related to hydrogen production, storage, distribution and use may include, be associated with, or integrate improvement features that may provide ongoing improvements in system performance, quality and the like. Improvement features may include process control and heat recovery, flow control and precision control, safety, reliability and greater service availability, process and output quality including output consistency. Other features that may be provided and/or be integrated with the hydrogen-based systems described herein may include data collection, analysis, and modeling for improvement, data security, cyber security, network security to avoid external attacks on control systems and the like, monitoring and analysis to facilitate preventive maintenance and repair.

Integration and/or access to data processing systems that also have access to third-party data may be included in the methods and systems described herein. By monitoring data collected from sensors, time of day, weather conditions, and other data sources may be used with specific rule sets to trigger activation and/or stoppage of hydrogen use (e.g., cooking) operations. Data may be accumulated in a continuous feedback loop that may capture data for a range of metrics associated with operations, such as cooking operations and the like. Analysis and control of activation of such a system may factor in the actual requirements and timing when a cooking system needs to be used (such as when a meal is being prepared, such as breakfast, or when heating is required for an industrial operation, such as at the start of a new work shift and the like.

Data collection, monitoring, process improvement, quality improvement, and the like may also be performed during the operation of such a system. In an example, once a cooking system is activated, the system may be able to determine the best way to receive the heat required to perform the process at hand at that particular moment in time. Receiving the heat required to perform the process may be selected from a variety of heat sources including in-line hydrogen production, stored hydrogen consumption, combined energy utilization and the like. In embodiments, cooking elements with a mix of hydrogen and non-hydrogen heat burners may be automatically controllable so that the system should be able to automatically, using machine learning for example and continuous monitoring, decide to use one or the other source or a combination thereof. Further in this example, a smart cooktop may include burners for hydrogen and for liquid propane. Methods and systems for cooking operation may automatically activate the appropriate burner based on fuel selection (e.g., hydrogen burner or the liquid propane burner). Operating such a cooking or heating system may be done by a computer enabled controller that may process factors including time of day, spot-pricing energy costs for each alternative, length of process involved, meeting 100% green requirements, potential hazardous use of flame depending on location of cooking system, other security features, and the like. To facilitate continuous improvement during operational control, data analysis may be performed on any or all aspects of the system. In an example, if the electrolyzer is not activated, sensors may capture information about the liquid propane burner that is being used. This single data capture example indicates that while it is desirable to collect information about all operational aspects to avoid missing information, practical considerations enable more focused data collection and analysis. Every activity and action by the cooking system and heating element may be captured, recorded, measured, and used to inform actions such as quality improvement and the like.

Information may be provided for one or more deployments of this cooking system to facilitate self-improvement and real-time decision making. Information captured may also be stored and used in time-series analysis and the like to determine patterns that may indicate opportunities for improvement. Data captured for a plurality of deployments may be used for creating and updating models that may be used for computer-generated simulations and the like. These models may be applied to design processes and the like. Continuous improvement modifications may be activated by machine-to-machine learning programs, human improvement efforts, instructional improvement and/or modifications, and the like.

As described herein and in reference to the many examples in PCT/US2017/031721 published as WO/2017/196821, intelligent industrial equipment and systems may be configured in various networks, including self-forming networks, private networks, Internet-based networks, and the like. One or more of the smart heating systems as described herein that may incorporate hydrogen production, storage, and use may be configured as nodes in such a network. In embodiments, a smart heating system may be configured with one or more network ports, such as a wireless network port that facilitate connection through WiFi and other wired and/or wireless communication protocols as described. The smart heating system includes a smart hydrogen production system and a smart hydrogen storage system, and the like described herein and may be configured individually or as an integral system connected as one or more nodes in a network of industrial equipment and systems. By way of this example, a smart heating system may be disposed in an on-site industrial equipment operations center, such as a portable trailer equipped with communication capabilities and the like. Such deployed smart heating system may be configured, manually, automatically, or semi-automatically to join a network of devices, such as industrial data collection, control, and monitoring nodes and participate in network management, communication, data collection, data monitoring, control, and the like.

In another example of a smart heating system participating in a network of industrial equipment monitoring, control, and data collection devices in that a plurality of the smart heating systems may be configured into a smart heating system sub-network. In embodiments, data generated by the sub-network of devices may be communicated over the network of industrial equipment using the methods and systems described herein and in reference to the many examples in PCT/US2017/031721 published as WO/2017/196821.

In embodiments, the smart heating system may participate in a network of industrial equipment as described herein and in reference to the many examples in PCT/US2017/031721 published as WO/2017/196821. By way of this example, one or more of the smart heating systems may be configured as an IoT device, such as an IoT device and the like described herein and in reference to the many examples in PCT/US2017/031721 published as WO/2017/196821. In embodiments, the smart heating systems may communicate through an access point, over a mobile ad hoc network and the like to devices and systems such as system element 102 and/or through network elements described herein and in reference to the many examples in PCT/US2017/031721 published as WO/2017/196821.

In embodiments, one or more smart heating systems described herein may incorporate, integrate, use, or connect with facilities, platforms, modules, and the like that may enable the smart heating system to perform functions such as analytics, self-organizing storage, data collection and the like that may improve data collection, deploy increased intelligence, and the like. Various data analysis techniques, such as machine pattern recognition of data, collection, generation, storage, and communication of fusion data from analog industrial sensors, multi-sensor data collection and multiplexing, self-organizing data pools, self-organizing swarm of industrial data collectors, and others described herein and in reference to the many examples in PCT/US2017/031721 published as WO/2017/196821 may be embodied in, enabled by, used in combination with, and derived from data collected by one or more of the smart heating systems.

In embodiments, a smart heating system may be configured with local data collection capabilities for obtaining long blocks of data (i.e., long duration of data acquisition), such as from a plurality of sensors, at a single relatively high-sampling rate as opposed to multiple sets of data taken at different sampling rates. By way of this example, the local data collection capabilities may include planning data acquisition routes based on historical templates and the like. In embodiments, the local data collection capabilities may include managing data collection bands, such as bands that define a specific frequency band and at least one of a group of spectral peaks, true-peak level, crest factor and the like.

In embodiments, one or more smart heating systems may participate as a self organizing swarm of IoT devices that may facilitate industrial data collection. The smart heating systems may organize with other smart heating systems, IoT devices, industrial data collectors, and the like to organize among themselves to optimize data collection based on the capabilities and conditions of the smart heating system and needs to sense, record, and acquire information from and around the smart heating systems. In embodiments, one or more smart heating systems may be configured with processing intelligence and capabilities that may facilitate coordinating with other members, devices, or the like of the swarm. In embodiments, a smart heating system member of the swarm may track information about what other smart heating systems in a swarm are handling and collecting to facilitate allocating data collection activities, data storage, data processing and data publishing among the swarm members.

In embodiments, a plurality of smart heating systems may be configured with distinct burners but may share a common hydrogen production system and/or a common hydrogen storage system. In embodiments, the plurality of smart heating systems may coordinate data collection associated with the common hydrogen production and/or storage systems so that data collection is not unnecessarily duplicated by multiple smart heating systems. In embodiments, a smart heating system that may be consuming hydrogen may perform the hydrogen production and/or storage data collection so that as smart heating system may prepare to consume hydrogen, they coordinate with other smart heating systems to ensure that their consumption is tracked, even if another smart heating system performs the data collection, handling, and the like. In embodiments, smart heating systems in a swarm may communicate among each other to determine which smart heating system will perform hydrogen consumption data collection and processing when each smart heating system prepares to stop consumption of hydrogen, such as when heating, cooking, or other use of the heat is nearing completion and the like. By way of this example when a plurality of smart heating systems is actively consuming hydrogen, data collection may be performed by a first smart heating system, data analytics may be performed by a second smart heating system, and data and data analytics recording or reporting may be performed by a third smart heating system. By allocating certain data collection, processing, storage, and reporting functions to different smart heating systems, certain smart heating systems with sufficient storage, processing bandwidth, communication bandwidth, available energy supply and the like may be allocated an appropriate role. When a smart heating system is nearing an end of its heating time, cooking time, or the like, it may signal to the swarm that it will be going into power conservation mode soon and, therefore, it may not be allocated to perform data analysis or the like that would need to be interrupted by the power conservation mode.

In embodiments, another benefit of using a swarm of smart heating systems as disclosed herein is that data storage capabilities of the swarm may be utilized to store more information than could be stored on a single smart heating system by sharing the role of storing data for the swarm.

In embodiments, the self-organizing swarm of smart heating systems includes one of the systems being designated as a master swarm participant that may facilitate decision making regarding the allocation of resources of the individual smart heating systems in the swarm for data collection, processing, storage, reporting and the like activities.

In embodiments, the methods and systems of self-organizing swarm of industrial data collectors may include a plurality of additional functions, capabilities, features, operating modes, and the like described herein and in reference to the many examples in PCT/US2017/031721 published as WO/2017/196821. In embodiments, a smart heating system may be configured to perform any or all of these additional features, capabilities, functions, and the like without limitation.

While only a few embodiments of the present disclosure have been shown and described, it will be obvious to those skilled in the art that many changes and modifications may be made thereunto without departing from the spirit and scope of the present disclosure as described in the following claims. All patent applications and patents, both foreign and domestic, and all other publications referenced herein are incorporated herein in their entireties to the full extent permitted by law.

The methods and systems described herein may be deployed in part or in whole through a machine that executes computer software, program codes, and/or instructions on a processor. The present disclosure may be implemented as a method on the machine, as a system or apparatus as part of or in relation to the machine, or as a computer program product embodied in a computer readable medium executing on one or more of the machines. In embodiments, the processor may be part of a server, cloud server, client, network infrastructure, mobile computing platform, stationary computing platform, or other computing platforms. A processor may be any kind of computational or processing device capable of executing program instructions, codes, binary instructions and the like. The processor may be or may include a signal processor, digital processor, embedded processor, microprocessor or any variant such as a co-processor (math co-processor, graphic co-processor, communication co-processor, and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor, or any machine utilizing one, may include non-transitory memory that stores methods, codes, instructions and programs as described herein and elsewhere. The processor may access a non-transitory storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache, and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server, cloud server, and other variants such as secondary server, host server, distributed server and the like. The server may include one or more of memories, processors, computer readable transitory and/or non-transitory media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable transitory and/or non-transitory media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM, and the like. The processes, methods, program codes, instructions described herein and elsewhere may be executed by one or more of the network infrastructural elements. The methods and systems described herein may be adapted for use with any kind of private, community, or hybrid cloud computing network or cloud computing environment, including those which involve features of software as a service ("SaaS"), platform as a service ("PaaS"), and/or infrastructure as a service ("IaaS").

The methods, program codes, and instructions described herein and elsewhere may be implemented on a cellular network having multiple cells. The cellular network may either be frequency division multiple access ("FDMA") network or code division multiple access ("CDMA") network. The cellular network may include mobile devices, cell sites, base stations, repeaters, antennas, towers, and the like. The cell network may be a GSM, GPRS, 3G, EVDO, mesh, or other networks types.

The methods, program codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable transitory and/or non-transitory media that may include: computer components, devices, and recording media that retain digital data used for computing for some interval of time; semiconductor storage known as random access memory ("RAM"); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable transitory and/or non-transitory media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps associated therewith, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable devices, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, methods described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples but is to be understood in the broadest sense allowable by law.

The use of the terms "a" and "an" and "the" and similar referents in the context of describing the disclosure (especially in the context of the following claims) is to be construed to cover both the singular and the plural unless otherwise indicated herein or clearly contradicted by context. The terms "comprising," "having," "including," and "containing" are to be construed as open-ended terms (i.e., meaning "including, but not limited to,") unless otherwise noted. Recitations of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

While the foregoing written description enables one skilled to make and use what is considered presently to be the best mode thereof, those skilled will understand and appreciate the existence of variations, combinations, and equivalents of the specific embodiment, method, and examples herein. The disclosure should therefore not be limited by the above described embodiment, method, and examples, but by all embodiments and methods within the scope and spirit of the disclosure.

Any element in a claim that does not explicitly state "means for" performing a specified function, or "step for"

performing a specified function, is not to be interpreted as a "means" or "step" clause as specified in 35 U.S.C. § 112(f). In particular, any use of "step of in the claims is not intended to invoke the provision of 35 U.S.C. § 112(f).

Persons skilled in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

We claim:

1. A system for data collection, processing, and utilization of signals from at least a first element in a smart heating system in an industrial environment, the system comprising:
   the smart heating system;
   a platform including a computing environment connected to a local data collection system configured to receive at least a first sensor signal or a second sensor signal from at least the smart heating system;
   a first sensor in the local data collection system connected to the smart heating system for obtaining the first sensor signal from the smart heating system;
   a second sensor in the local data collection system for obtaining the second sensor signal from the smart heating system; and
   a switch in the local data collection system having multiple inputs and multiple outputs including a first input connected to the first sensor and a second input connected to the second sensor, wherein the multiple outputs include a first output and a second output configured to be switchable between a condition in which the first output is configured to switch between delivery of the first sensor signal and the second sensor signal and a condition in which there is simultaneous delivery of the first sensor signal from the first output and the second sensor signal from the second output, wherein each of the multiple inputs is configured to be individually assigned to any of the multiple outputs, wherein at least one of the first sensor or the second sensor generates an alert based on a sensed condition such that at least one of the first sensor signal and the second sensor signal, respectively, is associated with the sensed condition, and wherein the generated alert indicates at least one action to be taken to counteract the sensed condition causing the alert.

2. The system of claim 1 wherein the multiple outputs include unassigned outputs that are configured to be switched off producing a high-impedance state.

3. The system of claim 1 wherein the smart heating system includes an electrolyzer for producing hydrogen fuel from water and at least one heating element, wherein the heating element is controlled by a processor and configured to use the hydrogen fuel under control of the processor.

4. The system of claim 3 wherein the processor is connected to a network to enable communication to a remote server, and wherein the remote server includes at least one module for providing at least one of remote monitoring and control of the operation of the smart heating system.

5. The system of claim 3 further comprising a low-pressure hydrogen storage system for storing the hydrogen fuel produced by the electrolyzer.

6. The system of claim 3 further comprising a renewable energy system for powering the electrolyzer to produce the hydrogen fuel, and wherein the renewable energy system is at least one of a solar power system, a wind power system or a hydro-power system.

7. The system of claim 3 further comprising a liquid propane fuel system for providing fuel to the smart heating system, wherein the smart heating system includes a fuel control module in operative connection with the processor to control the use of at least one of the liquid propane fuel or the hydrogen fuel for use by the smart heating system.

8. The system of claim 1, further comprising at least one interface configured to connect with at least one system external to the smart heating system, wherein the at least one interface is configured to at least one of monitor the smart heating system, control the smart heating system and obtain data collected by the smart heating system via interaction with the at least the one external system, and wherein the interface is at least one of an application programming interface, a machine-to-machine interface, or a graphical user interface.

9. The system of claim 1, wherein the smart heating system comprises at least one sensor having at least one of a temperature sensor, a weight sensor, a pressure sensor or a gyro-based sensor.

10. The system of claim 1, wherein the smart heating system is an industrial heating system used to provide heat in a manufacturing process.

11. The system of claim 10, wherein the industrial heating system is used in at least one of a semi-conductor manufacturing process, a coating process, a molding process, a tooling process, an extrusion process, a pharmaceutical manufacturing process or an industrial food manufacturing process.

12. The system of claim 10, wherein the industrial heating system is configured for use in an industrial environment including at least one of a marine transportation environment, an air transportation environment, a drilling environment, a mining environment, an agricultural production environment or a pipeline environment and wherein the industrial heating system is configured to communicate with information technology systems of the selected industrial environment.

13. An industrial system, comprising:
   a smart heating system; and
   a local data collection system configured to receive at least a first sensor signal and a second sensor signal from at least the smart heating system, the local data collection system including: (i) a first sensor connected to the smart heating system for obtaining the first sensor signal from the smart heating system, and (ii) a second sensor for obtaining the second sensor signal from the smart heating system,
   wherein the local data collection system includes multiple inputs and multiple outputs including a first input connected to the first sensor and a second input connected to the second sensor,
   wherein the multiple outputs include a first output and a second output configured to be selected between a condition in which the first output is configured to be selected between delivery of the first sensor signal and the second sensor signal and a condition in which there is simultaneous delivery of the first sensor signal from the first output and the second sensor signal from the second output,
   wherein each of the multiple inputs is configured to be individually assigned to any of the multiple outputs,
   wherein at least one of the first sensor or second sensor generates an alert based on a sensed condition such that at least one of the first sensor signal or the second sensor signal, respectively, is associated with the sensed condition, and wherein the generated alert indicates at least one action to be taken to counteract the sensed condition causing the alert.

14. The system of claim 13, wherein the platform is a cloud-based platform and wherein the smart heating system is configured to perform machine pattern recognition of data for at least one of the first sensor or the second sensor to provide data analysis.

15. The system of claim 13, wherein the multiple outputs include unassigned outputs that are configured to be switched off producing a high-impedance state.

16. The system of claim 13, wherein the smart heating system includes an electrolyzer for producing hydrogen fuel from water and at least one heating element, wherein the heating element is controlled by a processor and configured to use the hydrogen fuel under control of the processor.

17. The system of claim 16 further comprising a liquid propane fuel system for providing fuel to the smart heating system, wherein the smart heating system includes a fuel control module in operative connection with the processor to control the use of at least one of the liquid propane fuel or the hydrogen fuel for use by the smart heating system.

18. A computer implemented method for data collection, processing, and utilization of signals from at least a first element in a smart heating system in an industrial environment, the method comprising:

obtaining at least a first sensor signal or a second sensor signal from the smart heating system in the industrial environment;

selecting a first output and a second output of multiple outputs between a condition in which the first output is configured to be selected between delivery of the first sensor signal and the second sensor signal and a condition in which there is simultaneous delivery of the first sensor signal from the first output and the second sensor signal from the second output;

individually assigning one or more inputs to any of the multiple outputs;

generating an alert based on a sensed condition such that the at least one of the first sensor signal or the second sensor signal, respectively, is associated with the sensed condition; and indicating at least one action to be taken to counteract the sensed condition causing the alert.

19. The method of claim 18, wherein the smart heating system includes an electrolyzer for producing hydrogen fuel from water and at least one heating element, wherein the heating element is controlled by a processor and configured to use the hydrogen fuel under control of the processor.

20. The method of claim 18 wherein the alert indicates the at least one action of reducing an amount of hydrogen being produced by controlling a hydrolyzer.

* * * * *